(12) United States Patent
Lou et al.

(10) Patent No.: US 10,879,610 B2
(45) Date of Patent: Dec. 29, 2020

(54) ANTENNA APPARATUS AND BEAM ADJUSTMENT METHOD

(71) Applicant: HUAWEI TECHNOLOGIES CO., LTD., Guangdong (CN)

(72) Inventors: Yannian Lou, Shanghai (CN); Ni Ma, Shanghai (CN); Wangjun Wu, Shanghai (CN); Peng Chen, Shanghai (CN); Jianping Zhao, Shanghai (CN); Qingming Xie, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/704,655

(22) Filed: Dec. 5, 2019

(65) Prior Publication Data

US 2020/0112099 A1    Apr. 9, 2020

Related U.S. Application Data

(63) Continuation of application No. PCT/CN2018/090046, filed on Jun. 6, 2018.

(30) Foreign Application Priority Data

Jun. 6, 2017    (CN) .......................... 2017 1 0419517

(51) Int. Cl.
*H04B 7/0408* (2017.01)
*H01Q 3/36* (2006.01)
*H04B 7/06* (2006.01)

(52) U.S. Cl.
CPC ............. *H01Q 3/36* (2013.01); *H04B 7/0408* (2013.01); *H04B 7/0617* (2013.01)

(58) Field of Classification Search
CPC .... H04B 7/0617; H04B 7/0695; H04W 16/28
See application file for complete search history.

(56) References Cited

U.S. PATENT DOCUMENTS

2016/0308279 A1    10/2016    Athley et al.
2016/0308280 A1    10/2016    Shimizu
(Continued)

FOREIGN PATENT DOCUMENTS

CN    103633452 A    3/2014
CN    103840261 A    6/2014
(Continued)

OTHER PUBLICATIONS

Lorenzo Poli et al: "On the synthesis of linear multi-beam arrays with a reliable analytic methodology", IEEE APS, Jul. 3, 2011, total 4 pages.
(Continued)

*Primary Examiner* — Kevin Kim
(74) *Attorney, Agent, or Firm* — Womble Bond Dickinson (US) LLP

(57) ABSTRACT

This application discloses an antenna apparatus, including an antenna array and an adjustable phase shifter. In each row of antenna elements in the antenna array, antenna elements on a same radio frequency RF channel are spaced by M antenna elements, where M is used to determine a quantity of beams in a first beam group and a quantity of beams in a second beam group, and M is an integer greater than 1. When the adjustable phase shifter is at a first angle, the first beam group is obtained; or when the adjustable phase shifter is at a second angle, the second beam group is obtained. This application discloses a beam adjustment method. In this application, a plurality of beams can be formed in a horizontal direction, and the beams are grouped by using an adjustable phase shifter, thereby effectively improving beam adjustment flexibility.

20 Claims, 53 Drawing Sheets

(56) References Cited

U.S. PATENT DOCUMENTS

| | | | |
|---|---|---|---|
| 2016/0344463 A1 | 11/2016 | Kim et al. | |
| 2017/0062950 A1 | 3/2017 | Wang et al. | |
| 2018/0062722 A1 | 3/2018 | Su et al. | |
| 2018/0076881 A1 | 3/2018 | Zhu et al. | |
| 2018/0198511 A1* | 7/2018 | Maamari | H04B 7/04 |
| 2018/0352446 A1* | 12/2018 | Tsutsui | H04B 7/0617 |
| 2020/0007219 A1* | 1/2020 | Fellhauer | H04B 7/0617 |
| 2020/0145079 A1* | 5/2020 | Marinier | H04W 74/0833 |
| 2020/0163071 A1* | 5/2020 | Gao | H04W 72/048 |

FOREIGN PATENT DOCUMENTS

| | | |
|---|---|---|
| CN | 104639217 A | 5/2015 |
| CN | 105098383 A | 11/2015 |
| CN | 106033989 A | 10/2016 |
| CN | 106063148 A | 10/2016 |
| CN | 106160809 A | 11/2016 |
| EP | 3067988 B1 | 4/2018 |
| EP | 3136508 B1 | 5/2019 |
| WO | 2015082000 A1 | 6/2015 |
| WO | 2015176316 A1 | 11/2015 |
| WO | 2016168128 A1 | 10/2016 |

OTHER PUBLICATIONS

Zhang Jian et al: "Massive hybrid antenna array for millimeter-wave cellular communications", IEEE Wireless Communications, Mar. 6, 2015, pp. 79-87, total 10 pages.

* cited by examiner

Amplitude of a
Chebyshev weight    0.257   0.293   0.388   0.444   0.444   0.388   0.293   0.257
normalized based on
a total power of 1

| 1 | 2 | 3 | 4 | 5 | 6 | 7 | 8 |

Corresponding    0.066   0.086   0.151   0.197   0.197   0.151   0.086   0.066
weight power There are eight channels in total. Therefore, a channel power should not exceed 1/8 of a total power, and normalization is performed based on a single channel power of 1/8.

Amplitude   0.205   0.235   0.310   0.354   0.354   0.310   0.235   0.205

| 1 | 2 | 3 | 4 | 5 | 6 | 7 | 8 |

Power       0.042   0.055   0.096   0.125   0.125   0.096   0.055   0.042

RF channel  0.042   0.055   0.096   0.125   0.125   0.096   0.055   0.042
power

Channel 1  Channel 2  Channel 3  Channel 4  Channel 5  Channel 6  Channel 7  Channel 8

A total effective power is 0.636, to be specific, a 1.96 dB effective radiated power is lost.

FIG. 14

|    | e1 | e2 | e3 | e4 | e5 | e6 |
|----|----|----|----|----|----|----|
| E1 | 1 | 3 | 5 | 1 | 3 | 5 |
| E2 | 2 | 4 | 6 | 2 | 4 | 6 |
| E3 | 1 | 3 | 5 | 1 | 3 | 5 |
| E4 | 2 | 4 | 6 | 2 | 4 | 6 |
| E5 | 1 | 3 | 5 | 1 | 3 | 5 |
| E6 | 2 | 4 | 6 | 2 | 4 | 6 |
| E7 | 1 | 3 | 5 | 1 | 3 | 5 |
| E8 | 2 | 4 | 6 | 2 | 4 | 6 |
| E9 | 1 | 3 | 5 | 1 | 3 | 5 |
| E10 | 2 | 4 | 6 | 2 | 4 | 6 |
| E11 | 1 | 3 | 5 | 1 | 3 | 5 |
| E12 | 2 | 4 | 6 | 2 | 4 | 6 |

FIG. 31

|     | f1 | f2 | f3 | f4 | f5 | f6 |
|-----|----|----|----|----|----|----|
| F1  | 1  | 3  | 5  | 7  | 1  | 3  |
| F2  | 2  | 4  | 6  | 8  | 2  | 4  |
| F3  | 1  | 3  | 5  | 7  | 1  | 3  |
| F4  | 2  | 4  | 6  | 8  | 2  | 4  |
| F5  | 1  | 3  | 5  | 7  | 1  | 3  |
| F6  | 2  | 4  | 6  | 8  | 2  | 4  |
| F7  | 1  | 3  | 5  | 7  | 1  | 3  |
| F8  | 2  | 4  | 6  | 8  | 2  | 4  |
| F9  | 1  | 3  | 5  | 7  | 1  | 3  |
| F10 | 2  | 4  | 6  | 8  | 2  | 4  |
| F11 | 1  | 3  | 5  | 7  | 1  | 3  |
| F12 | 2  | 4  | 6  | 8  | 2  | 4  |

FIG. 32

|    | g1 | g2 | g3 | g4 | g5 | g6 | g7 |
|----|----|----|----|----|----|----|----|
| G1 | 1 | 3 | 5 | 7 | 1 | 3 | 5 |
| G2 | 2 | 4 | 6 | 8 | 2 | 4 | 6 |
| G3 | 1 | 3 | 5 | 7 | 1 | 3 | 5 |
| G4 | 2 | 4 | 6 | 8 | 2 | 4 | 6 |
| G5 | 1 | 3 | 5 | 7 | 1 | 3 | 5 |
| G6 | 2 | 4 | 6 | 8 | 2 | 4 | 6 |
| G7 | 1 | 3 | 5 | 7 | 1 | 3 | 5 |
| G8 | 2 | 4 | 6 | 8 | 2 | 4 | 6 |
| G9 | 1 | 3 | 5 | 7 | 1 | 3 | 5 |
| G10 | 2 | 4 | 6 | 8 | 2 | 4 | 6 |
| G11 | 1 | 3 | 5 | 7 | 1 | 3 | 5 |
| G12 | 2 | 4 | 6 | 8 | 2 | 4 | 6 |

FIG. 33

|     | h1 | h2 | h3 | h4 | h5 | h6 | h7 | h8 | h9 |
|-----|----|----|----|----|----|----|----|----|----|
| H1  | 1  | 3  | 5  | 7  | 9  | 1  | 3  | 5  | 7  |
| H2  | 2  | 4  | 6  | 8  | 10 | 2  | 4  | 6  | 8  |
| H3  | 1  | 3  | 5  | 7  | 9  | 1  | 3  | 5  | 7  |
| H4  | 2  | 4  | 6  | 8  | 10 | 2  | 4  | 6  | 8  |
| H5  | 1  | 3  | 5  | 7  | 9  | 1  | 3  | 5  | 7  |
| H6  | 2  | 4  | 6  | 8  | 10 | 2  | 4  | 6  | 8  |
| H7  | 1  | 3  | 5  | 7  | 9  | 1  | 3  | 5  | 7  |
| H8  | 2  | 4  | 6  | 8  | 10 | 2  | 4  | 6  | 8  |
| H9  | 1  | 3  | 5  | 7  | 9  | 1  | 3  | 5  | 7  |
| H10 | 2  | 4  | 6  | 8  | 10 | 2  | 4  | 6  | 8  |
| H11 | 1  | 3  | 5  | 7  | 9  | 1  | 3  | 5  | 7  |
| H12 | 2  | 4  | 6  | 8  | 10 | 2  | 4  | 6  | 8  |

FIG. 34

|     | i1 | i2 | i3 | i4 | i5 | i6 | i7 | i8 | i9 | i10 |
|-----|----|----|----|----|----|----|----|----|----|-----|
| I1  | 1  | 3  | 5  | 7  | 9  | 1  | 3  | 5  | 7  | 9   |
| I2  | 2  | 4  | 6  | 8  | 10 | 2  | 4  | 6  | 8  | 10  |
| I3  | 1  | 3  | 5  | 7  | 9  | 1  | 3  | 5  | 7  | 9   |
| I4  | 2  | 4  | 6  | 8  | 10 | 2  | 4  | 6  | 8  | 10  |
| I5  | 1  | 3  | 5  | 7  | 9  | 1  | 3  | 5  | 7  | 9   |
| I6  | 2  | 4  | 6  | 8  | 10 | 2  | 4  | 6  | 8  | 10  |
| I7  | 1  | 3  | 5  | 7  | 9  | 1  | 3  | 5  | 7  | 9   |
| I8  | 2  | 4  | 6  | 8  | 10 | 2  | 4  | 6  | 8  | 10  |
| I9  | 1  | 3  | 5  | 7  | 9  | 1  | 3  | 5  | 7  | 9   |
| I10 | 2  | 4  | 6  | 8  | 10 | 2  | 4  | 6  | 8  | 10  |
| I11 | 1  | 3  | 5  | 7  | 9  | 1  | 3  | 5  | 7  | 9   |
| I12 | 2  | 4  | 6  | 8  | 10 | 2  | 4  | 6  | 8  | 10  |

FIG. 35

When an adjustable phase shifter of an antenna apparatus is at a first angle, the antenna apparatus obtains a first beam group, where the antenna apparatus includes an antenna array and the adjustable phase shifter; the antenna array includes a plurality of antenna elements, and in each row of antenna elements in the antenna array, antenna elements that belong to a same RF channel are spaced by M antenna elements; M is used to determine a quantity of beams in the first beam group and a quantity of beams in a second beam group, and M is a positive integer greater than 1; and the adjustable phase shifter is connected to the antenna array ⟶ 301

When the adjustable phase shifter of the antenna apparatus is at a second angle, the antenna apparatus obtains the second beam group ⟶ 302

FIG. 50

ANTENNA APPARATUS AND BEAM ADJUSTMENT METHOD

CROSS-REFERENCE TO RELATED APPLICATIONS

This application is a continuation of International Application No. PCT/CN2018/090046, filed on Jun. 6, 2018, which claims priority to Chinese Patent Application No. 201710419517.8, filed on Jun. 6, 2017. The disclosures of the aforementioned applications are hereby incorporated by reference in their entireties.

TECHNICAL FIELD

This application relates to the communications field, and in particular, to an antenna apparatus and a beam adjustment method.

BACKGROUND

Development of mobile communications technologies promotes social development and progress and also promotes development of the antenna industry. In design and planning of a mobile network, a weighting coefficient of each array element in an antenna array needs to be adjusted through beamforming (BF), and a directional beam is generated, so that an obvious array gain can be obtained. Therefore, the beamforming technology has a great advantage of expanding a coverage area, improving an edge throughput, suppressing interference, and the like.

Beamforming mainly includes hybrid beamforming (hybrid BF, HBF) and digital beamforming (digital BF, DBF). Compared with the DBF, a quantity of radio frequency channels can be effectively reduced through the HBF, thereby reducing system complexity and costs.

Currently, a method for forming a plurality of fixed beams by using an analog split architecture has been proposed, to reduce antenna network deployment complexity. FIG. 1 is a schematic diagram of forming a plurality of fixed beams by using an analog split architecture in the prior art. As shown in the figure, each radio frequency (RF) channel is connected to all antenna elements, each antenna element is connected to each RF channel, and one fixed directional beam is formed on each RF channel by using a fixed phase shifter.

However, although the antenna network deployment complexity can be effectively reduced by forming the plurality of fixed beams by using the analog split architecture, the fixed beams generated by using the analog split architecture cannot be adjusted based on a communications scenario, thereby reducing beam adjustment flexibility.

SUMMARY

Embodiments of this application provide an antenna apparatus and a beam adjustment method, thereby effectively improving beam adjustment flexibility.

A first aspect of the embodiments of this application provides an antenna apparatus, which may include an antenna array and an adjustable phase shifter.

The antenna array of the antenna apparatus includes a plurality of antenna elements, and the antenna array is configured to generate a plurality of beams. The plurality of beams generated by the antenna array are a first beam group or a second beam group, and in each row of antenna elements in the antenna array, antenna elements that belong to a same RF channel are spaced by M antenna elements. It should be noted herein that M may be actually considered as an interval operation between the antenna elements that belong to the same RF channel. For example, if antenna element sequence numbers corresponding to a same row of antenna elements are "1, 5, 9, 13, 1, 5, 9, and 13", the two "antenna elements 1" are spaced by four interval operations. Therefore, it is considered that the two "antenna elements 1" are spaced by four antenna elements. A counting rule is that a target antenna element needs to be counted, and the target antenna element is specifically a second antenna element with a same sequence number. M may be used to determine a quantity of beams in the first beam group and a quantity of beams in the second beam group, and M is an integer greater than 1.

The adjustable phase shifter is connected to the antenna array, and the adjustable phase shifter may be usually connected to an antenna port of the antenna array by using a power splitter. When the adjustable phase shifter is at a first angle, the antenna array generates the first beam group. Similarly, when the adjustable phase shifter is at a second angle, the antenna array generates the second beam group.

The antenna port of the antenna array is configured to connect an antenna and an RF channel. One antenna port may be a port of at least one physical transmit antenna, or may be a combined port of a plurality of physical transmit antennas.

It can be learned that the antenna apparatus provided in this embodiment of this application can form a plurality of beam in a horizontal direction, and group the beams by using the adjustable phase shifter, so that corresponding beam groups can be selected based on different communications scenarios, thereby effectively improving beam adjustment flexibility.

In a possible design, in one embodiment, the adjustable phase shifter is a 1-bit adjustable phase shifter. The 1-bit adjustable phase shifter may be in different structures, for example, a 1-bit arc-shaped phase shifter, a 1-bit sliding U-shaped phase shifter, or a 1-bit dielectric sliding phase shifter.

In this application, angles that can be adjusted by the 1-bit adjustable phase shifter are 0° and 180°. However, the two angles may alternatively be adjusted based on an actual situation, for example, adjusted to 90° and 270° or adjusted to 45° and 225°. An example in which the first angle is 0° and the second angle is 180° is used to describe this application, but does not constitute a limitation on this application.

It can be learned that a case in which the adjustable phase shifter is specifically the 1-bit adjustable phase shifter is described in this embodiment of this application. The 1-bit adjustable phase shifter can switch between the two angles, to further freely switch between the first beam group and the second beam group, thereby effectively improving beam adjustment flexibility.

In one embodiment, the adjustable phase shifter in this application may alternatively be a multi-bit phase shifter. The multi-bit phase shifter is a phase shifter with more than one bit, for example, a 2-bit phase shifter, and includes four states, for example, 0°, 90°, 180°, and 270°. A method and an apparatus for performing beam adjustment by using the multi-bit phase shifter are similar to a method and an apparatus for performing beam adjustment by using the 1-bit phase shifter. Details are not described herein again. More beam groups can be obtained by using the multi-bit phase shifter, so that beam adjustment is more flexible.

In a possible design, in one embodiment, a baseband weight in a horizontal direction is set for the antenna array.

The baseband weight in the horizontal direction may be understood as performing amplitude and phase conversion on a baseband signal, and completing mapping of the baseband signal to an RF channel. It should be noted that configuring the baseband weight in the horizontal direction for the antenna array is configuring a baseband weight in the horizontal direction for each antenna element in the array. The baseband weight that is in the horizontal direction and that is of the antenna array includes the baseband weight that is in the horizontal direction and that corresponds to each antenna element, and the baseband weight that is in the horizontal direction and that is of the antenna array is used to determine a beam attribute that is in the horizontal direction and that is of a beam. The beam attribute that is in the horizontal direction and that is of the beam mainly includes an orientation and a shape that are of the beam in the horizontal direction. In other words, the shape of the beam and the orientation of the beam in the horizontal direction may be determined based on an arrangement manner of antenna elements and baseband weights in the horizontal direction that correspond to the antenna elements. The baseband weight in the horizontal direction may be specifically used to determine a beam attribute that is in the horizontal direction and that corresponds to a beam in the first beam group or a beam attribute that is in the horizontal direction and that corresponds to a beam in the second beam group.

It can be learned that in the foregoing manner, a quantity of antenna elements that space two antenna elements on a same RF channel in the horizontal direction may be set to determine a quantity of formed beams, thereby improving beam adjustment flexibility. In addition, the horizontal orientation, shape, and the like that are of the beam are determined based on the baseband weight in the horizontal direction, so that flexibility of the antenna apparatus is further enhanced.

In a possible design, in one embodiment, the baseband weight in the horizontal direction is determined based on a spacing between adjacent antenna elements, M, and a preset beam orientation range, and the spacing between the adjacent antenna elements is a spacing distance between two adjacent antenna elements in the horizontal direction. The antenna apparatus provided in this application can generate a plurality of directional beams by using a linear phase relationship between antenna elements and a periodic phase change characteristic. A larger value of M indicates a larger quantity of beams that can be correspondingly generated. Because M represents the quantity of antenna elements that space the horizontal antenna elements on the same RF channel, a distance between the two antenna elements in the horizontal direction on the same RF channel needs to be as large as possible.

The preset beam orientation range is an orientation range of a preset beam in the horizontal direction.

Then, in this embodiment of this application, a method for determining the baseband weight in the horizontal direction is described, to enhance practicality and feasibility of the solution.

In a possible design, in one embodiment, the antenna apparatus may further include a fixed phase shifter.

The fixed phase shifter is also connected to the antenna array. A difference lies in that the fixed phase shifter herein sets a vertical direction angle of the first beam group or the second beam group.

Then, in this embodiment of this application, the antenna apparatus may further include a fixed phase shifter, and the fixed phase shifter may set a vertical direction angle of a beam in the first beam group or a beam in the second beam group. Because an adjustable range of the beam is relatively small at a vertical direction, the fixed phase shifter can be selected to finely adjust the beam in a small range, thereby improving beam adjustment accuracy. In addition, the fixed phase shifter can be further selected to improve multiplexing rates of the first beam group and the second beam group.

In a possible design, in one embodiment of this application, the antenna array includes a plurality of columns of antenna elements, and each column of antenna elements further includes a plurality of antenna elements. It may be understood that each antenna element should have a corresponding baseband weight in a vertical direction. A baseband weight that is in the vertical direction and that is of the antenna array includes the baseband weight that is in the vertical direction and that is of each antenna element, and the baseband weight that is in the vertical direction and that is of the antenna array is used to determine a beam attribute that is in the vertical direction and that is of a beam. In other words, the baseband weight in the vertical direction is used to determine a beam attribute that is in the vertical direction and that corresponds to a beam in the first beam group, or is used to determine a beam attribute that is in the vertical direction and that corresponds to a beam in the second beam group.

The baseband weight in the vertical direction may be understood as mapping of a baseband signal to an RF channel. The beam attribute that is in the vertical direction and that corresponds to the beam mainly includes an orientation and a shape that are of the beam in the vertical direction. In other words, the shape of the beam in the vertical direction and the orientation of the beam in the vertical direction may be determined based on an arrangement manner of antenna elements and the baseband weight in the vertical direction.

Further, in the foregoing manner, the baseband weight that is in the vertical direction and that is of the antenna element may be set to determine the beam attribute that is in the vertical direction and that corresponds to the beam, thereby improving beam adjustment flexibility.

In a possible design, in one embodiment of this application, there is an association relationship between a fixed phase angle and a phase of the baseband weight in the vertical direction, and the fixed phase angle is a phase difference between two adjacent antenna elements on a same RF channel in the vertical direction.

It is assumed that the phase difference between the two antenna elements on a vertical plane that are driven on the same RF channel is a fixed phase difference, and there are N antenna elements that space the two antenna elements on the vertical plane that are driven on the same RF channel. When there are different values of N, a baseband weight of each antenna element in the vertical direction is calculated based on the fixed phase difference. A proper fixed phase difference needs to be selected, to minimize a difference between a phase of an actual baseband weight and a phase of the ideal baseband weight.

Still further, in this embodiment of this application, a distance between the antenna elements on the vertical plane that are driven on the same RF channel needs to be as small as possible based on the association relationship between the phase of the baseband weight in the vertical direction and the fixed phase angle. This conclusion is applied to design of the antenna apparatus, so that the difference between the phase of the actual weight and the phase of the ideal weight is smallest, thereby improving signal transmitting/receiving quality.

In a possible design, in one embodiment of this application, each column of antenna elements in the antenna array includes a first antenna element group and a second antenna element group. One column of antenna elements is used as an example, for example, a first column of antenna elements. The first column of antenna elements includes the first antenna element group and the second antenna element group. The first antenna element group includes a first antenna element and a second antenna element. The first antenna element may be a $1^{st}$ antenna element corresponding to a first row in the antenna array, and the second antenna element may be a $1^{st}$ antenna element corresponding to a second row in the antenna array. For ease of description, the first antenna element may be named as a11, and the second antenna element may be named as a21. Similarly, the second antenna element group includes a third antenna element and a fourth antenna element. The third antenna element may be a $1^{st}$ antenna element corresponding to a third row in the antenna array, and the fourth antenna element may be a $1^{st}$ antenna element corresponding to a fourth row in the antenna array. The third antenna element may be named as a31, and the fourth antenna element may be named as a41. Both the antenna elements in the first antenna element group are connected to a first RF channel, and both the antenna elements in the second antenna element group are connected to a second RF channel.

In the first column of antenna elements, the first antenna element (a11) and the second antenna element (a21) are adjacent, and the third antenna element (a31) and the fourth antenna element (a41) are adjacent. Similarly, in another column of antenna elements, antenna elements that belong to a same RF channel in a vertical direction are also adjacently arranged.

Still further, a topology structure of the antenna array is described in detail in this embodiment of this application. In brief, in the antenna array, a distance between a plurality of antenna elements driven on a same RF channel needs to be as large as possible in a horizontal direction, and the antenna elements are adjacently arranged in a vertical direction. In the foregoing arrangement manner, a plurality of beams can be formed in the horizontal direction, beam grouping is completed by using a 1-bit adjustable phase shifter, and both beams in a first beam group and a second beam group have high isolation. The phase can be closer to an ideal phase in the vertical direction, thereby improving beam quality.

In a possible design, in one embodiment of this application, a first antenna element column may be named as a1. Similarly, a second antenna element column may be named as a5. In the first antenna element column (a1), a first antenna element may be named as a11, and a second antenna element may be named as a21. In the second antenna element column (a5), a fifth antenna element may be named as a15, and a sixth antenna element may be named as a25.

The first antenna element (a11), the second antenna element (a21), the fifth antenna element (a15), and the sixth antenna element (a25) may be all connected to a same RF channel. A connection relationship among the four antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter.

Still further, in this embodiment of this application, the four antenna elements may be driven on one RF channel, thereby reducing a quantity of RF channels, and reducing complexity and costs of a multi-beam system.

In a possible design, in one embodiment of this application, a first antenna element column (b1) in the antenna array includes a first antenna element group and a second antenna element group. It is assumed that a first column in the antenna array is the first antenna element column. For ease of description, the first antenna element column may be named as b1, and the first antenna element column (b1) includes the first antenna element group and the second antenna element group. The first antenna element group includes a first antenna element and a second antenna element. The first antenna element may be a $1^{st}$ antenna element corresponding to a first row in the antenna array, and the second antenna element may be a $1^{st}$ antenna element corresponding to a second row in the antenna array. For ease of description, the first antenna element may be named as b11, and the second antenna element may be named as b21. Similarly, the second antenna element group includes a third antenna element and a fourth antenna element. The third antenna element may be a $1^{st}$ antenna element corresponding to a third row in the antenna array, and the fourth antenna element may be a $1^{st}$ antenna element corresponding to a fourth row in the antenna array. The third antenna element may be named as b31, and the fourth antenna element may be named as b41. Both the antenna elements in the first antenna element group are connected to a first RF channel, and both the antenna elements in the second antenna element group are connected to a second RF channel.

In the first antenna element column (b1), the first antenna element (b11) and the second antenna element (b21) are adjacent, and the third antenna element (b31) and the fourth antenna element (b41) are adjacent. Similarly, in another column of antenna elements, antenna elements that belong to a same RF channel in a vertical direction are also adjacently arranged.

Still further, another topology structure of the antenna array is described in detail in this embodiment of this application. In brief, in the antenna array, a distance between a plurality of antenna elements driven on a same RF channel needs to be as large as possible in a horizontal direction, and the antenna elements are adjacently arranged in a vertical direction. In the foregoing arrangement manner, a plurality of beams can be formed in the horizontal direction, beam grouping is completed by using a 1-bit adjustable phase shifter, and both beams in a first beam group and a second beam group have high isolation. The phase can be closer to an ideal phase in the vertical direction, thereby improving beam quality.

In a possible design, in one embodiment of this application, a first antenna element column may be named as b1. Similarly, a second antenna element column may be named as b6. In the first antenna element column (b1), a first antenna element may be named as b11, and a second antenna element may be named as b21. In the second antenna element column (b6), a fifth antenna element may be named as b16, and a sixth antenna element may be named as b26.

The first antenna element (b11), the second antenna element (b21), the fifth antenna element (b16), and the sixth antenna element (b26) are all connected to a same RF channel.

Still further, in this embodiment of this application, the four antenna elements may be driven on one RF channel, thereby reducing a quantity of RF channels, and reducing complexity and costs of a multi-beam system. In addition, a horizontal distance between two antenna elements in the horizontal direction that are driven on the RF channel is larger, so that there are more beams, and beam adjustment is more flexible.

In a possible design, in one embodiment of this application, a third antenna element column may be named as b4. The third antenna element column (b4) includes a third antenna element group, the third antenna element group is connected to a third RF channel, and the third antenna element group includes a seventh antenna element, an eighth antenna element, a ninth antenna element, and a tenth antenna element. For ease of description, the seventh antenna element may be named as b14, the eighth antenna element may be named as b24, the ninth antenna element may be named as b34, and the tenth antenna element may be named as b44.

The seventh antenna element (b14), the eighth antenna element (b24), the ninth antenna element (b34), and the tenth antenna element (b44) are all connected to a same RF channel.

Still further, in this embodiment of this application, in a same column of antenna elements, the four antenna elements may also be driven on one RF channel, thereby further reducing a quantity of RF channels, and reducing complexity and costs of a multi-beam system.

In a possible design, in one embodiment of this application, each column of antenna elements in the antenna array includes a first antenna element group and a second antenna element group. A first column of antenna elements is used as an example. The first column of antenna elements includes the first antenna element group and the second antenna element group. The first antenna element group includes a plurality of first antenna elements, and the second antenna element group includes a plurality of second antenna elements. The first antenna element may be a $1^{st}$ antenna element corresponding to a first row in the antenna array, and the second antenna element may be a $1^{st}$ antenna element corresponding to a second row in the antenna array. For ease of description, the first antenna element may be named as c11, and the second antenna element may be named as c21. The first antenna elements in the first antenna element group are all connected to a first RF channel, and the second antenna elements in the second antenna element group are all connected to a second RF channel.

In the first column of antenna elements, the first antenna element (c11) and the second antenna element (c21) are adjacent. Similarly, in another column of antenna elements, antenna elements that belong to a same RF channel in a vertical direction are also alternately arranged. In other words, the antenna elements driven on the same RF channel are not adjacent in a horizontal direction, and are alternately arranged in the vertical direction.

Still further, still another topology structure of the antenna array is described in detail in this embodiment of this application. In brief, in the antenna array, two antenna elements may be driven on a same RF channel in a horizontal direction, and a plurality of antenna elements may be driven on a same RF channel in a vertical direction. The two antenna elements driven on the same RF channel in the horizontal direction are not adjacent, and antenna elements driven on two RF channels in the vertical direction are alternately arranged. In the foregoing arrangement manner, a plurality of beams can be formed in the horizontal direction, beam grouping is completed by using a 1-bit adjustable phase shifter, and both beams in a first beam group and a second beam group have high isolation. A manner in which the plurality of antenna elements are driven on the same RF channel is used in the vertical direction, thereby greatly reducing a quantity of RF channels, and reducing system complexity and costs. In addition, a fixed phase shifter is further used in the vertical direction, and a downtilt of each RF channel can be independently adjusted, thereby improving flexibility of the solution.

In a possible design, in one embodiment of this application, a first antenna element (c11) in a first antenna element column (c1) and a third antenna element (c15) in a second antenna element column (c5) may be connected to a same RF channel. Similarly, a second antenna element (c21) in the first antenna element column (c1) and a fourth antenna element (c25) in the second antenna element column (c5) are connected to a same RF channel.

A connection relationship among the plurality of antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter. In addition, there are two RF channels in the vertical direction, and an electrical downtilt of a beam formed on each RF channel may be independently adjusted.

Still further, in this embodiment of this application, the plurality of antenna elements may be driven on one RF channel, thereby greatly reducing a quantity of RF channels, and reducing costs of a multi-beam system.

A second aspect of the embodiments of this application provides a beam adjustment method. The method is mainly applied to an antenna apparatus. The antenna apparatus is the same as that described in the first aspect. Details are not described herein again. The beam adjustment method specifically includes:

When an adjustable phase shifter of the antenna apparatus is at a first angle, an antenna array generates a first beam group. Similarly, when an adjustable phase shifter of the antenna apparatus is at a second angle, an antenna array generates a second beam group.

In a possible design, in one embodiment of this application, the adjustable phase shifter used in the beam adjustment method may be specifically a 1-bit adjustable phase shifter. Descriptions of the 1-bit adjustable phase shifter and the adjustable phase shifter are the same as those in the first aspect. Details are not described herein again.

In a possible design, in one embodiment of this application, the beam adjustment method may further include the following operations:

configuring a baseband weight in a horizontal direction for the antenna array, where the baseband weight in the horizontal direction may be understood as performing amplitude and phase conversion on a baseband signal, and completing mapping of the baseband signal to an RF channel.

For example, the baseband weight in the horizontal direction may be configured by a baseband for the antenna array.

Then, a beam attribute that is in the horizontal direction and that corresponds to a beam in the first beam group or a beam attribute that is in the horizontal direction and that corresponds to a beam in the second beam group may be determined based on the baseband weight. The beam attribute that is in the horizontal direction and that corresponds to the beam mainly includes an orientation and a shape that are of the beam in the horizontal direction. In other words, the shape of the beam and the orientation of the beam in the horizontal direction may be determined based on an arrangement manner of antenna elements and baseband weights in the horizontal direction that correspond to the antenna elements. In one embodiment of this application, the baseband weight that is in the horizontal direction and that is configured by the antenna apparatus for the antenna array may be determined based on a spacing between adjacent antenna elements, M, and a preset beam orientation range. The spacing between the adjacent antenna elements is a spacing distance between two adjacent antenna elements in the horizontal direction, and M is a quantity of antenna elements that space two antenna elements on a same RF channel in the horizontal direction. The preset beam orientation range is an orientation range of a preset beam in the horizontal direction.

The antenna apparatus provided in this application can generate a plurality of directional beams essentially by using a linear phase relationship between antenna elements and a periodic phase change characteristic. A larger value of M indicates a larger quantity of beams that can be correspondingly generated. Because M represents the quantity of antenna elements that space the horizontal antenna elements on the same RF channel, a distance between the two antenna elements in the horizontal direction on the same RF channel needs to be as large as possible.

In a possible design, in one embodiment of this application, the beam adjustment method may further include the following operation:

setting a vertical direction angle of a beam in the first beam group or a beam in the second beam group, where an adjustment manner of the beam is setting the vertical direction angle by using a fixed phase shifter.

In a possible design, in one embodiment of this application, the beam adjustment method may further include the following operations: setting a baseband weight in a vertical direction for the antenna array, and then determining, based on the baseband weight that is in the vertical direction and that is of the antenna array, a beam attribute that is in the vertical direction and that corresponds to the beam in the first beam group or a beam attribute that is in the vertical direction and that corresponds to the beam in the second beam group.

For example, the baseband weight in the vertical direction may be configured by a baseband for the antenna array.

It may be understood that the baseband weight in the vertical direction may be understood as mapping of a baseband signal to an RF channel. The beam attribute that is in the vertical direction and that corresponds to the beam mainly includes an orientation and a shape that are of the beam in the vertical direction. In other words, the shape of the beam in the vertical direction and the orientation of the beam in the vertical direction may be determined based on an arrangement manner of antenna elements and the baseband weight in the vertical direction.

In a possible design, in one embodiment of this application, there is an association relationship between a fixed phase angle and a phase of the baseband weight in the vertical direction, and the fixed phase angle is a phase difference between two adjacent antenna elements on a same RF channel in the vertical direction.

It is assumed that the phase difference between the two antenna elements on a vertical plane that are driven on the same RF channel is a fixed phase difference, and there are N antenna elements that space the two antenna elements on the vertical plane that are driven on the same RF channel. When there are different values of N, a phase of a weight of each antenna element in the vertical direction is calculated based on the fixed phase difference. A proper fixed phase difference needs to be selected, to minimize a difference between a phase of an actual weight and a phase of the ideal weight.

In a possible design, in one embodiment of this application, three topology structures are provided according to the method. Specific descriptions are the same as those in the first aspect. Details are not described herein again.

According to a third aspect, an embodiment of this application provides a computer device, including a processor, a memory, a bus, and a communications interface. The memory is configured to store a computer executable instruction, the processor is connected to the memory by using the bus, and when the server runs, the processor executes the computer executable instruction stored in the memory, so that the server performs the method in any one of the foregoing aspects.

According to a fourth aspect, an embodiment of this application provides a computer readable storage medium, configured to store a computer software instruction used in the foregoing method. When the computer software instruction is run on a computer, the computer is enabled to perform the method in any one of the foregoing aspects.

According to a fifth aspect, an embodiment of this application provides a computer program product including an instruction. When the computer program product is run on a computer, the computer is enabled to perform the method in any of the foregoing aspects.

In addition, for technical effects brought by any design manner in the second aspect to the fifth aspect, refer to technical effects brought by different design manners in the first aspect. Details are not described herein again.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application.

FIG. 14 is a schematic diagram of a normalized Chebyshev weight according to an embodiment of this application;

FIG. 31 is a schematic diagram of a topology structure in which an antenna array includes six columns of antenna elements according to an embodiment of this application;

FIG. 32 is a schematic diagram of another topology structure in which an antenna array includes six columns of antenna elements according to an embodiment of this application;

FIG. 33 is a schematic diagram of a topology structure in which an antenna array includes seven columns of antenna elements according to an embodiment of this application;

FIG. 34 is a schematic diagram of a topology structure in which an antenna array includes nine columns of antenna elements according to an embodiment of this application;

FIG. 35 is a schematic diagram of a topology structure in which an antenna array includes 10 columns of antenna elements according to an embodiment of this application;

FIG. 50 is a schematic diagram of an embodiment of a beam adjustment method according to an embodiment of this application.

DESCRIPTION OF EMBODIMENTS

Embodiments of this application provide an antenna apparatus and a beam adjustment method, thereby effectively improving beam adjustment flexibility.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in proper circumstances, so that the embodiments of this application described herein can be implemented in orders except the order illustrated or described herein. In addition, the terms "include", "have", and any other variants mean to cover the non-exclusive inclusion, for example, a process, method, system, product, or device that includes a series of operations or units is not necessarily limited to those expressly listed operations or units, but may include other operations or units that are not expressly listed or inherent to such a process, method, system, product, or device.

It should be understood that the technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, or the 5th generation (5G) mobile communications technology. It should be noted that a specific communications system is not limited in the embodiments of this application.

Figure 1:
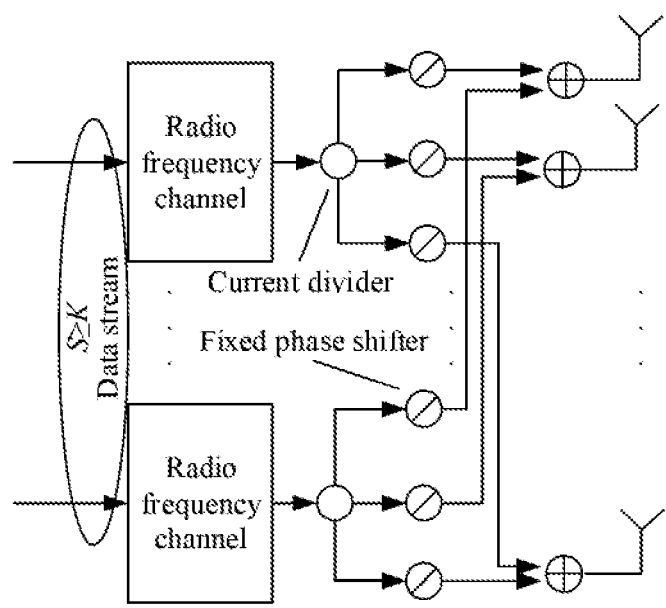
FIG. 1 is a schematic diagram of forming a plurality of fixed beams by using an analog split architecture in the prior art.
Figure 2:
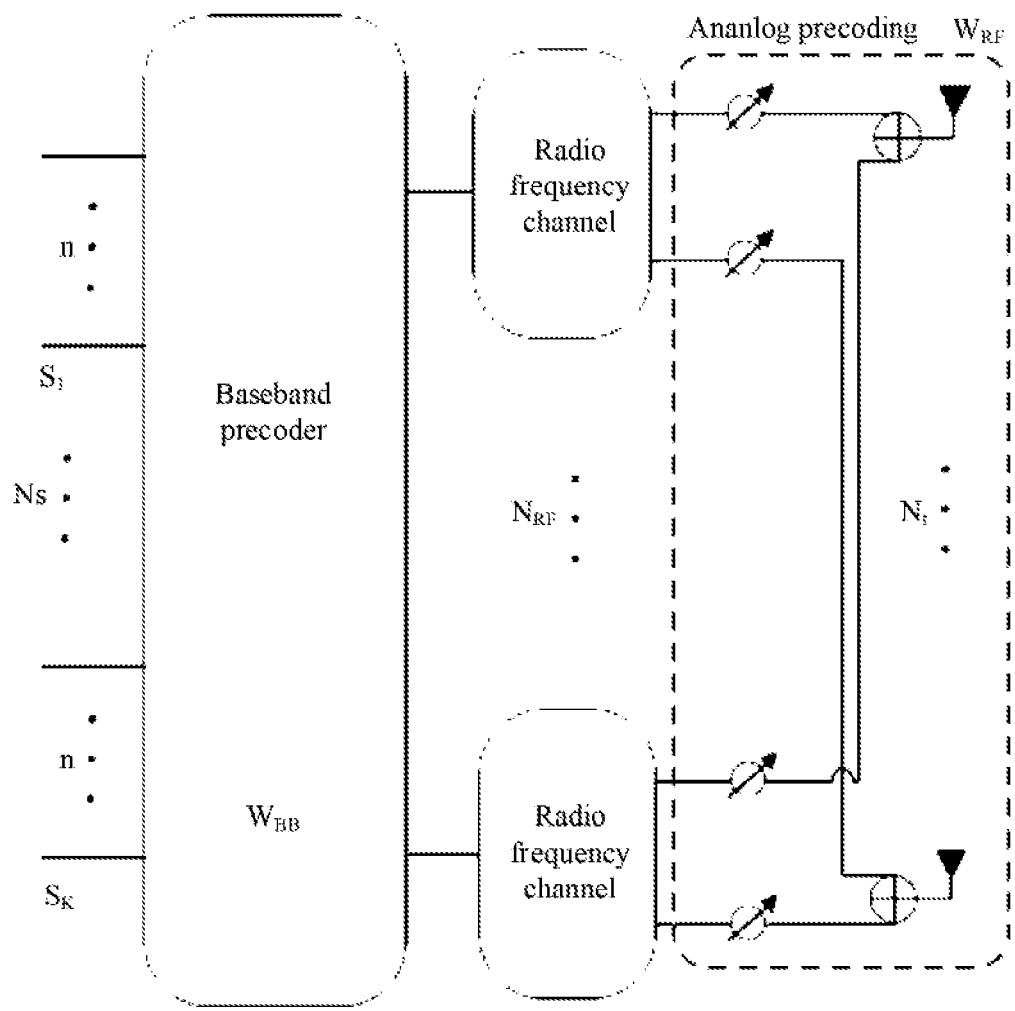
FIG. 2 is a schematic diagram of an architecture of HBF according to an embodiment of this application.

It should be understood that the embodiments of this application may be applied to an architecture of HBF. FIG. 2 is a schematic diagram of an architecture of HBF according to an embodiment of this application. As shown in the figure, $S_k$ represents a to-be-transmitted data stream, and there are $N_s$ streams in total. The data streams are mapped to $N_{RF}$ radio frequency channels by using a weighted matrix $W_{BB}$, and then data on the radio frequency channels is mapped to $N_T$ antenna elements by using a weighted matrix $W_{RF}$. Because $W_{BB}$ is formed in a baseband through digital weighting, and $W_{RF}$ is formed by using antenna network hardware, this beamforming manner is referred to as hybrid beamforming, namely, HBF. The HBF is relative to full-digital beamforming, namely, DBF. A forming process of the DBF is completely implemented in a baseband in a digital manner. There is no additional radio frequency feeder network between a radio frequency channel and an antenna. Therefore, $N_{RF}=N_T$. Therefore compared with the DBF, a quantity of radio frequency channels can be effectively reduced through the HBF, thereby reducing system complexity and costs.

It may be understood that the HBF is an antenna array-based signal preprocessing technology, and is a method for performing two-level beamforming through both radio frequency feeder network weighting and digital baseband weighting to jointly form a beam, thereby performing wave number domain communication. Dimension reduction of the RF channel is implemented through the HBF, so that system complexity and costs can be effectively reduced. The HBF is one of key technologies in a multi-antenna field. A weighting coefficient of each array element in an antenna array is adjusted through the HBF, and a directional beam is generated, so that an obvious array gain can be obtained. Therefore, the HBF technology has a great advantage of expanding a coverage area, improving an edge throughput, suppressing interference, and the like. Due to spatial selectivity brought by beamforming, there is a close relationship between beamforming and space division multiple access (SDMA). The HBF technology applied to an actual system may have different objectives, for example, focus on link quality improvement (coverage area expansion or user throughput increasing) or improvement on multi-user problems (for example, a cell throughput and interference cancellation).

An architecture of a multi-beam system is designed in this application, so that system complexity can be reduced. In this architecture, an adjustable phase shifter is added to improve a system degree of freedom, thereby improving system performance. However, in actual application, this application is applied to an HBF scenario without limitation. For ease of description, HBF is used as an example below for description, but should not be construed as a limitation on this application.

Figure 3:
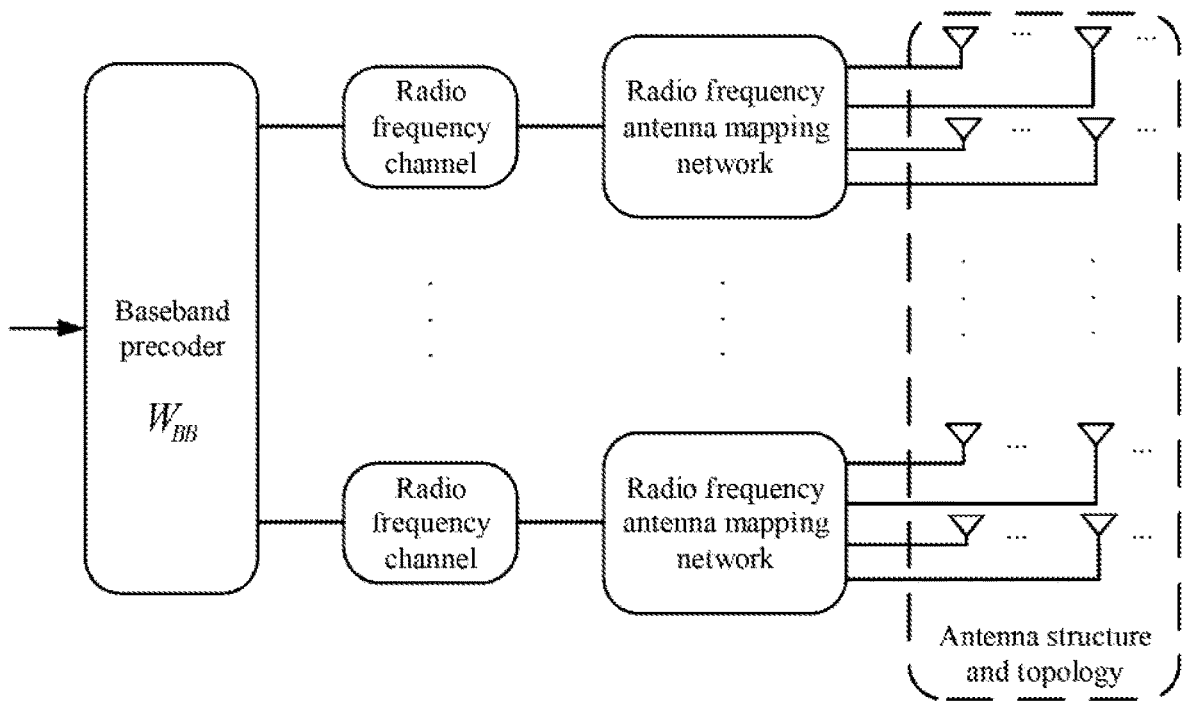
FIG. 3 is a schematic diagram of an architecture of a multi-beam system according to an embodiment of this application.

FIG. 3 is a schematic diagram of an architecture of a multi-beam system according to an embodiment of this application. As shown in the figure, an antenna apparatus is deployed in the architecture of the multi-beam system. A heterogeneous subarray topology architecture in a vertical direction and a horizontal direction is used in an antenna structure and topology. An element arrangement principle of the heterogeneous subarray topology architecture is as follows: Elements driven on a same RF channel in the horizontal direction are not adjacent, elements driven on a same RF channel in the vertical direction are adjacent, or elements driven on two RF channels in the vertical direction are alternately arranged. In a radio frequency feeder network between an RF channel and an antenna, only an adjustable phase shifter is used in the horizontal direction, a periodic hopping characteristic of a linear phase between elements is used to complete beam grouping and switching, and a fixed phase shifter is used in the vertical direction.

Transmission of a digital baseband signal is one of important constituent parts of a digital communications system. A baseband signal usually needs to be converted, so that the baseband signal can be suitable for transmission on a channel. However, a baseband precoder may mainly encode a baseband signal according to an encoding rule of the baseband signal, to meet a requirement of a transmission system. A signal has a specific degree of distortion when passing through the RF channel, and the distortion may be classified into linear distortion and non-linear distortion. The distortion is mainly caused by a passive component such as a filter and an active component such as a power amplifier (PA) and a frequency mixer. In addition, some additive noise and multiplicative noise are also introduced on the RF channel.

It may be understood that the antenna apparatus and the beam adjustment method that are provided in this application may be applied to a single-polarized antenna or a dual-polarized antenna. This is not limited herein.

Figure 4:
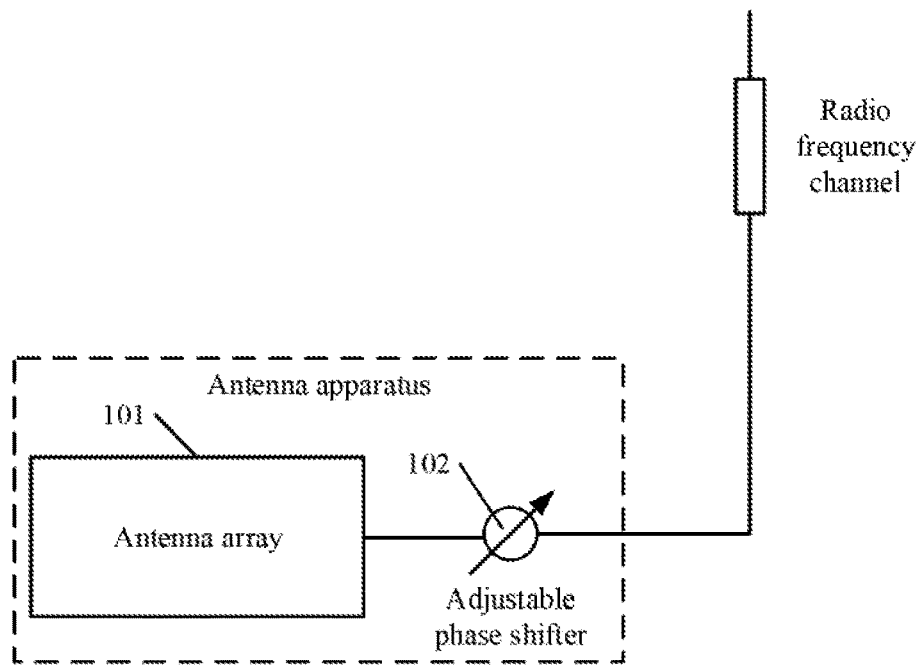
FIG. 4 is a schematic structural diagram of an antenna apparatus according to an embodiment of this application.

FIG. 4 is a schematic structural diagram of an antenna apparatus according to an embodiment of this application. As shown in the figure, the antenna apparatus includes an antenna array 101 and an adjustable phase shifter 102. One adjustable phase shifter 102 in FIG. 4 is merely an example. In actual application, the antenna apparatus may further include a plurality of adjustable phase shifters 102.

The antenna array 101 includes a plurality of antenna elements, and the antenna array 101 is usually a two-dimensional array. However, in actual application, the antenna array 101 may alternatively be a multi-dimensional array, for example, a three-dimensional curved surface array. For ease of description, an example in which the antenna array 101 is the two-dimensional array is used to describe the following embodiment. In each row of antenna elements in the antenna array 101, antenna elements that belong to a same RF channel may be spaced by M antenna elements, where M is mainly used to determine a quantity of beams in a first beam group and a quantity of beams in a second beam group, and M is a positive integer greater than 1.

The adjustable phase shifter 102 is connected to the antenna array 101, and when the adjustable phase shifter 102 is at a first angle, the antenna array 101 generates the first beam group; or when the adjustable phase shifter 102 is at a second angle, the antenna array 101 generates the second beam group.

It can be learned that the antenna apparatus can form a plurality of beams in a horizontal direction, and group the beams by using the adjustable phase shifter, so that corresponding beam groups can be selected based on different communications scenarios, thereby effectively improving beam adjustment flexibility.

In one embodiment, based on the foregoing embodiment corresponding to FIG. 4, in a first optional embodiment of the antenna apparatus provided in this embodiment of this application, the adjustable phase shifter 102 is a 1-bit adjustable phase shifter.

In this embodiment, the adjustable phase shifter 102 is specifically the 1-bit adjustable phase shifter, and the 1-bit adjustable phase shifter has two adjustable angles. The two angles are adjusted, so that a horizontal phase of a beam can be adjusted, and the first beam group or the second beam group can be obtained.

The 1-bit adjustable phase shifter may be in different structures, for example, a 1-bit arc-shaped phase shifter, a 1-bit sliding U-shaped phase shifter, or a 1-bit dielectric sliding phase shifter. The 1-bit arc-shaped phase shifter is in a strip line structure, and includes a plurality of arc-shaped metal conductors whose radii are in a proportional relationship and that are concentrically arranged and one arc brush that can rotate around a common circle center. Two ends of the arc-shaped conductor are connected to a radiation unit, the arc brush is connected to a feed through capacitive coupling at a circle center location, and the arc-shaped conductor is electrically connected to the arc brush through coupling. When the arc brush rotates through a specific angle, a length of a physical path of a signal from a main feed to each radiation unit changes, to change a phase. If the radii of the arc-shaped conductors are in the proportional relationship, output phases on ports progressively increase or decrease in proportion. The 1-bit sliding U-shaped phase shifter also changes a phase by changing a physical length of a transmission line. The 1-bit dielectric sliding phase shifter implements phase shifting by changing a dielectric distribution status of a transmission line, in other words, changing an equivalent dielectric constant.

It should be noted that in this application, the angles that can be adjusted by the 1-bit adjustable phase shifter are 0° and 180°. However, the two angles may alternatively be adjusted based on an actual situation, for example, adjusted to 90° and 270° or adjusted to 45° and 225°. An example in which the first angle is 0° and the second angle is 180° is used to describe this application, but does not constitute a limitation on this application.

It can be learned that a case in which the adjustable phase shifter is specifically the 1-bit adjustable phase shifter is described in this embodiment of this application. The 1-bit adjustable phase shifter can switch between the two angles, to further freely switch between the first beam group and the second beam group, thereby effectively improving beam adjustment flexibility.

In one embodiment, based on FIG. 4 or the first embodiment corresponding to FIG. 4, in a second optional embodiment of the antenna apparatus provided in this embodiment of this application, a baseband weight that is in a horizontal direction and that is set for the antenna array 101 is used to determine a beam attribute that is in the horizontal direction and that corresponds to a beam in the first beam group, or is used to determine a beam attribute that is in the horizontal direction and that corresponds to a beam in the second beam group.

The baseband weight in the horizontal direction may be understood as performing amplitude and phase conversion on a baseband signal, and completing mapping of the baseband signal to an RF channel. The beam attribute that is in the horizontal direction and that corresponds to the beam mainly includes an orientation and a shape that are of the beam in the horizontal direction. In other words, the shape of the beam and the orientation of the beam in the horizontal direction may be determined based on an arrangement manner of antenna elements and baseband weights in the horizontal direction that correspond to the antenna elements.

The baseband weight in the horizontal direction is determined based on a spacing between adjacent antenna elements, M, and a preset beam orientation range. The spacing between the adjacent antenna elements is a spacing distance between two adjacent antenna elements in the horizontal direction, and M is a quantity of antenna elements that space two antenna elements on a same RF channel in the horizontal direction.

Figure 5:
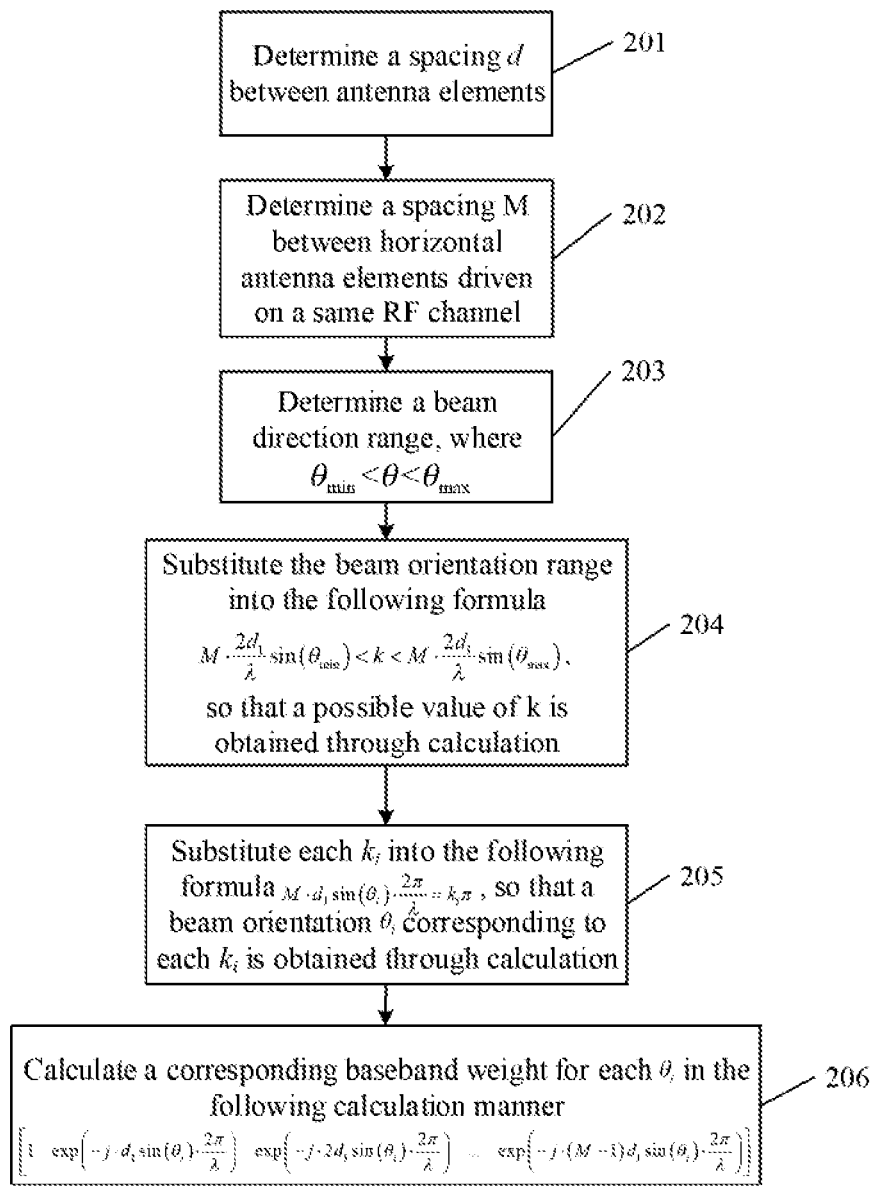
FIG. 5 is a schematic flowchart of calculating a baseband weight according to an embodiment of this application.

The antenna apparatus provided in this application can generate a plurality of directional beams by using a linear phase relationship between antenna elements and a periodic phase change characteristic. Because the 1-bit adjustable phase shifter is used, a phase difference between two horizontal elements driven on the same channel may be kπ, and k is an integer. For ease of description, FIG. 5 is a schematic flowchart of calculating a baseband weight in a horizontal direction according to an embodiment of this application. Details are as follows:

Operation 201: Determine a spacing $d_1$ between adjacent antenna elements in a horizontal direction. In this case, a phase difference between adjacent elements is $$d_1 \sin(\theta) \cdot \frac{2\pi}{\lambda},$$

where θ is used to represent a beam orientation, and λ is used to represent a signal wavelength.

Operation 202: Determine a value of M, where M represents a quantity of antenna elements that space horizontal antenna elements on a same RF channel. If two antenna elements in the horizontal direction that are driven on the same RF channel are spaced by M antenna elements, linear phases corresponding to all antenna elements in the horizontal direction may be derived by using a periodic phase change characteristic, namely, $$M \cdot d_1 \sin(\theta) \cdot \frac{2\pi}{\lambda} = k\pi.$$

It should be noted that operation 201 may be performed before operation 202, or operation 202 may be performed before operation 201. This is not limited herein.

Operation 203: Determine a beam orientation range, in other words, determine a preset beam orientation range. Usually, a minimum value of the preset beam orientation range is −60°, and a maximum value of the preset beam orientation range is 60°. Further, if the beam orientation range is $\theta_{min}<\theta<\theta_{max}$, $\theta_{min},\theta_{max}\in[-60°,60°]$ may be obtained after the maximum value and the minimum value that are of the preset beam orientation range are substituted into $\theta_{min}<\theta<\theta_{max}$.

However, in actual application, the preset beam orientation range may alternatively be another value range. This is not limited herein.

Operation 204: Substitute the preset beam orientation range in operation 203 into the following formula $$M \cdot \frac{2d_1}{\lambda}\sin(\theta_{min}) < k < M \cdot \frac{2d_1}{\lambda}\sin(\theta_{max}),$$

so that k can be obtained through calculation.

It can be learned from the foregoing formula that a larger value of M indicates a larger quantity of possible values of k, in other words, a larger quantity of beams can be correspondingly generated. Because M represents the quantity of antenna elements that space the horizontal antenna elements on the same RF channel, a distance between the two antenna elements in the horizontal direction on the same RF channel needs to be as large as possible.

Operation 205: Substitute each $k_i$ into a formula $$M \cdot d_1 \sin(\theta_i) \cdot \frac{2\pi}{\lambda} = k_i \pi,$$

so that a beam orientation $\theta_i$ corresponding to each $k_i$ can be obtained through calculation.

Operation 206: Calculate a corresponding baseband weight in the horizontal direction for each $\theta_i$ in the following calculation manner:

$$\left[ 1 \quad \exp\left(\frac{-j \cdot d_1 \sin}{(\theta_i) \cdot \frac{2\pi}{\lambda}}\right) \quad \exp\left(\frac{-j \cdot 2d_1 \sin}{(\theta_i) \cdot \frac{2\pi}{\lambda}}\right) \quad \ldots \quad \exp\left(\frac{-j \cdot (M-1)d_1}{\sin(\theta_i) \cdot \frac{2\pi}{\lambda}}\right) \right]$$

Then, in this embodiment of this application, the baseband weight in the horizontal direction may be used to determine a beam attribute that is in the horizontal direction and that corresponds to a beam in a first beam group, or to determine a beam attribute that is in the horizontal direction and that corresponds to a beam in a second beam group. The baseband weight in the horizontal direction is determined based on the spacing between the adjacent antenna elements, M, and the preset beam orientation range. In the foregoing manner, the quantity of antenna elements that space the two antenna elements on the same RF channel in the horizontal direction may be set to determine a quantity of beams, thereby improving beam adjustment flexibility. In addition, the beam orientation is determined based on the baseband weight in the horizontal direction, so that application flexibility of the antenna apparatus can be further enhanced.

Figure 6:
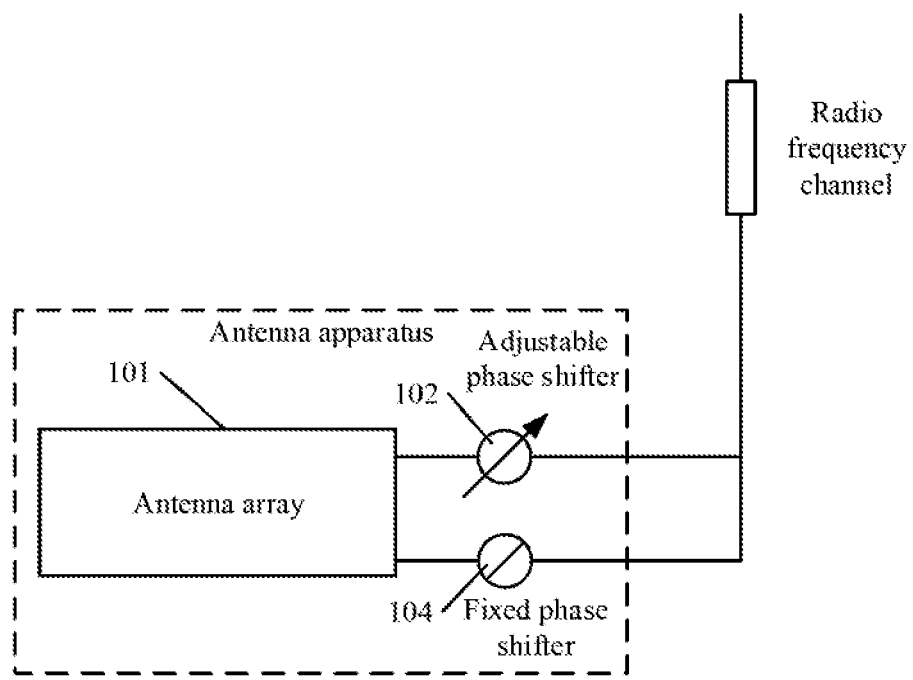
FIG. 6 is another schematic structural diagram of an antenna apparatus according to an embodiment of this application.

In one embodiment, based on FIG. 4 and the first or the second embodiment corresponding to FIG. 4, in a third optional embodiment of the antenna apparatus provided in this embodiment of this application, FIG. 6 is another schematic structural diagram of an antenna apparatus according to an embodiment of this application. The antenna apparatus includes an antenna array 101, an adjustable phase shifter 102, and a fixed phase shifter 104. One adjustable phase shifter 102 and one fixed phase shifter 104 in FIG. 6 are merely examples. In actual application, the antenna apparatus may further include a plurality of adjustable phase shifters 102 and a plurality of fixed phase shifters 104.

The antenna array 101 includes a plurality of antenna elements, and the antenna array 101 is usually a two-dimensional array. However, in actual application, the antenna array 101 may alternatively be a multi-dimensional array, for example, a three-dimensional curved surface array. For ease of description, an example in which the antenna array 101 is the two-dimensional array is used to describe the following embodiment. In each row of antenna elements in the antenna array 101, antenna elements that belong to a same RF channel may be horizontally spaced by M antenna elements, where M is mainly used to determine a quantity of beams in a first beam group and a quantity of beams in a second beam group, and M is an integer greater than 1.

The adjustable phase shifter 102 is connected to the antenna array 101, and when the adjustable phase shifter 102 is at a first angle, the antenna array 101 generates the first beam group; or when the adjustable phase shifter 102 is at a second angle, the antenna array 101 generates the second beam group.

The fixed phase shifter 104 is also connected to the antenna array 101, and the fixed phase shifter 104 sets a vertical direction angle of the first beam group or the second beam group.

Further, in this embodiment of this application, the antenna apparatus may further include a fixed phase shifter, and the fixed phase shifter may set a vertical direction angle of a beam in the first beam group or a beam in the second beam group. Because an adjustable range of the beam is relatively small at a vertical direction, the fixed phase shifter can be selected to finely adjust the beam in a small range, thereby improving beam adjustment accuracy. In addition, the fixed phase shifter can be further selected to improve multiplexing rates of the first beam group and the second beam group.

In one embodiment, based on FIG. 4 and any one of the first to the third embodiments corresponding to FIG. 4, in a fourth optional embodiment of the antenna apparatus provided in this embodiment of this application, a baseband weight that is in a vertical direction and that is set for the antenna array 101 is used to determine a beam attribute that is in the vertical direction and that corresponds to a beam in the first beam group, or is used to determine a beam attribute that is in the vertical direction and that corresponds to a beam in the second beam group.

There is an association relationship between a fixed phase angle and a phase of the baseband weight in the vertical direction, and the fixed phase angle is a phase difference between two adjacent antenna elements on a same RF channel in the vertical direction.

In this embodiment, a baseband weight in a horizontal direction is set for the antenna array 101. The baseband weight in the horizontal direction may be used to determine a beam attribute that is in the horizontal direction and that corresponds to a beam in the first beam group, or to determine a beam attribute that is in the horizontal direction and that corresponds to a beam in the second beam group. In addition, the baseband weight that is in the vertical direction and that is configured for the antenna array 101 is used to determine the beam attribute that is in the vertical direction and that corresponds to the beam in the first beam group or the beam attribute that is in the vertical direction and that corresponds to the beam in the second beam group.

Similarly, the baseband weight in the vertical direction may be understood as mapping of a baseband signal to an RF channel. The beam attribute that is in the vertical direction and that corresponds to the beam mainly includes an orientation and a shape that are of the beam in the vertical direction. In other words, the shape of the beam in the vertical direction and the orientation of the beam in the vertical direction may be determined based on an arrangement manner of antenna elements and the baseband weight in the vertical direction.

In this application, only a phase of the baseband weight in the vertical direction is constrained, but an amplitude of the weight is not constrained. For ease of understanding, the following uses an example to describe a method for calculating the phase of the baseband weight in the vertical direction. Details are as follows:

If n beams that need to be formed on a vertical plane each have a downtilt of $\varphi_i$, where i=1, 2 ... n, a spacing between antenna elements in the vertical direction is $d_2$, and a signal wavelength is $\lambda$, in an ideal state, a phase of a weight of each antenna element in the vertical direction is an ideal weight, and is as follows:

$$0$$
$$d_2\sin(\varphi_i) \cdot \frac{2\pi}{\lambda}$$
$$d_2\sin(\varphi_i) \cdot \frac{4\pi}{\lambda}$$
$$d_2\sin(\varphi_i) \cdot \frac{6\pi}{\lambda}$$
$$d_2\sin(\varphi_i) \cdot \frac{8\pi}{\lambda}$$
$$d_2\sin(\varphi_i) \cdot \frac{10\pi}{\lambda}$$
$$d_2\sin(\varphi_i) \cdot \frac{12\pi}{\lambda}$$
$$d_2\sin(\varphi_i) \cdot \frac{14\pi}{\lambda} \ldots$$

It is assumed that a fixed phase difference between two antenna elements on the vertical plane that are driven on the same RF channel is $\Delta\phi$, and there are N antenna elements that space the two antenna elements on the vertical plane that are driven on the same RF channel, where a counting manner of N herein is similar to a counting manner of M, and N and M are actually calculated interval operations between the two antenna elements. For example, one row of antenna elements is correspondingly arranged in a sequence of "1, 5, 9, 13, and 15". In this case, there is an interval operation from the antenna element "1" to the antenna element "5", or it may be understood that the antenna element "1" and the antenna element "5" are spaced by one antenna element. In this case, M is equal to 1. There are four interval operations from the antenna element "1" to the antenna element "15", or it may be understood that the antenna element "1" to the antenna element "15" are spaced by four antenna elements. In this case, A1 is equal to 4. Similarly, in one column of antenna elements, the same is applied to a counting manner of N. Details are not described herein.

When N=1, the phase of the weight of each antenna element in the vertical direction is as follows:

$$0\Delta\phi$$
$$d_2\sin(\varphi_i) \cdot \frac{4\pi}{\lambda}$$
$$d_2\sin(\varphi_i) \cdot \frac{4\pi}{\lambda} + \Delta\phi$$
$$d_2\sin(\varphi_i) \cdot \frac{8\pi}{\lambda}$$
$$d_2\sin(\varphi_i) \cdot \frac{8\pi}{\lambda} + \Delta\phi$$
$$d_2\sin(\varphi_i) \cdot \frac{12\pi}{\lambda}$$
$$d_2\sin(\varphi_i) \cdot \frac{12\pi}{\lambda} + \Delta\phi \ldots$$

When N=2, the phase of the weight of each antenna element in the vertical direction is as follows:

$$0$$
$$d\sin(\varphi_i) \cdot \frac{2\pi}{\lambda}\Delta\phi$$
$$d\sin(\varphi_i) \cdot \frac{2\pi}{\lambda} + \Delta\phi$$
$$d\sin(\varphi_i) \cdot \frac{8\pi}{\lambda}$$
$$d\sin(\varphi_i) \cdot \frac{10\pi}{\lambda}$$
$$d\sin(\varphi_i) \cdot \frac{8\pi}{\lambda} + \Delta\phi$$
$$d\sin(\varphi_i) \cdot \frac{10\pi}{\lambda} + \Delta\phi \ldots$$

When N=4, the phase of the weight of each antenna element in the vertical direction is as follows:

$0 d_2 \sin(\varphi_i) \cdot 2\pi/\lambda\ d_2 \sin(\varphi_i) \cdot 4\pi/\lambda\ d_2 \sin(\varphi_i) \cdot 6\pi/\lambda\ \Delta\phi\ d_2 \sin(\varphi_i) \cdot 2\pi/\lambda + \Delta\phi\ d_2 \sin(\varphi_i) \cdot 4\pi/\lambda + \Delta\phi d_2 \sin(\varphi_i) \cdot 6\pi/\lambda + \Delta\phi \ldots$ A value of N may be described herein. For an antenna array including eight rows of antenna elements, each column of the antenna array includes eight antenna elements.

When N=1, one column of antenna elements may be "an antenna element 1, an antenna element 1, an antenna element 2, an antenna element 2, an antenna element 3, an antenna element 3, an antenna element 4, and an antenna element 4" that are arranged in a sequence from top to bottom. Numbers "1", "2", "3", and "4" may be used to represent labels of antenna elements, and antenna elements with a same label belong to a same RF channel.

When N=2, one column of antenna elements may be "an antenna element 1, an antenna element 2, an antenna element 1, an antenna element 2, an antenna element 3, an antenna element 4, an antenna element 3, and an antenna element 4" that are arranged in a sequence from top to bottom. Numbers "1", "2", "3", and "4" may also be used to represent labels of antenna elements, and antenna elements with a same label belong to a same RF channel.

When N=3, one column of antenna elements may be "an antenna element 1, an antenna element 2, an antenna element 3, an antenna element 1, an antenna element 2, an antenna element 3, an antenna element 4, and an antenna element 4" that are arranged in a sequence from top to bottom. Numbers "1", "2", "3", and "4" may also be used to represent labels of antenna elements, and antenna elements with a same label belong to a same RF channel.

When N=4, one column of antenna elements may be "an antenna element 1, an antenna element 2, an antenna element 3, an antenna element 4, an antenna element 1, an antenna element 2, an antenna element 3, and an antenna element 4" that are arranged in a sequence from top to bottom. Numbers "1", "2", "3", and "4" may also be used to represent labels of antenna elements, and antenna elements with a same label belong to a same RF channel.

It should be noted that "1", "2", "3", and "4" herein are merely examples. In actual application, other identifiers may also be used to represent these antenna elements. This is not limited herein.

For each of the foregoing cases, proper $\Delta\phi$ needs to be selected, to minimize a difference between a phase of an actual weight and a phase of the ideal weight, so that a mean square error between the phase of the actual weight and the phase of the ideal weight is smallest. In other words, when N=1

$$\underset{\Delta\phi}{\text{MIN}}\left(\sum_{i=1:n} 4\left(d_2\sin(\varphi_i)\cdot\frac{2\pi}{\lambda} - \Delta\phi\right)^2\right);$$

when N=2, $$\underset{\Delta\phi}{\text{MIN}}\left(\sum_{i=1:n} 4\left(d_2\sin(\varphi_i)\cdot\frac{4\pi}{\lambda} - \Delta\phi\right)^2\right);$$

and
when N=4, $$\underset{\Delta\phi}{\text{MIN}}\left(\sum_{i=1:n} 4\left(d_2\sin(\varphi_i)\cdot\frac{8\pi}{\lambda} - \Delta\phi\right)^2\right).$$

The following may be obtained after calculation:
When N=1

$$\Delta\phi = \frac{1}{4}\sum_{i=1:n} d_2\sin(\varphi_i)\cdot\frac{2\pi}{\lambda};$$

when N=2, $$\Delta\phi = \frac{1}{2}\sum_{i=1:n} d_2\sin(\varphi_i)\cdot\frac{2\pi}{\lambda};$$

and
when N=4, $$\Delta\phi = \sum_{i=1:n} d_2\sin(\varphi_i)\cdot\frac{2\pi}{\lambda}.$$

In addition, minimum mean square errors in the three cases may be obtained:
When N=1, $$f_{min}^{N=1} = \sum_{i=1:n} 4\left(d_2\sin(\varphi_i)\cdot\frac{2\pi}{\lambda} - \frac{1}{4}\sum_{i=1:n}\left(d_2\sin(\varphi_i)\cdot\frac{2\pi}{\lambda}\right)\right)^2;$$

when N=2, $$f_{min}^{N=2} = \sum_{i=1:n} 4\left(d_2\sin(\varphi_i)\cdot\frac{4\pi}{\lambda} - \frac{1}{2}\sum_{i=1:n}\left(d_2\sin(\varphi_i)\cdot\frac{2\pi}{\lambda}\right)\right)^2;$$

and
when N=4, $$f_{min}^{N=4} = \sum_{i=1:n} 4\left(d_2\sin(\varphi_i)\cdot\frac{8\pi}{\lambda} - \sum_{i=1:n}\left(d_2\sin(\varphi_i)\cdot\frac{2\pi}{\lambda}\right)\right)^2.$$

Therefore, the following may be obtained:

$f_{min}^{M=4} = 2f_{min}^{M=2} = 4f_{min}^{M=1}$

In other words, when N=1, the minimum mean square error can be obtained. Therefore, a distance between the antenna elements on the vertical plane that are driven on the same RF channel needs to be as small as possible. Therefore, when N=1, a phase of a weight of each element in the vertical direction is as follows:

$0\Delta\phi$ $d_2\sin(\varphi_i)\cdot\frac{4\pi}{\lambda}$ $d_2\sin(\varphi_i)\cdot\frac{4\pi}{\lambda} + \Delta\phi$ $d_2\sin(\varphi_i)\cdot\frac{8\pi}{\lambda}$ $d_2\sin(\varphi_i)\cdot\frac{8\pi}{\lambda} + \Delta\phi$ $d_2\sin(\varphi_i)\cdot\frac{12\pi}{\lambda}$ $d_2\sin(\varphi_i)\cdot\frac{12\pi}{\lambda} + \Delta\phi\ ...$ A phase of a corresponding baseband weight in the vertical direction is as follows:

0

$d_2\sin(\varphi_i)\cdot\frac{4\pi}{\lambda}$ $d_2\sin(\varphi_i)\cdot\frac{8\pi}{\lambda}$ $d_2\sin(\varphi_i)\cdot\frac{12\pi}{\lambda}\ ...$ In addition, there are the following reasons why the fixed phase shifter is used in the vertical direction instead of the 1-bit adjustable phase shifter:

An angle of the beam in the horizontal direction may usually range from −65° to 65°, an angle of the beam in the vertical direction usually ranges from 10° to 40°, and excessive beams cannot be generated. Therefore, the fixed phase shifter generates a group of beams to basically meet a communication requirement. Then, the 1-bit adjustable phase shifter can divide beams at equal intervals in a larger angle range, but cannot finely adjust a beam in a small range, and the fixed phase shifter can adjust beams at unequal intervals in a small range, so that flexibility is stronger.

If the 1-bit adjustable phase shifter is also used in the vertical direction, beams are divided into four groups, namely, two beam groups in the horizontal direction and two beam groups in the vertical direction, thereby causing a significant decrease in a beam multiplexing rate. If the fixed phase shifter is used, beams are divided into two groups, namely, two beam groups in the horizontal direction and one beam group in the vertical direction, thereby improving a beam multiplexing rate.

Still further, in this embodiment of this application, each column of antenna elements in an antenna array includes a plurality of antenna elements, where each antenna element has a corresponding baseband weight in a vertical direction, and the baseband weight that is in the vertical direction and that is of the antenna array is used to determine a beam attribute that is in the vertical direction and that corresponds to a beam in a first beam group, or is used to determine a beam attribute that is in the vertical direction and that corresponds to a beam in a second beam group. In addition, there is an association relationship between a phase of the weight and a fixed phase angle. In the foregoing manner, the baseband weight that is in the vertical direction and that is of the antenna element may be set to determine the beam attribute that is in the vertical direction and that corresponds to the beam, thereby improving beam adjustment flexibility.

Based on FIG. 4 and the first to the fourth embodiments corresponding to FIG. 4, the antenna array of the antenna apparatus may be further arranged. For ease of understanding, the following describes the antenna array of the antenna apparatus by using three specific embodiments.

Embodiment 1

In one embodiment, based on FIG. 4, each column of antenna elements in an antenna array includes a first antenna element group and a second antenna element group, where the first antenna element group is connected to a first RF channel, and the second antenna element group is connected to a second RF channel.

The first antenna element group includes a first antenna element ($a_{11}$) and a second antenna element ($a_{21}$), and the second antenna element group includes a third antenna element ($a_{31}$) and a fourth antenna element ($a_{41}$).

In each column of antenna elements, the first antenna element ($a_{11}$) and the second antenna element ($a_{21}$) are adjacent, and the third antenna element ($a_{31}$) and the fourth antenna element ($a_{41}$) are adjacent.

Figure 7:
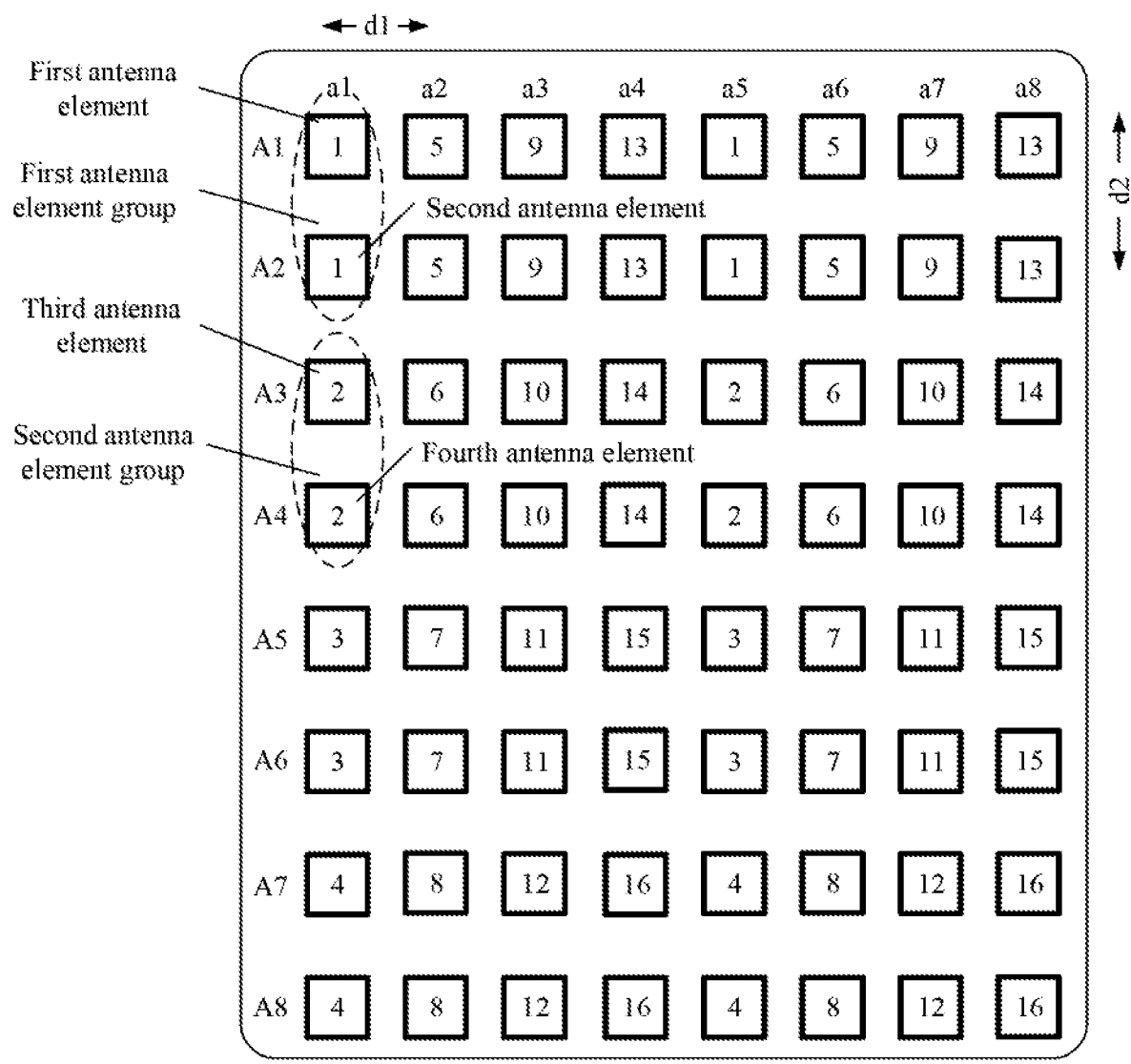
FIG. 7 is a schematic diagram (1) of a topology structure of an antenna array according to an embodiment of this application.

In this embodiment, the antenna array includes a plurality of columns of antenna elements, and each column of antenna elements includes a plurality of antenna elements. For ease of description, FIG. 7 is a schematic diagram (1) of a topology structure of an antenna array according to an embodiment of this application. As shown in the figure, a1 to a8 are respectively used to represent column sequence numbers corresponding to columns of antenna elements in the antenna array, and A1 to A8 are respectively used to represent row sequence numbers corresponding to rows of antenna elements in the antenna array. It may be understood that the column sequence number and the row sequence number in FIG. 7 are merely examples. In actual application, there may also be another sequence number writing manner.

Each column of antenna elements in the antenna array includes a first antenna element group and a second antenna element group. As shown in FIG. 7, a first column of antenna elements is used as an example. The first column of antenna elements includes the first antenna element group and the second antenna element group. The first antenna element group includes a first antenna element and a second antenna element. The first antenna element may be a $1^{st}$ antenna element corresponding to a first row in the antenna array, and the second antenna element may be a $1^{st}$ antenna element corresponding to a second row in the antenna array. For ease of description, the first antenna element may be named as $a_{11}$, and the second antenna element may be named as a21. Similarly, the second antenna element group includes a third antenna element and a fourth antenna element. The third antenna element may be a $1^{st}$ antenna element corresponding to a third row in the antenna array, and the fourth antenna element may be a $1^{st}$ antenna element corresponding to a fourth row in the antenna array. The third antenna element may be named as $a_{31}$, and the fourth antenna element may be named as $a_{41}$. Both the antenna elements in the first antenna element group are connected to a first RF channel, and both the antenna elements in the second antenna element group are connected to a second RF channel. The first RF channel may be an RF channel 1, and the second RF channel may be an RF channel 2. It may be understood that antenna elements with a same label in FIG. 7 represent a same RF channel.

In the first column of antenna elements, the first antenna element ($a_{11}$) and the second antenna element ($a_{21}$) are adjacent, and the third antenna element ($a_{31}$) and the fourth antenna element ($a_{41}$) are adjacent. Similarly, in another column of antenna elements, antenna elements that belong to a same RF channel in a vertical direction are also adjacently arranged. For example, in the first column of antenna elements, antenna elements that belong to an RF channel 3 are adjacently arranged. For another example, in a second column of antenna elements, antenna elements that belong to an RF channel 6 are adjacently arranged. This is not listed herein.

Figure 8:
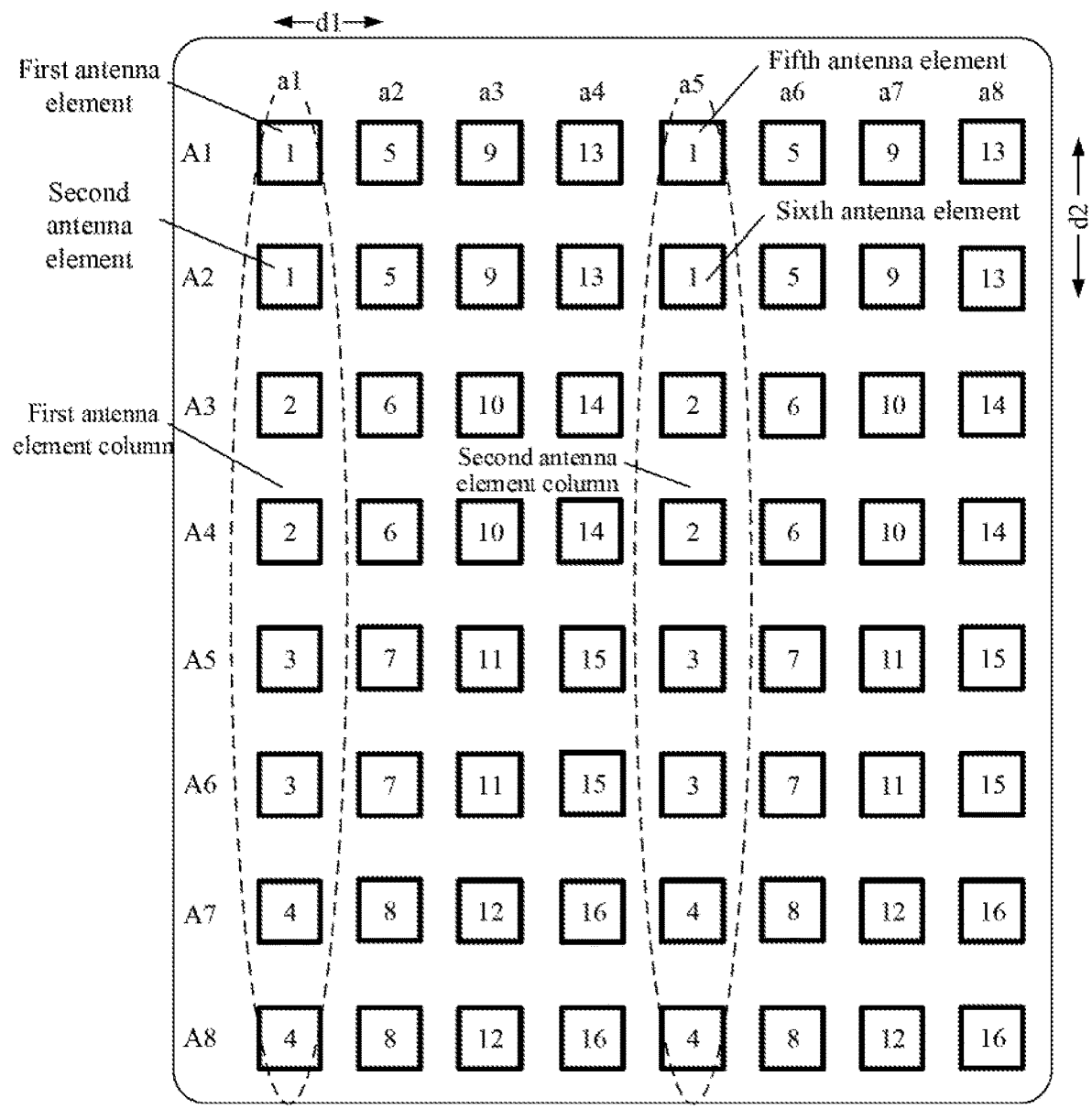
FIG. 8 is a schematic diagram (2) of a topology structure of an antenna array according to an embodiment of this application.

FIG. 8 is a schematic diagram (2) of a topology structure of an antenna array according to an embodiment of this application. As shown in the figure, it is assumed that a first column in the antenna array is a first antenna element column. For ease of description, the first antenna element column may be named as a1. Similarly, a second antenna element column may be named as a5. In the first antenna element column (a1), a first antenna element may be named as $a_{11}$, and a second antenna element may be named as $a_{21}$. In the second antenna element column (a5), a fifth antenna element may be named as $a_{15}$, and a sixth antenna element may be named as $a_{25}$.

Figure 9:
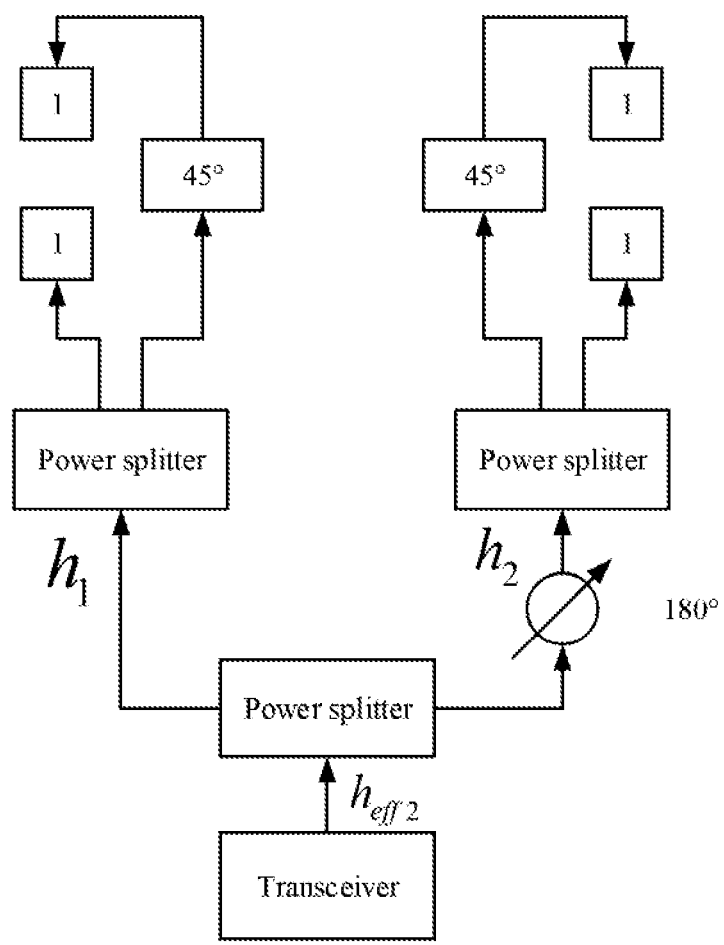
FIG. 9 is a schematic structural diagram of driving four antenna elements on a same channel according to an embodiment of this application.

The first antenna element ($a_{11}$), the second antenna element ($a_{21}$), the fifth antenna element ($a_{15}$), and the sixth antenna element ($a_{25}$) may be all connected to a same RF channel, to reduce a quantity of RF channels, and reduce costs of a multi-beam system. FIG. 9 is a schematic structural diagram of driving four antenna elements on a same channel according to an embodiment of this application. As shown in the figure, the antenna elements driven on the same RF channel are represented by using a same label. FIG. 9 shows a connection manner in which the four antenna elements are driven on one RF channel. A connection relationship among the four antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter.

It should be noted that the element arrangement manner and the element numbering manner that are shown in FIG. 7, FIG. 8, and FIG. 9 are merely examples, and should not be construed as a limitation on this application.

Specifically, according to one embodiment, if a spacing $d_1$ between adjacent antenna elements in a horizontal direction is 0.52, for example, the antenna array shown in FIG. 7 or FIG. 8, there are four antenna elements that space horizontal antenna elements driven on a same RF channel, in other words, M=4 (for example, the antenna elements are $a_{12}$, $a_{13}$, $a_{14}$, and $a_{15}$ during counting), and a preset beam orientation range is $\theta_{min}, \theta_{max} \in [-60°, 60°]$, k can be obtained through calculation according to the following formula, and k is an integer.

$$M \cdot \frac{2d_1}{\lambda} \sin(\theta_{min}) < k < M \cdot \frac{2d_1}{\lambda} \sin(\theta_{max})$$

$$\Rightarrow 4 \cdot \frac{2 \times 0.52\lambda}{\lambda} \sin(-60°) < k < 4 \cdot \frac{2 \times 0.52\lambda}{\lambda} \sin(60°)$$

$$\Rightarrow -3.6027 < k < 3.6027$$

$$\Rightarrow k = 0, \pm 1, \pm 2, \pm 3$$

Therefore, a possible value of k is obtained, k includes a plurality of $k_i$, and a beam orientation $\theta_i$ corresponding to a value of each $k_i$ is calculated. An example in which $k_i=1$ is used below for description. When $k_i=1$, a value of the beam orientation $\theta_i$ can be obtained through calculation according to the following formula:

$$M \cdot d_1 \sin(\theta_i) \cdot \frac{2\pi}{\lambda} = k_i \pi \quad (1)$$

$$\Rightarrow 4 \cdot 0.52\lambda \sin(\theta_i) \cdot \frac{2\pi}{\lambda} = \pi$$

$$\Rightarrow \theta_i = \arcsin\left(\frac{1}{4.16}\right)$$

$$\Rightarrow \theta_i = 13.9°$$

It can be learned, through calculation according to the formula (1), that the corresponding $\theta_i$ is 13.9° when $k_i=1$.

Then, when $\theta_i=13.9°$, corresponding baseband weights in a horizontal direction can be obtained according to the following formula:

$$\left[ 1 \quad \exp\left(-j \cdot d_1 \sin(\theta_i) \cdot \frac{2\pi}{\lambda}\right) \quad \exp\left(-j \cdot 2d_1 \sin(\theta_i) \cdot \frac{2\pi}{\lambda}\right) \quad \ldots \quad \exp\left(-j \cdot (M-1)d_1 \sin(\theta_i) \cdot \frac{2\pi}{\lambda}\right) \right] \Rightarrow \quad (2)$$

$$\left[ 1 \quad \exp\left(-j \cdot d_1 \sin(\theta_i) \cdot \frac{2\pi}{\lambda}\right) \quad \exp\left(-j \cdot 2d_1 \sin(\theta_i) \cdot \frac{2\pi}{\lambda}\right) \quad \exp\left(-j \cdot 3d_1 \sin(\theta_i) \cdot \frac{2\pi}{\lambda}\right) \right] \Rightarrow$$

$$[1 \quad \exp(-j \cdot 45°) \quad \exp(-j \cdot 90°) \quad \exp(-j \cdot 135°)]$$

In other words, the four horizontal weights are respectively 1, $\exp(-j \cdot 45°)$, $\exp(-j \cdot 90°)$, and $\exp(-j \cdot 135°)$.

Similarly, when a value of $k_i$ is another value, $\theta_i$ corresponding to $k_i$ and corresponding baseband weights can be also obtained through calculation according to the formulas $$M \cdot d_1 \sin(\theta_i) \cdot \frac{2\pi}{\lambda} = k_i \pi \text{ and}$$

$$\left[ 1 \quad \exp\left(\begin{array}{c} -j \cdot d_1 \\ \sin(\theta_i) \cdot \frac{2\pi}{\lambda} \end{array}\right) \quad \exp\left(\begin{array}{c} -j \cdot 2d_1 \\ \sin(\theta_i) \cdot \frac{2\pi}{\lambda} \end{array}\right) \quad \exp\left(\begin{array}{c} -j \cdot 3d_1 \\ \sin(\theta_i) \cdot \frac{2\pi}{\lambda} \end{array}\right) \right].$$

Seven beams are respectively obtained based on a calculation result, and a beam orientation, baseband weights, and a status of a 1-bit adjustable phase shifter that correspond to each beam are shown in Table 1.

TABLE 1

| Beam sequence number | Beam orientation | Baseband weight 1 | Baseband weight 2 | Baseband weight 3 | Baseband weight 4 | Phase of an adjustable phase shifter |
|---|---|---|---|---|---|---|
| 1 | 46.2° | 1 | $\exp(-j \cdot 135°)$ | $\exp(-j \cdot 270°)$ | $\exp(-j \cdot 45°)$ | 180° |
| 3 | 13.9° | 1 | $\exp(-j \cdot 45°)$ | $\exp(-j \cdot 90°)$ | $\exp(-j \cdot 135°)$ | 180° |
| 5 | -13.9° | 1 | $\exp(j \cdot 45°)$ | $\exp(j \cdot 90°)$ | $\exp(j \cdot 135°)$ | 180° |
| 7 | -46.2° | 1 | $\exp(j \cdot 135°)$ | $\exp(j \cdot 270°)$ | $\exp(j \cdot 45°)$ | 180° |
| 2 | 28.7° | 1 | $\exp(-j \cdot 90°)$ | $\exp(-j \cdot 180°)$ | $\exp(-j \cdot 270°)$ | 0° |
| 4 | 0° | 1 | 1 | 1 | 1 | 0° |
| 6 | -28.7° | 1 | $\exp(j \cdot 90°)$ | $\exp(j \cdot 180°)$ | $\exp(j \cdot 270°)$ | 0° |

An adjustable angle of the 1-bit adjustable phase shifter may be 0° or 180°. With reference to the formula (1), the formula (2), and the content shown in Table 1, when the beam sequence number is 1, correspondingly, $k_i=3$; when the beam sequence number is 3, correspondingly, $k_i=1$; when the beam sequence number is 5, correspondingly, $k_i=-1$; when the beam sequence number is 7, correspondingly, $k_i=-3$; when the beam sequence number is 2, correspondingly, $k_i=2$; when the beam sequence number is 4, correspondingly, $k_i=0$; and when the beam sequence number is 6, correspondingly, $k_i=-2$.

When the angle of the 1-bit adjustable phase shifter is 180°, the angle of the 1-bit adjustable phase shifter corresponds to four beams, and the four beams may be used as a first beam group. When the angle of the 1-bit adjustable phase shifter is 0°, the angle of the 1-bit adjustable phase shifter corresponds to three beams, and the three beams may be used as a second beam group. Alternatively, when the angle of the 1-bit adjustable phase shifter is 180°, the angle of the 1-bit adjustable phase shifter corresponds to four beams, and the four beams may be used as a second beam group. When the angle of the 1-bit adjustable phase shifter is 0°, the angle of the 1-bit adjustable phase shifter corresponds to three beams, and the three beams may be used as a first beam group.

Figure 10:
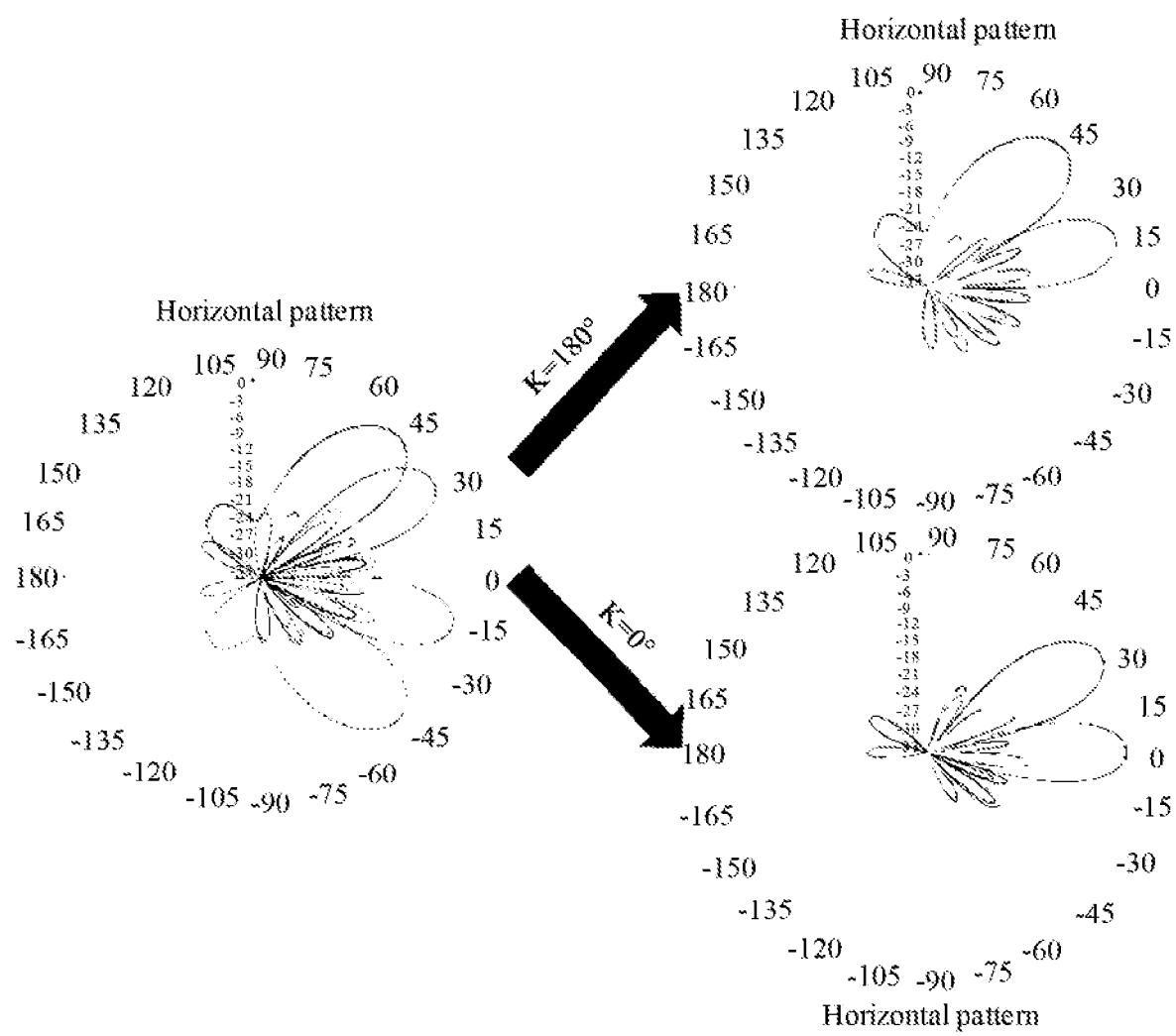
FIG. 10 is a schematic diagram of beams in a first beam group and a second beam group in a horizontal direction according to an embodiment of this application.

FIG. 10 is a schematic diagram of beams in a first beam group and a second beam group in a horizontal direction according to an embodiment of this application. As shown in the figure, seven beams actually alternately correspond to a case in which a 1-bit adjustable phase shifter is 0° and 180°. Therefore, the seven beams do not coexist. When the 1-bit adjustable phase shifter is 180°, the 1-bit adjustable phase shifter corresponds to four beams on the upper right in FIG. 10. When the 1-bit adjustable phase shifter is 0°, the 1-bit adjustable phase shifter corresponds to three beams on the lower right in FIG. 10. The 1-bit adjustable phase shifter completes beam grouping, and interference between beams in the group is relatively small.

It can be learned, from FIG. 10 through analysis, that a plurality of beams can be formed in the horizontal direction, the beam grouping is completed by using the 1-bit adjustable phase shifter, and beams in a same group have high isolation characteristics. The 1-bit adjustable phase shifter switches between the first beam group and the second beam group with reference to a baseband weight.

The foregoing content mainly describes a method for calculating the baseband weight in the horizontal direction. The following describes a method for calculating a fixed phase difference in a vertical direction.

Specifically, according to one embodiment as shown in FIG. 4, when N=1, a difference between a phase of an actual weight and a phase of an ideal weight is smallest, in other words, a minimum mean square error can be obtained. Therefore, when N=1, the fixed phase difference $\Delta\phi$ can be obtained through calculation according to the following formula:

$$\Delta\phi = \frac{1}{4}\sum_{i=1:n} d_2 \sin(\varphi_i) \cdot \frac{2\pi}{\lambda} \quad (3)$$

It can be learned from the antenna arrays in FIG. 7 and FIG. 8 that four beams are generated in a vertical direction, beam downtilts $\varphi_i$ of the beams are respectively 2°, 5°, 11°, and 20°, and $\Delta\phi=47.5$ is obtained through calculation after the beam downtilts $\varphi_i$ are substituted into the formula (3). Considering a physical characteristic of a fixed phase shifter, $\Delta\phi=47.5°$ is quantized to $\Delta\phi=45°$, and a spacing distance between two adjacent antenna elements that belong to a same RF channel may be specifically $d_2=0.78\lambda$.

Based on the antenna arrays shown in FIG. 7 and FIG. 8, after two antenna elements are driven on one RF channel in a vertical direction and a spacing between two vertically adjacent antenna elements is $d_2=0.78\lambda$, the fixed phase difference (for example, $\Delta\phi=45°$) can be designed, so that a vertical beam directivity pattern of a beam can be close to a case in which one antenna element is driven on one RF channel. Referring to FIG. 11(a), FIG. 11(b), FIG. 11(c), and FIG. 11(d), the four figures respectively correspond to vertical beam directivity patterns in which beam downtilts are 2°, 5°, 11°, and 20°.

Figure 11A:
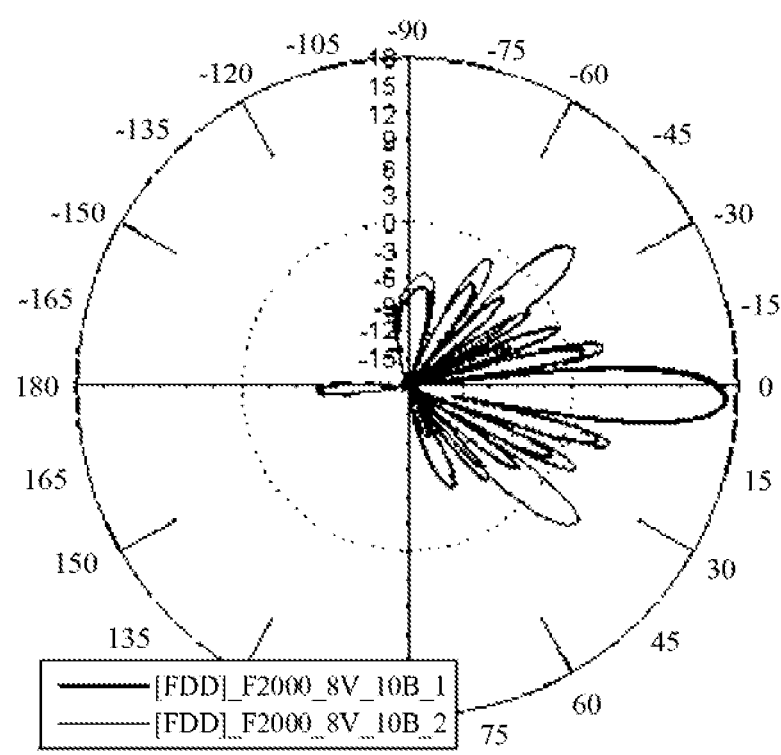
FIG. 11(a) is a vertical beam directivity pattern in which a beam downtilt is 2° according to an embodiment of this application.

As shown in FIG. 11(a), when a beam downtilt is 2°, it can be learned that "[FDD]_F2000 B_10B_1" is a vertical beam directivity pattern in which one antenna element is driven on one RF channel, and "[FDD]_F2000_BV_10B_2" is a vertical beam directivity pattern in which two antenna elements are driven on one RF channel in this application.

Figure 11B:
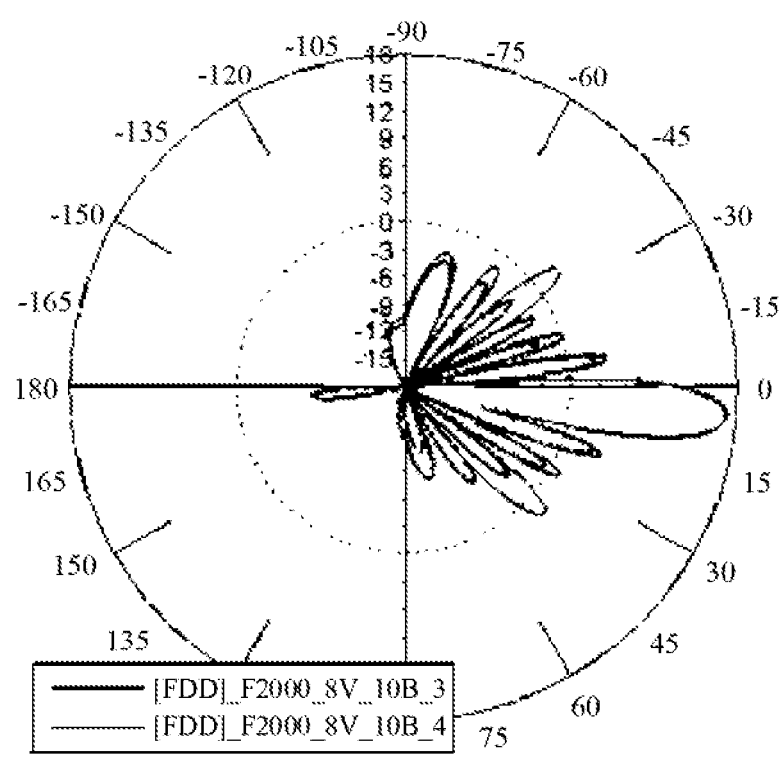
FIG. 11(b) is a vertical beam directivity pattern in which a beam downtilt is 5° according to an embodiment of this application.

As shown in FIG. 11(b), when a beam downtilt is 5°, it can be learned that "[FDD]_F2000 B_10B_3" is a vertical beam directivity pattern in which one antenna element is driven on one RF channel, and "[FDD]_F2000_BV_10B_4" is a vertical beam directivity pattern in which two antenna elements are driven on one RF channel in this application.

Figure 11C:
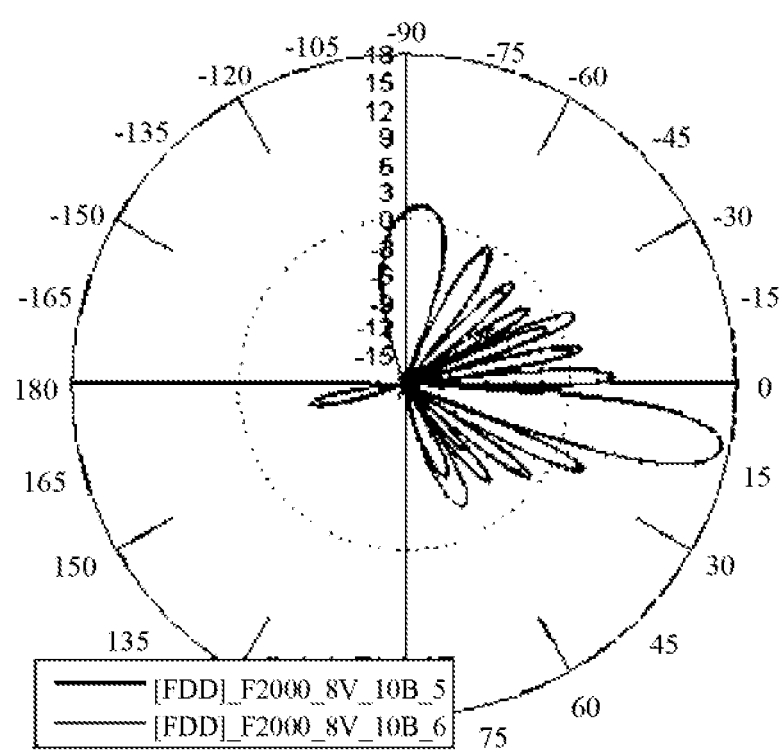
FIG. 11(c) is a vertical beam directivity pattern in which a beam downtilt is 11° according to an embodiment of this application.

As shown in FIG. 11(c), when a beam downtilt is 11°, it can be learned that "[FDD]_F2000 B_10B_5" is a vertical beam directivity pattern in which one antenna element is driven on one RF channel, and "[FDD]_F2000_BV_10B_6" is a vertical beam directivity pattern in which two antenna elements are driven on one RF channel in this application.

Figure 11D:
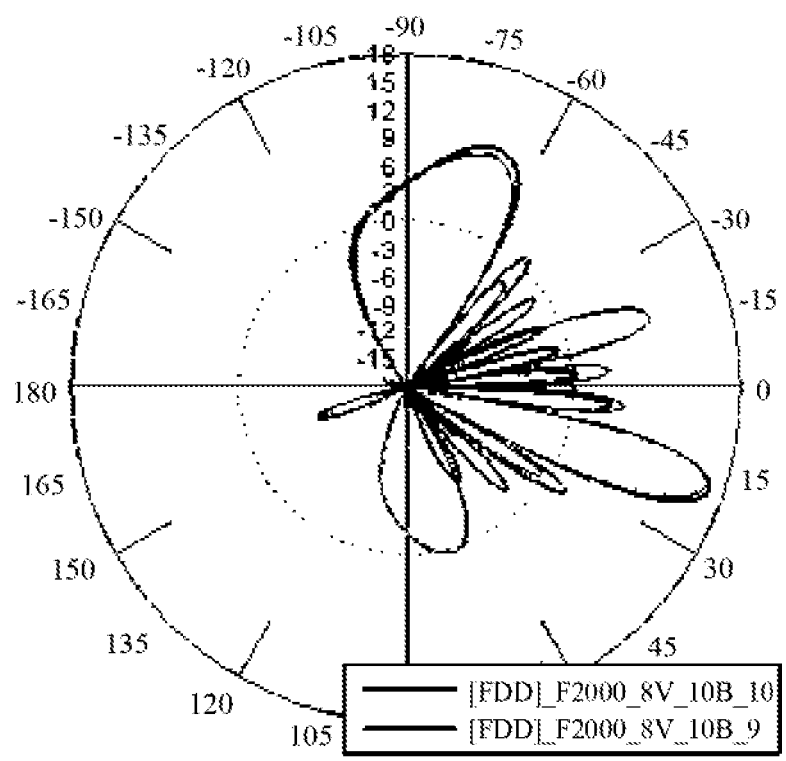
FIG. 11(d) is a vertical beam directivity pattern in which a beam downtilt is 20° according to an embodiment of this application.

As shown in FIG. 11(d), when a beam downtilt is 20°, it can be learned that "[FDD]_F2000 B_10B_10" is a vertical beam directivity pattern in which one antenna element is driven on one RF channel, and "[FDD]_F2000_BV_10B_9" is a vertical beam directivity pattern in which two antenna elements are driven on one RF channel in this application.

If two antenna elements are driven on one RF channel in Embodiment 1, when the beam downtilt is 2°, an antenna gain loss in this application is approximately 0.70 decibel (decibel, dB); when the beam downtilt is 5°, an antenna gain loss in this application is approximately 0.35 dB; when the beam downtilt is 11°, an antenna gain loss in this application is approximately 0.01 dB; or when the beam downtilt is 20°, an antenna gain loss in this application is approximately 0.18 dB. Compared with a case in which one antenna element is driven on one RF channel, in this embodiment of this application, an antenna gain loss is very small, and only a side lobe increases at some angles.

Still further, the topology structure of the antenna array is described in detail in this embodiment of this application. In brief, in the antenna array, a distance between a plurality of antenna elements driven on a same RF channel needs to be as large as possible in a horizontal direction, and the antenna elements are adjacently arranged in a vertical direction. In the foregoing arrangement manner, a plurality of beams can be formed in the horizontal direction, beam grouping is completed by using a 1-bit adjustable phase shifter, and both beams in a first beam group and a second beam group have high isolation. A manner in which the plurality of antenna elements are driven on the same RF channel is used in the vertical direction, thereby effectively reducing a quantity of RF channels, and greatly reducing system complexity and costs.

Figure 12:
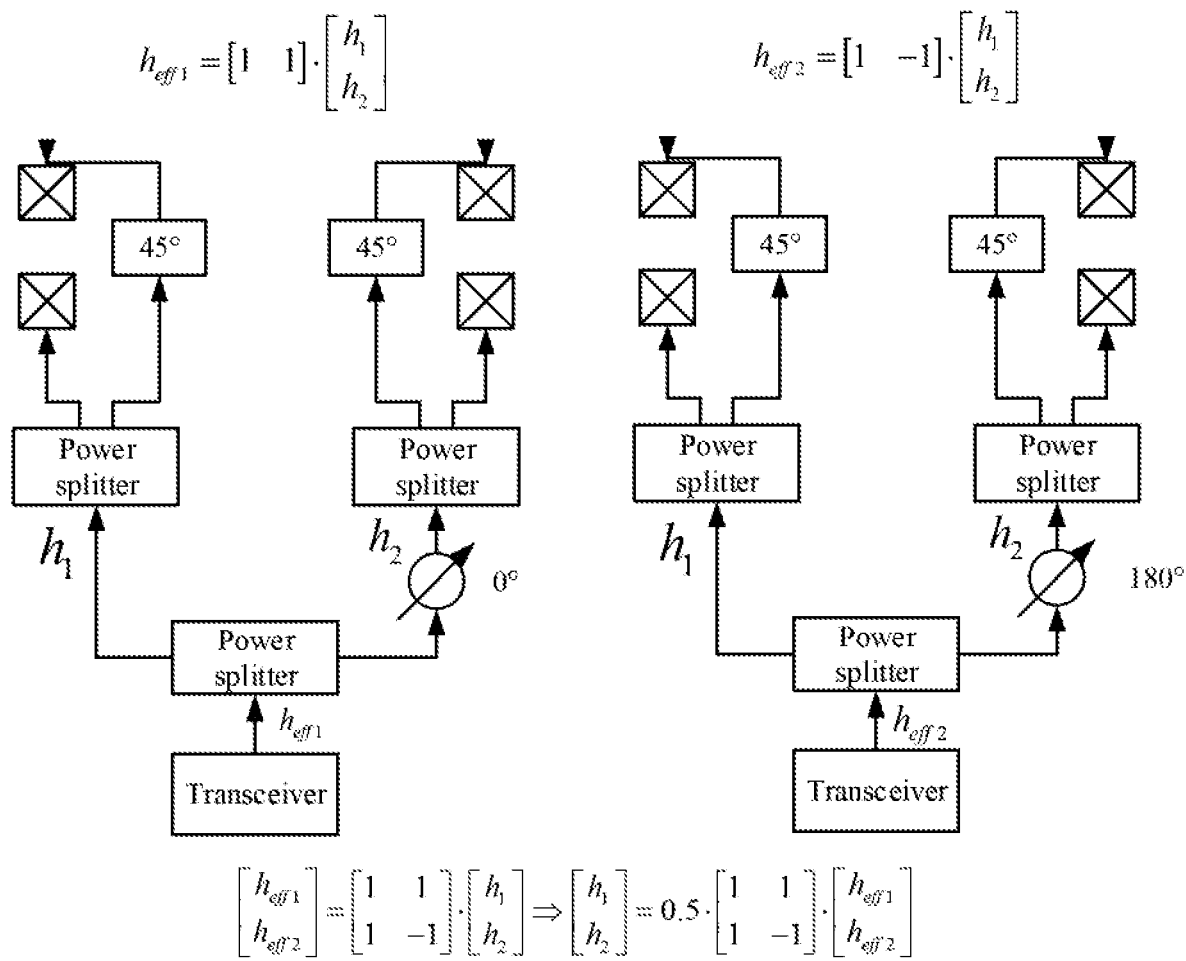
FIG. 12 is a schematic diagram of recovering a channel in a horizontal direction according to an embodiment of this application.

For ease of understanding, the following describes characteristics in Embodiment 1 of this application with reference to the text and the accompanying drawings. Details are as follows:

FIG. 12 is a schematic diagram of recovering a channel in a horizontal direction according to an embodiment of this application. Because there is a 1-bit adjustable phase shifter, two horizontally combined channels, namely, $h_{eff\,1}$ and $h_{eff\,2}$ may be respectively obtained at two adjacent moments, where $h_{eff1}=h_1+h_2$, and $h_{eff2}=h_1-h_2$. Therefore, $h_1$ and $h_2$ can be obtained through calculation based on $h_{eff\,1}$ and $h_{eff\,2}$ according to the following formula:

$$\begin{bmatrix} h_{eff1} \\ h_{eff2} \end{bmatrix} = \begin{bmatrix} 1 & 1 \\ 1 & -1 \end{bmatrix} \cdot \begin{bmatrix} h_1 \\ h_2 \end{bmatrix} \Rightarrow \begin{bmatrix} h_1 \\ h_2 \end{bmatrix} = 0.5 \cdot \begin{bmatrix} 1 & 1 \\ 1 & -1 \end{bmatrix} \cdot \begin{bmatrix} h_{eff1} \\ h_{eff2} \end{bmatrix} \quad (4)$$

Figure 13:
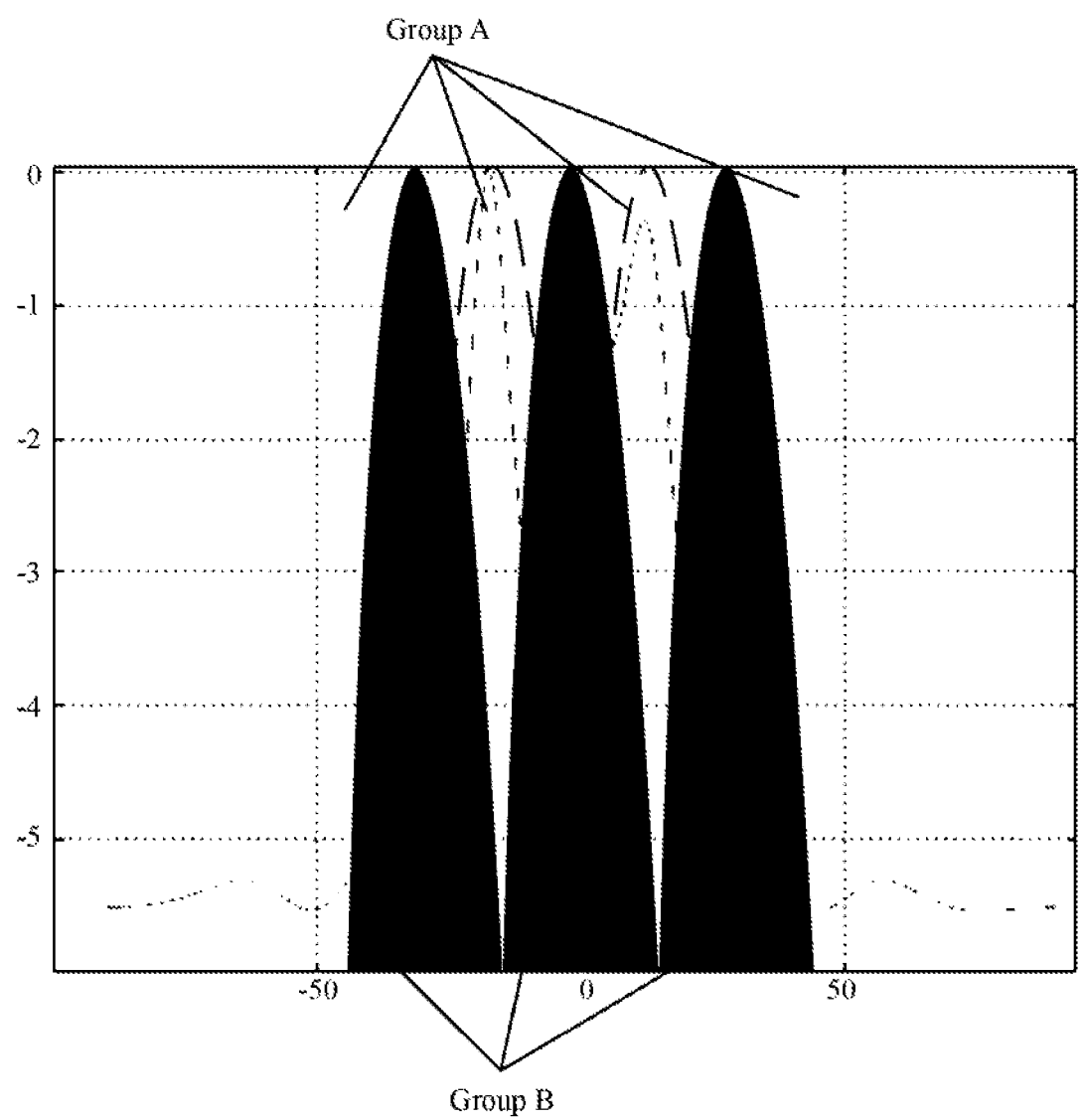
FIG. 13 is a schematic diagram of multi-beam scheduling based on angle power spectrum estimation according to an embodiment of this application.

After an original channel of a horizontal antenna element is obtained, an angle power spectrum can be estimated, so that a plurality of beams are selected to better serve a user. The power spectrum is short for a power spectrum density function, is defined as a signal power in a unit frequency band, and is mainly used to represent a status in which the signal power changes with a frequency, namely, a distribution status of the signal power in frequency domain. FIG. 13 is a schematic diagram of multi-beam scheduling based on angle power spectrum estimation according to an embodiment of this application. As shown in the figure, a value on a horizontal coordinate in the figure is used to represent an angle degree, and a value on a vertical coordinate is used to represent a normalized signal power in a unit of dB. When an angle power spectrum estimation result in a solid curve in the figure is obtained, beams in two middle dashed curves can be selected from a group A to serve a user, to match a channel characteristic to a maximum extent. FIG. 13 further includes two beam groups, namely, the group A and a group B. The group A includes four beams, and the group B includes three antenna groups. It may be understood that if the group A is a first beam group, the group B is a second beam group. If the group A is a second beam group, the group B is a first beam group.

It can be easily learned from the foregoing analysis that the topology structure that is of the antenna array and that corresponds to Embodiment 1 has a full-degree of freedom channel recovery capability in a horizontal direction. Only a horizontally combined channel can be usually recovered. However, in this application, a channel that is of each antenna element and that exists before horizontal combination can be recovered, to help select a proper beam. A channel degree of freedom refers to a quantity of dimensions of received signal space, namely, a quantity of channels for independently transmitting a signal. In a communication process, a better channel degree of freedom is always desired to be obtained, so that a communication channel capacity can be increased, thereby increasing a system throughput.

FIG. 14 is a schematic diagram of a normalized Chebyshev weight according to an embodiment of this application. As shown in the figure, during weighting of an antenna element in a horizontal direction, a Chebyshev weight may be usually selected to suppress a side lobe. The Chebyshev weight is characterized by a high power of a middle antenna element, and low powers of antenna elements on both sides. Weights of eight columns of antenna elements suppressed by a 20 dB side lobe are used as examples. Normalization processing is performed by using a single channel power that does not exceed ⅛ of a total power, and a radiated power 0.634 of the Chebyshev weight can be obtained through calculation, in other words, power efficiency is only 63.4%. Consequently, a power loss is relatively large.

Figure 15:
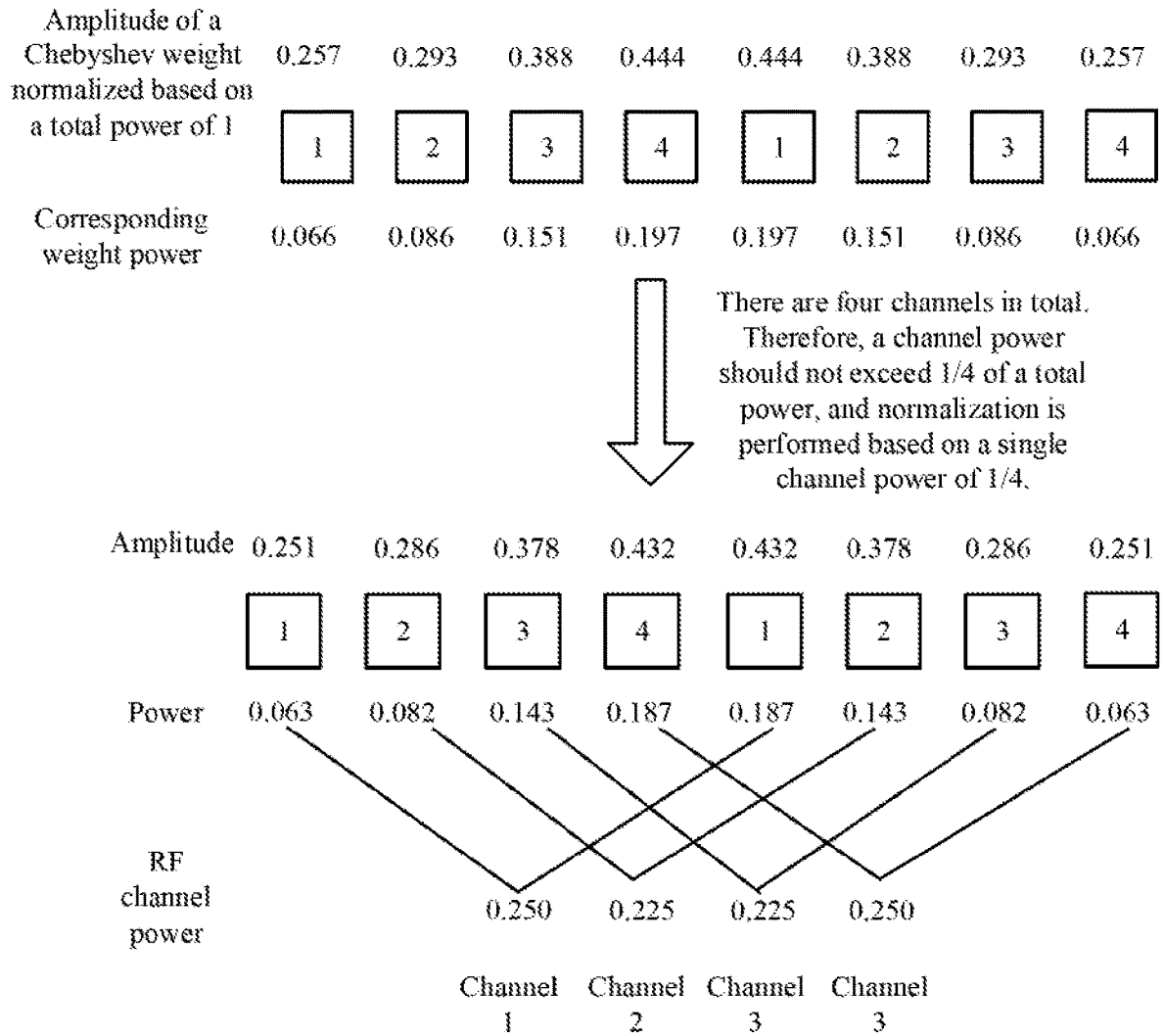
FIG. 15 is a schematic diagram of a normalized channel power according to an embodiment of this application.

In comparison, a power loss can be effectively reduced by using the topology structure that is of the antenna array and that corresponds to Embodiment 1 of this application. FIG. 15 is a schematic diagram of a normalized channel power according to an embodiment of this application. As shown in the figure, weights of eight columns of antenna elements suppressed by a 20 dB side lobe are used as examples. Normalization processing is performed by using a single channel power that does not exceed ¼ of a total power. It can be learned that one of two antenna elements driven on each RF channel is exactly at the edge and the other is exactly in the middle. Although power distribution of the antenna elements is uneven as that in FIG. 14, power balance between channels is very good after the antenna elements are combined into a channel. Relatively good power balance is specifically represented as follows: Powers of RF channels are close to each other. When the powers are closer to each other, a normalized power loss is less. Therefore, power efficiency corresponding to FIG. 15 can reach 95%.

Embodiment 2

In one embodiment, based on FIG. 4, the antenna array may include a first antenna element column (b1).

The first antenna element column (b1) includes a first antenna element group and a second antenna element group, the first antenna element group is connected to a first RF channel, the second antenna element group is connected to a second RF channel, the first antenna element group includes a first antenna element ($b_{11}$) and a second antenna element ($b_{21}$), and the second antenna element group includes a third antenna element ($b_{31}$) and a fourth antenna element ($b_{41}$).

In the first antenna element column (b1), the first antenna element ($b_{11}$) and the second antenna element ($b_{21}$) are adjacent, and the third antenna element ($b_{31}$) and the fourth antenna element ($b_{41}$) are adjacent.

Figure 16:
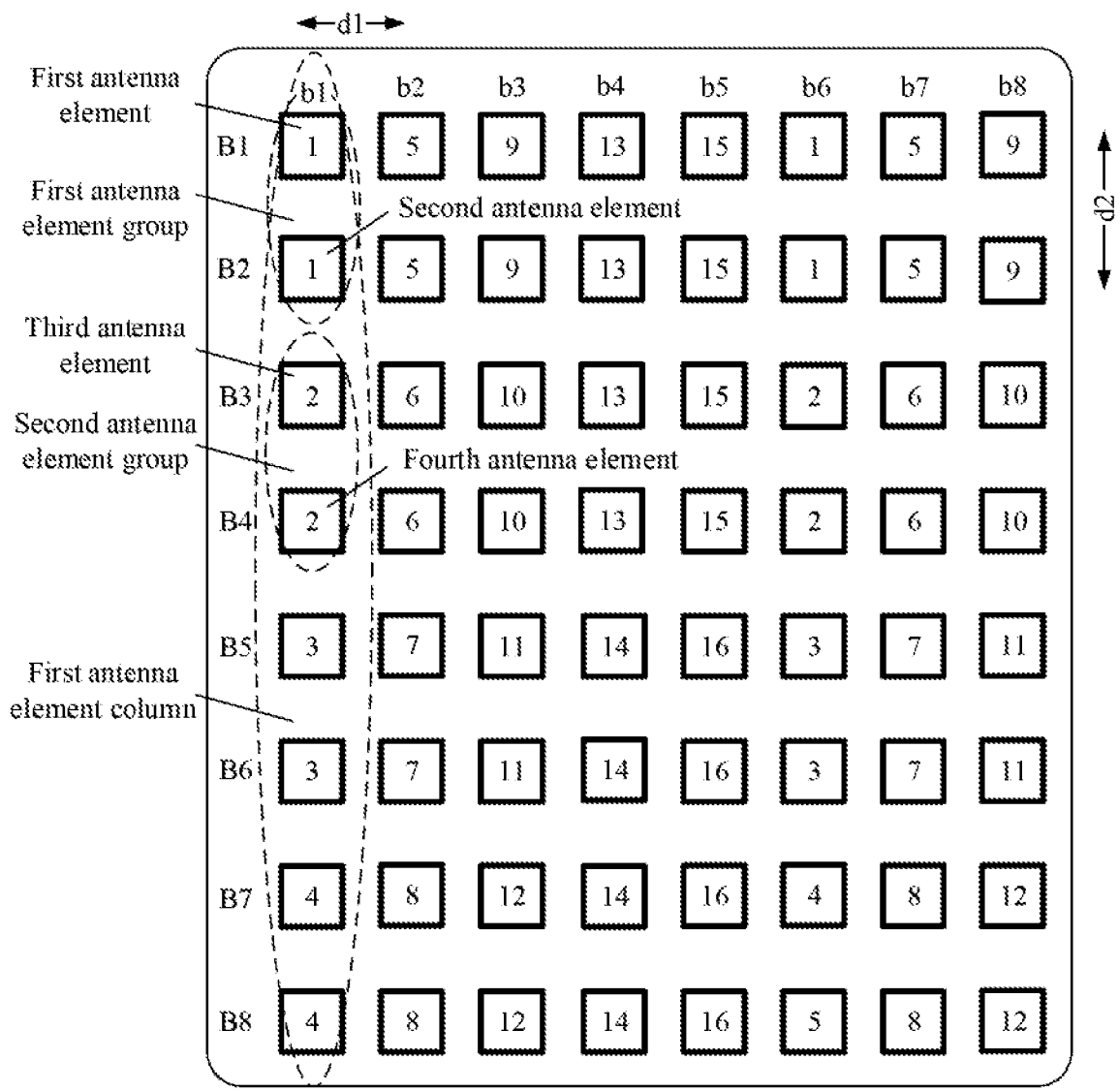
FIG. 16 is a schematic diagram (1) of another topology structure of an antenna array according to an embodiment of this application.

In this embodiment, the antenna array includes a plurality of columns of antenna elements, and each column of antenna elements includes a plurality of antenna elements. For ease of description, FIG. 16 is a schematic diagram (1) of another topology structure of an antenna array according to an embodiment of this application. As shown in the figure, b1 to b8 are respectively used to represent column sequence numbers corresponding to columns of antenna elements in the antenna array, and B1 to B8 are respectively used to represent row sequence numbers corresponding to rows of antenna elements in the antenna array. It may be understood that the column sequence number and the row sequence number in FIG. 16 are merely examples. In actual application, there may also be another sequence number writing manner.

A first antenna element column (b1) in the antenna array includes a first antenna element group and a second antenna element group. As shown in FIG. 16, it is assumed that a first column in the antenna array is the first antenna element column. For ease of description, the first antenna element column may be named as b 1, and the first antenna element column (b1) includes the first antenna element group and the second antenna element group. The first antenna element group includes a first antenna element and a second antenna element. The first antenna element may be a $1^{st}$ antenna element corresponding to a first row in the antenna array, and the second antenna element may be a $1^{st}$ antenna element corresponding to a second row in the antenna array. For ease of description, the first antenna element may be named as b11, and the second antenna element may be named as b21. Similarly, the second antenna element group includes a third antenna element and a fourth antenna element. The third antenna element may be a $1^{st}$ antenna element corresponding to a third row in the antenna array, and the fourth antenna element may be a $1^{st}$ antenna element corresponding to a fourth row in the antenna array. The third antenna element may be named as $b_{31}$, and the fourth antenna element may be named as $b_{41}$. Both the antenna elements in the first antenna element group are connected to a first RF channel, and both the antenna elements in the second antenna element group are connected to a second RF channel. The first RF channel may be an RF channel 1, and the second RF channel may be an RF channel 2. It may be understood that antenna elements with a same label in FIG. 16 represent a same RF channel.

In the first column (b1) of antenna elements, the first antenna element ($b_{11}$) and the second antenna element ($b_{21}$) are adjacent, and the third antenna element ($b_{31}$) and the fourth antenna element ($b_{41}$) are adjacent. Similarly, in another column of antenna elements, antenna elements that belong to a same RF channel in a vertical direction are also adjacently arranged. For example, in the first column (b1) of antenna elements, antenna elements that belong to an RF channel 3 are adjacently arranged. For another example, in a second column (b2) of antenna elements, antenna elements that belong to an RF channel 6 are adjacently arranged. This is not listed herein.

Figure 17:
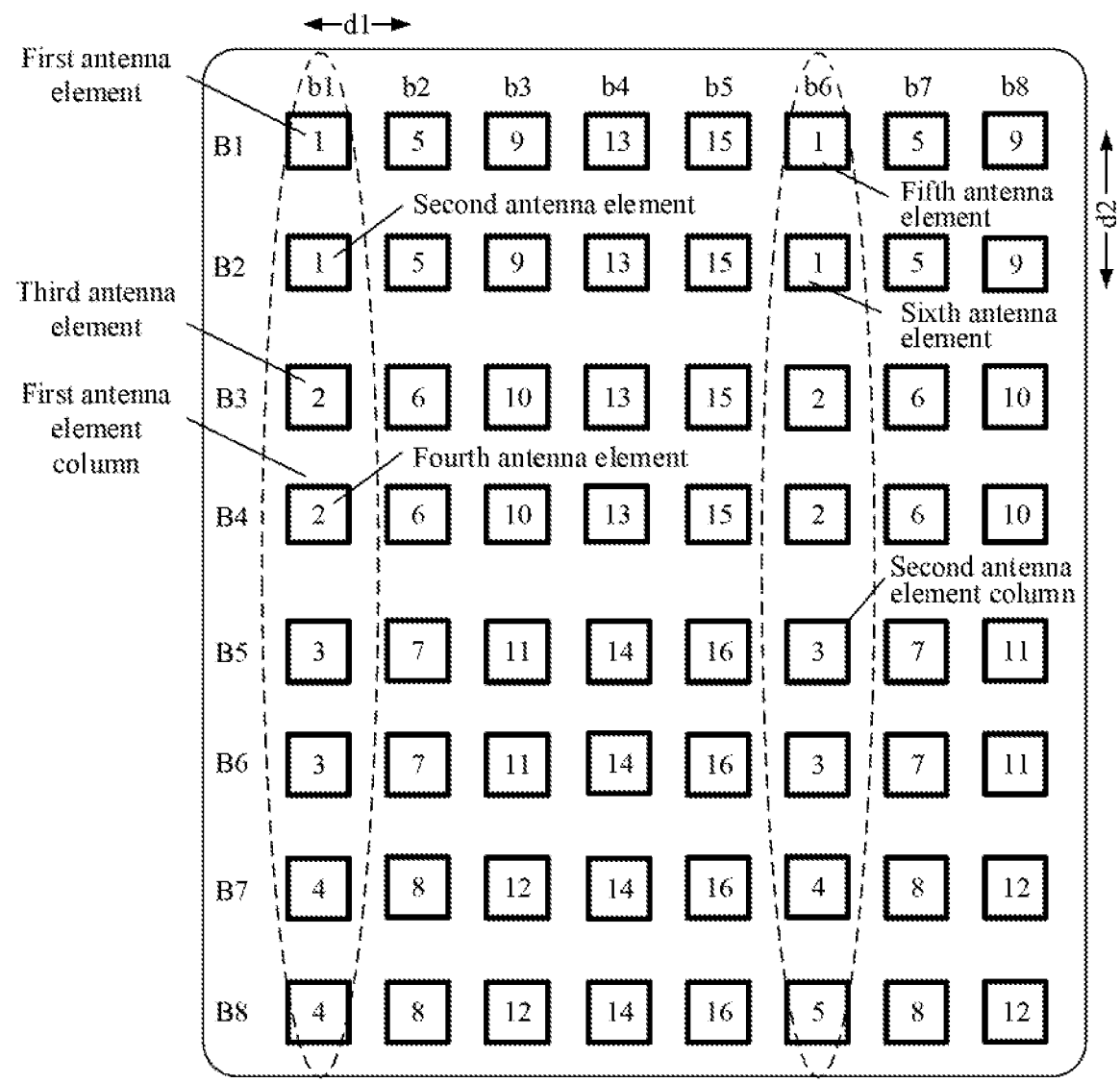
FIG. 17 is a schematic diagram (2) of another topology structure of an antenna array according to an embodiment of this application.

FIG. 17 is a schematic diagram (2) of another topology structure of an antenna array according to an embodiment of this application. As shown in the figure, it is assumed that a first column in the antenna array is a first antenna element column. For ease of description, the first antenna element column may be named as b 1. Similarly, a second antenna element column may be named as b6. In the first antenna element column (b1), a first antenna element may be named as b11, and a second antenna element may be named as $b_{21}$. In the second antenna element column (b6), a fifth antenna element may be named as $b_{16}$, and a sixth antenna element may be named as b26.

Figure 18:
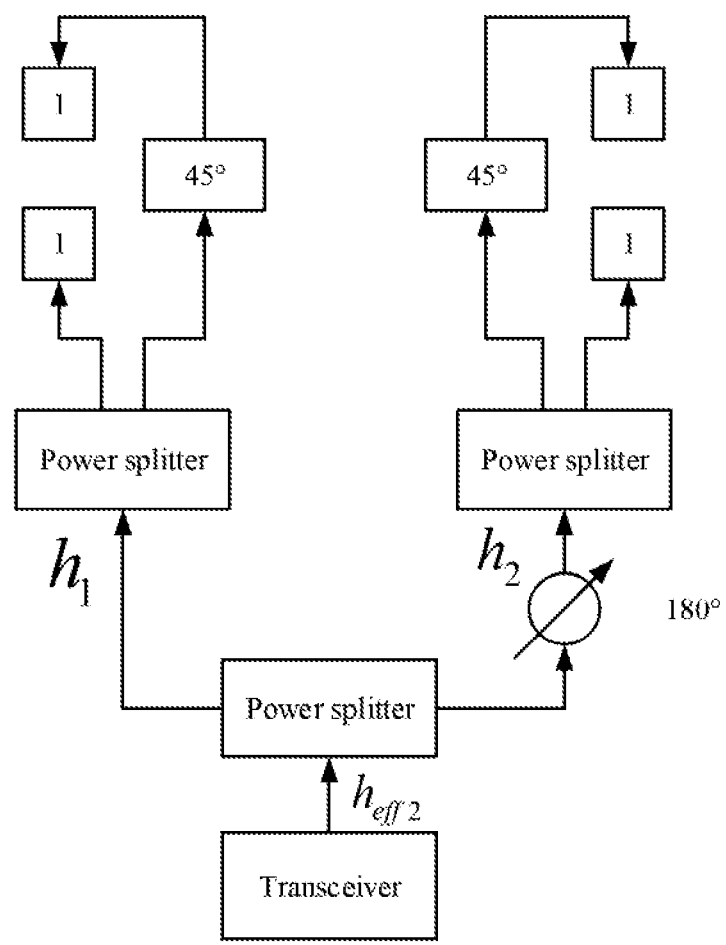
FIG. 18 is a schematic structural diagram of driving four antenna elements on a same channel according to an embodiment of this application.

The first antenna element ($b_{11}$), the second antenna element ($b_{21}$), the fifth antenna element ($b_{16}$), and the sixth antenna element ($b_{26}$) may be all connected to a same RF channel, to reduce a quantity of RF channels, and reduce costs of a multi-beam system. FIG. 18 is a schematic structural diagram of driving four antenna elements on a same channel according to an embodiment of this application. As shown in the figure, the antenna elements driven on the same RF channel are represented by using a same label. FIG. 18 shows a connection manner in which the four antenna elements are driven on one RF channel. A connection relationship among the four antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter.

Figure 19:
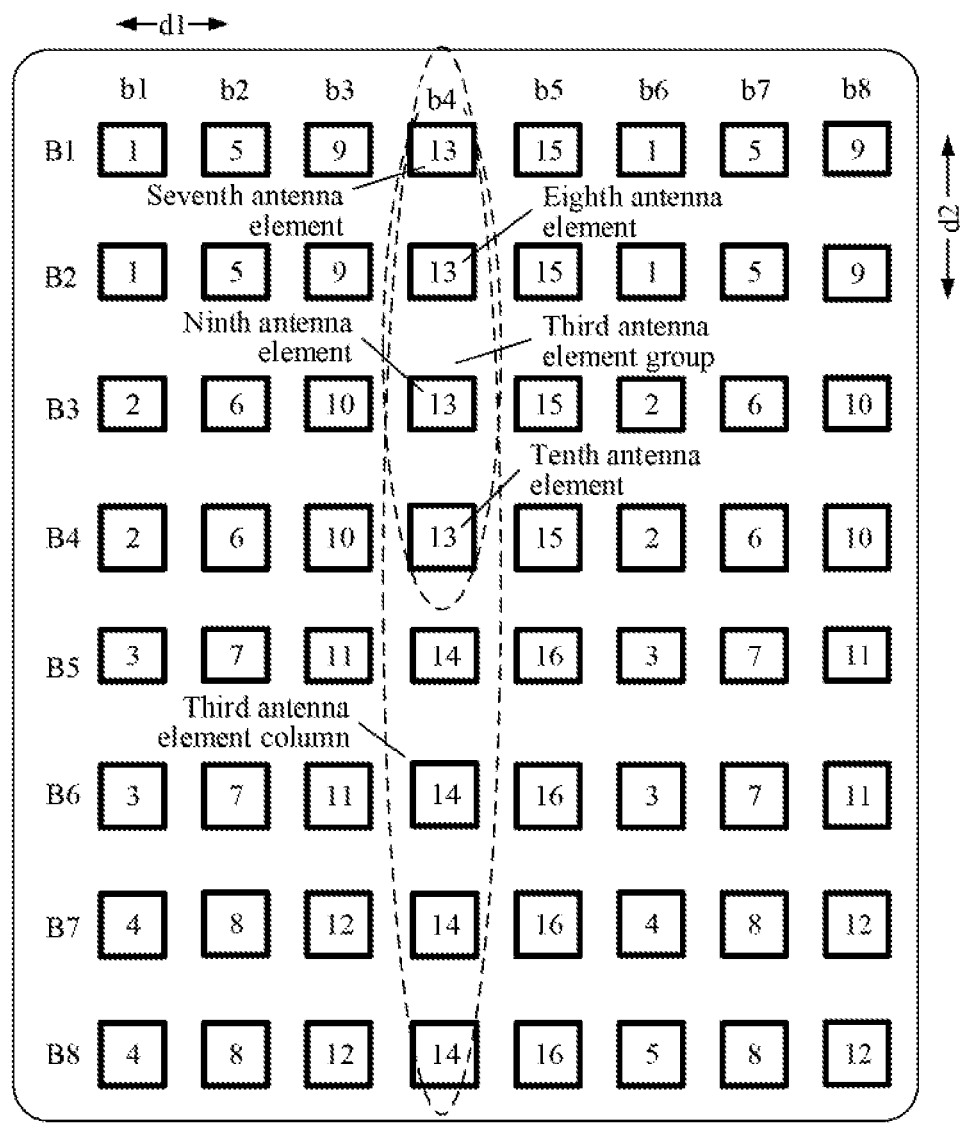
FIG. 19 is a schematic diagram (3) of another topology structure of an antenna array according to an embodiment of this application.

FIG. 19 is a schematic diagram (3) of a topology structure of an antenna array according to an embodiment of this application. As shown in the figure, it is assumed that a fourth column in the antenna array is a third antenna element column. For ease of description, the third antenna element column may be named as b4. The third antenna element column (b4) includes a third antenna element group, the third antenna element group is connected to a third RF channel, and the third antenna element group includes a seventh antenna element, an eighth antenna element, a ninth antenna element, and a tenth antenna element. For ease of description, the seventh antenna element may be named as $b_{14}$, the eighth antenna element may be named as $b_{24}$, the ninth antenna element may be named as $b_{34}$, and the tenth antenna element may be named as $b_{44}$.

Figure 20:
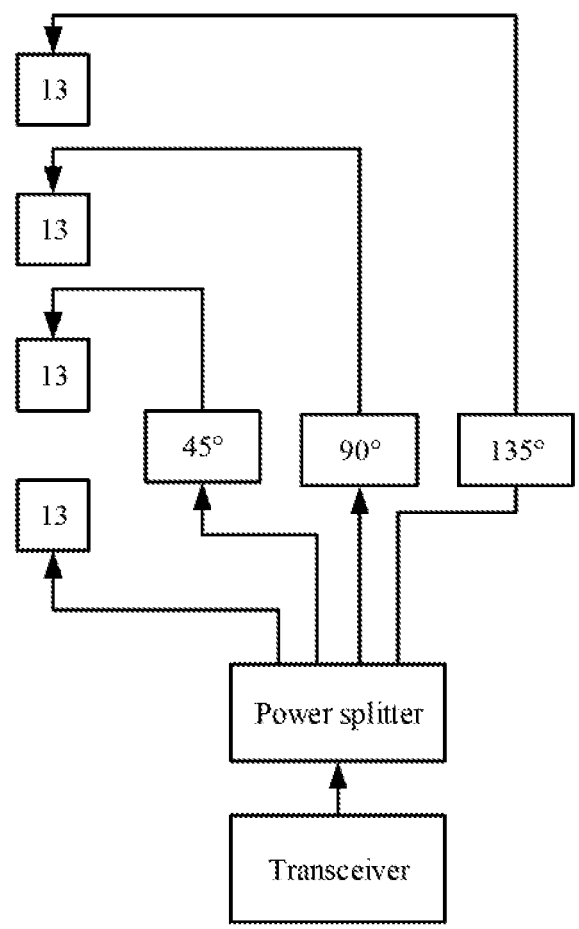
FIG. 20 is a schematic structural diagram of driving four antenna elements in a vertical direction on a same channel according to an embodiment of this application.

The seventh antenna element ($b_{14}$), the eighth antenna element ($b_{24}$), the ninth antenna element ($b_{34}$), and the tenth antenna element ($b_{44}$) may be all connected to a same RF channel, to reduce a quantity of RF channels, and reduce costs of a multi-beam system. FIG. 20 is a schematic structural diagram of driving four antenna elements in a vertical direction on a same channel according to an embodiment of this application. As shown in the figure, the antenna elements driven on the same RF channel are represented by using a same label. A connection relationship among the four antenna elements driven on the same RF channel is represented as follows: A phase difference between antenna elements in the vertical direction may be implemented by using a fixed phase shifter.

It should be noted that the element arrangement manner and the element numbering manner that are shown in FIG. 16 to FIG. 20 are merely examples, and should not be construed as a limitation on this application.

An arrangement manner of antenna elements in the antenna array is shown based on FIG. 16, FIG. 17, and FIG. 19. Antenna elements driven on the same RF channel are represented by using a same numeric label symbol.

It can be learned that an RF channel 1 to an RF channel 12 are characterized by: A distance between elements driven on the same radio frequency channel needs to be as large as possible in a horizontal direction, and needs to be as small as possible in a vertical direction. Compared with Embodiment 1, a value of a spacing M between horizontal elements driven on the same RF channel is increased from 4 to 5, to increase a quantity of beams. An arrangement manner of antenna elements corresponding to an RF channel 13 to an RF channel 16 is changed, to be specific, antenna elements that belong to a same RF channel in a vertical direction are adjacently arranged. In addition, the RF channel 13 to the RF channel 16 are driven by using a PA with a high power, to ensure coverage of a control channel and the like.

Similar to Embodiment 1, a subarray connection manner in which four antenna elements are driven on one RF channel is used on the RF channel 1 to the RF channel 12. Different from Embodiment 1, a subarray connection manner in which four antenna elements in a vertical direction are driven on one RF channel is used on the RF channel 13 to the RF channel 16. Both the subarray connection manners are fixed phase shift manners.

Based on the antenna element arrangement corresponding to Embodiment 2, a cell reference signal (cell reference signal, CRS) needs to be sent on a physical downlink control channel (PDCCH) and a physical broadcast channel (PBCH) by using a wide beam under constraint of existing protocols such as UMTS and LTE, to ensure coverage. Compared with Embodiment 1, in Embodiment 2, the wide beam can be formed by using the RF channel 13 to the RF channel 16, and is used to send the CRS on the PDCCH and the PBCH. When a narrow beam is formed by using the RF channel 1 to the RF channel 16 to send a signal on a physical downlink shared channel (PDSCH), all the RF channels participate in transmission. Therefore, a power additionally transmitted by the PA with the high power needs to be pre-corrected. If the power transmitted by the PA with the high power is greater than 6 dB, two columns of weight coefficients corresponding to the PA with the high power are multiplied by 0.5.

It can be learned from the antenna array shown in FIG. 16, FIG. 17, or FIG. 19 that there are five antenna elements that space horizontal antenna elements driven on a same RF channel, in other words, M=5 (for example, the antenna elements are $b_{12}$, $b_{13}$, $b_{14}$, $b_{15}$, and $b_{16}$ during counting). According to the related formula provided in the foregoing second optional embodiment, a calculation result may be obtained by using the beam orientation in Embodiment 1 in the calculation manner of the baseband weight in the horizontal direction. Nine beams are obtained based on the calculation result, and a beam orientation, baseband weights, and a status of a 1-bit adjustable phase shifter that correspond to each beam are shown in Table 2.

Figure 21:
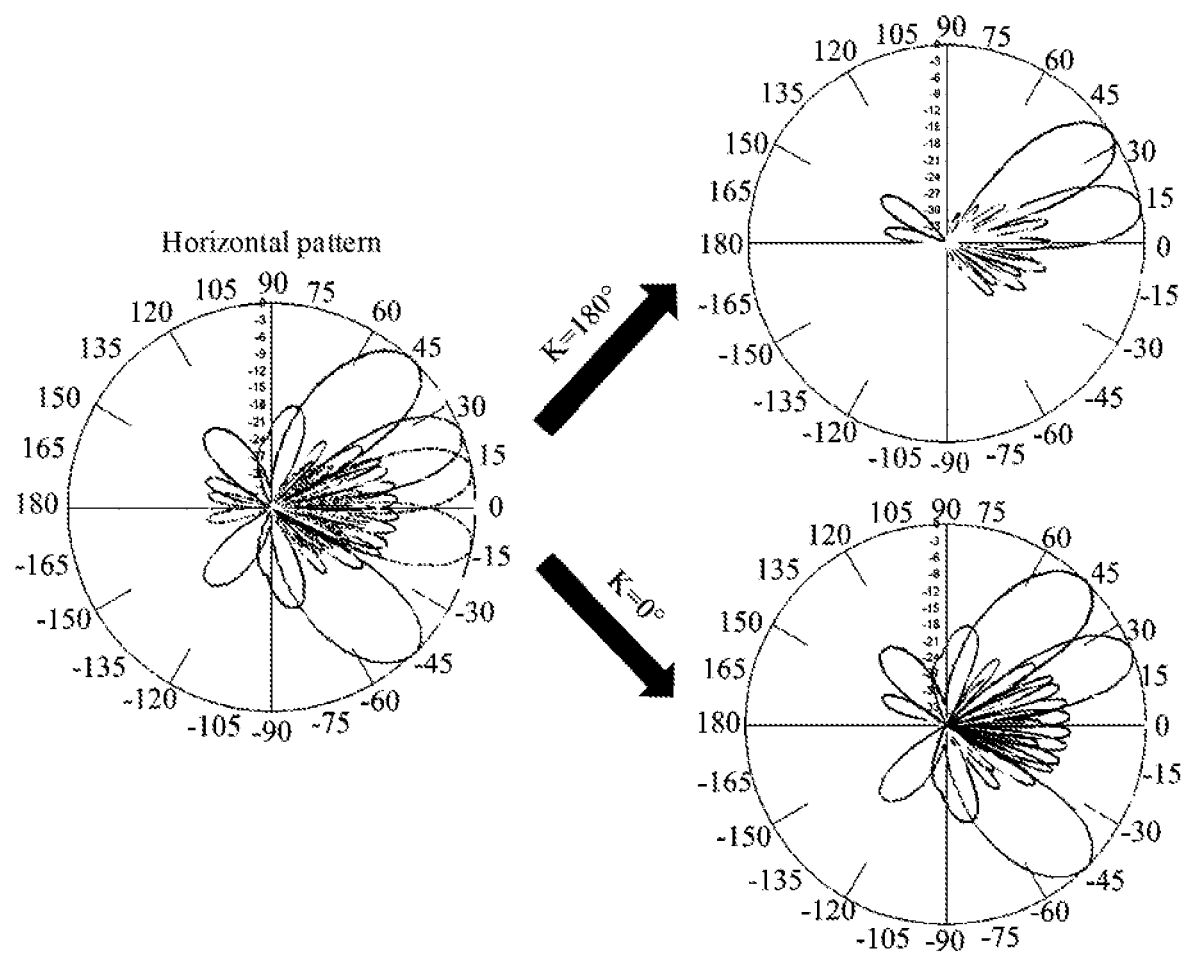
FIG. 21 is another schematic diagram of beams in a first beam group and a second beam group in a horizontal direction according to an embodiment of this application.

1-bit adjustable phase shifter corresponds to five beams on the lower right in FIG. 21. The 1-bit adjustable phase shifter completes beam grouping, and interference between beams in the group is relatively small.

It can be learned, from FIG. 21 through analysis, that a plurality of beams can be formed in the horizontal direction, the beam grouping is completed by using the 1-bit adjustable phase shifter, and beams in a same group have high isolation characteristics. The 1-bit adjustable phase shifter switches between the first beam group and the second beam group with reference to a baseband weight.

The foregoing content mainly describes a method for calculating the baseband weight in the horizontal direction. The following describes a method for calculating a fixed phase difference in a vertical direction.

TABLE 2

| Beam sequence number | Beam orientation | Baseband weight 1 | Baseband weight 2 | Baseband weight 3 | Baseband weight 4 | Baseband weight 5 | Adjustable phase shifter |
|---|---|---|---|---|---|---|---|
| 1 | 50.3° | 1 | exp(−j · 144°) | exp(−j · 288°) | exp(−j · 432°) | exp(−j · 576°) | 0° |
| 3 | 22.6° | 1 | exp(−j · 72°) | exp(−j · 144°) | exp(−j · 216°) | exp(−j · 288°) | 0° |
| 5 | 0° | 1 | 1 | 1 | 1 | 1 | 0° |
| 7 | −22.6° | 1 | exp(j · 72°) | exp(j · 144°) | exp(j · 216°) | exp(j · 288°) | 0° |
| 9 | −50.3° | 1 | exp(j · 144°) | exp(j · 288°) | exp(j · 432°) | exp(j · 576°) | 0° |
| 2 | 35.2° | 1 | exp(−j · 108°) | exp(−j · 216°) | exp(−j · 324°) | exp(−j · 432°) | 180° |
| 4 | 11.1° | 1 | exp(−j · 36°) | exp(−j · 72°) | exp(−j · 108°) | exp(−j · 144°) | 180° |
| 6 | −11.1° | 1 | exp(j · 36°) | exp(j · 72°) | exp(j · 108°) | exp(j · 144°) | 180° |
| 8 | −35.2° | 1 | exp(j · 108°) | exp(j · 216°) | exp(j · 324°) | exp(j · 432°) | 180° |

An adjustable angle of the 1-bit adjustable phase shifter may be 0° or 180°. With reference to the content shown in Table 2, when the beam sequence number is 1, correspondingly, $k_i$=4; when the beam sequence number is 3, correspondingly, $k_i$=2; when the beam sequence number is 5, correspondingly, $k_i$=0; when the beam sequence number is 7, correspondingly, $k_i$=−2; when the beam sequence number is 9, correspondingly, $k_i$=−4; when the beam sequence number is 2, correspondingly, $k_i$=3; when the beam sequence number is 4, correspondingly, $k_i$=1; when the beam sequence number is 6, correspondingly, $k_i$=−1; and when the beam sequence number is 8, correspondingly, $k_i$=−3.

When the angle of the 1-bit adjustable phase shifter is 180°, the angle of the 1-bit adjustable phase shifter corresponds to four beams, and the four beams may be used as a first beam group. When the angle of the 1-bit adjustable phase shifter is 0°, the angle of the 1-bit adjustable phase shifter corresponds to five beams, and the five beams may be used as a second beam group. Alternatively, when the angle of the 1-bit adjustable phase shifter is 180°, the angle of the 1-bit adjustable phase shifter corresponds to four beams, and the four beams may be used as a second beam group. When the angle of the 1-bit adjustable phase shifter is 0°, the angle of the 1-bit adjustable phase shifter corresponds to five beams, and the five beams may be used as a first beam group.

FIG. 21 is another schematic diagram of beams in a first beam group and a second beam group in a horizontal direction according to an embodiment of this application. As shown in the figure, nine beams actually alternately correspond to a case in which a 1-bit adjustable phase shifter is 0° and 180°. Therefore, the nine beams do not coexist. When the 1-bit adjustable phase shifter is 180°, the 1-bit adjustable phase shifter corresponds to four beams on the upper right in FIG. 21. When the 1-bit adjustable phase shifter is 0°, the Specifically, according to one embodiment as shown in FIG. 4, when N=1, a difference between a phase of an actual weight and a phase of an ideal weight is smallest, in other words, a minimum mean square error can be obtained. Therefore, when N=1, the fixed phase difference Δϕ can be obtained through calculation according to the following formula:

$$\Delta\phi = \frac{1}{4}\sum_{i=1:n} d_2 \sin(\varphi_i) \cdot \frac{2\pi}{\lambda} \quad (5)$$

It can be learned from the antenna array in FIG. 16, FIG. 17, or FIG. 19 that four beams are generated in a vertical direction, beam downtilts $\varphi_i$ of the beams are respectively 2°, 5°, 11°, and 20°, and Δϕ=47.50 is obtained through calculation after the beam downtilts $\varphi_i$ are substituted into the formula (5). Considering a physical characteristic of a fixed phase shifter, Δϕ=47.5° is quantized to Δϕ=45°, and a spacing distance between two adjacent antenna elements that belong to a same RF channel may be specifically $d_2$=0.78λ.

Still further, the topology structure of the antenna array is described in detail in this embodiment of this application. In brief, a distance between a plurality of antenna elements driven on a same RF channel needs to be as large as possible in a horizontal direction, and the antenna elements are adjacently arranged in a vertical direction. In the foregoing arrangement manner, a plurality of beams can be formed in the horizontal direction, beam grouping is completed by using a 1-bit adjustable phase shifter, and both beams in a first beam group and a second beam group have high isolation. A manner in which the plurality of antenna elements are driven on the same RF channel is used in the vertical direction, thereby effectively reducing a quantity of RF channels, and greatly reducing system costs. In addition, the antenna elements in the antenna array can be arranged in two manners. PAs in different specifications may be respectively used for the two arrangement manners of the antenna elements, so that signal transmission on a control channel is compatible, thereby improving feasibility of the solution. In addition, this embodiment of this application may be further compatible with standards such as UMTS and LTE, thereby improving practicality of the solution.

Embodiment 3

In one embodiment, based on FIG. 4, each column of antenna elements in an antenna array includes a first antenna element group and a second antenna element group, where the first antenna element group is connected to a first RF channel, and the second antenna element group is connected to a second RF channel.

The first antenna element group includes a first antenna element ($c_{11}$), and the second antenna element group includes a second antenna element ($c_{21}$).

In each column of antenna elements, the first antenna element ($c_{11}$) and the second antenna element ($c_{21}$) are adjacent.

Figure 22:
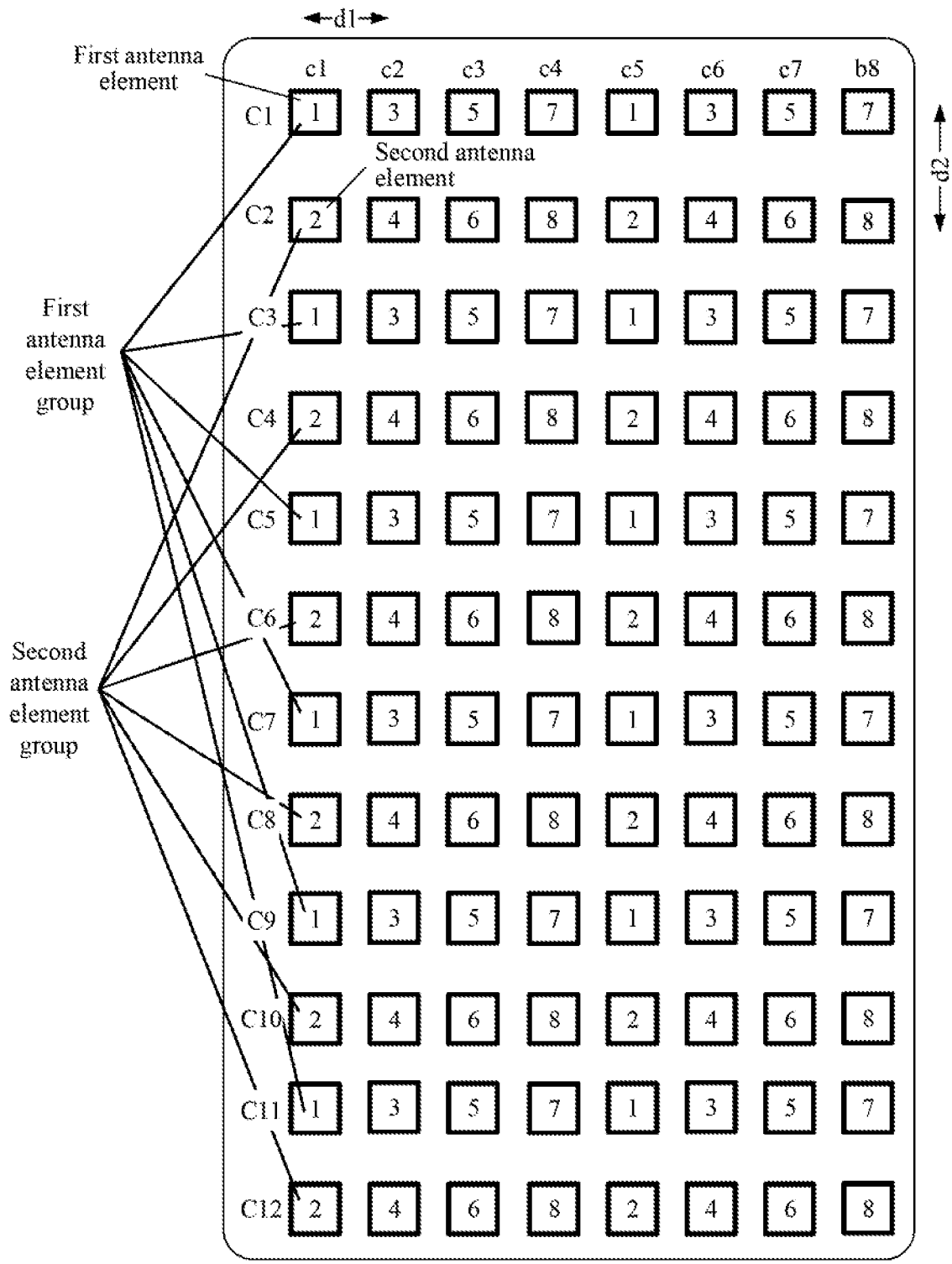
FIG. 22 is a schematic diagram (1) of still another topology structure of an antenna array according to an embodiment of this application.

In this embodiment, the antenna array includes a plurality of columns of antenna elements, and each column of antenna elements includes a plurality of antenna elements. For ease of description, FIG. 22 is a schematic diagram (1) of still another topology structure of an antenna array according to an embodiment of this application. As shown in the figure, c1 to c8 are respectively used to represent column sequence numbers corresponding to columns of antenna elements in the antenna array, and C1 to C12 are respectively used to represent row sequence numbers corresponding to rows of antenna elements in the antenna array. It may be understood that the column sequence number and the row sequence number in FIG. 22 are merely examples. In actual application, there may also be another sequence number writing manner.

Each column of antenna elements in the antenna array includes a first antenna element group and a second antenna element group. As shown in FIG. 22, a first column of antenna elements is used as an example. The first column of antenna elements includes the first antenna element group and the second antenna element group. The first antenna element group includes a plurality of first antenna elements, and the second antenna element group includes a plurality of second antenna elements. The first antenna element may be a $1^{st}$ antenna element corresponding to a first row in the antenna array, and the second antenna element may be a $1^{st}$ antenna element corresponding to a second row in the antenna array. For ease of description, the first antenna element may be named as $c_{11}$, and the second antenna element may be named as $c_{21}$. The first antenna elements in the first antenna element group are all connected to a first RF channel, and the second antenna elements in the second antenna element group are all connected to a second RF channel. The first RF channel may be an RF channel 1, and the second RF channel may be an RF channel 2. It may be understood that antenna elements with a same label in FIG. 22 represent a same RF channel.

In the first column of antenna elements, the first antenna element ($c_{11}$) and the second antenna element ($c_{21}$) are adjacent. Similarly, in another column of antenna elements, antenna elements that belong to a same RF channel in a vertical direction are also alternately arranged. In other words, the antenna elements driven on the same RF channel are not adjacent in a horizontal direction, and are alternately arranged in the vertical direction. For example, in a second column of antenna elements, antenna elements that belong to an RF channel 3 and antenna elements that belong to an RF channel 4 are alternately arranged. This is not listed herein.

Figure 23:
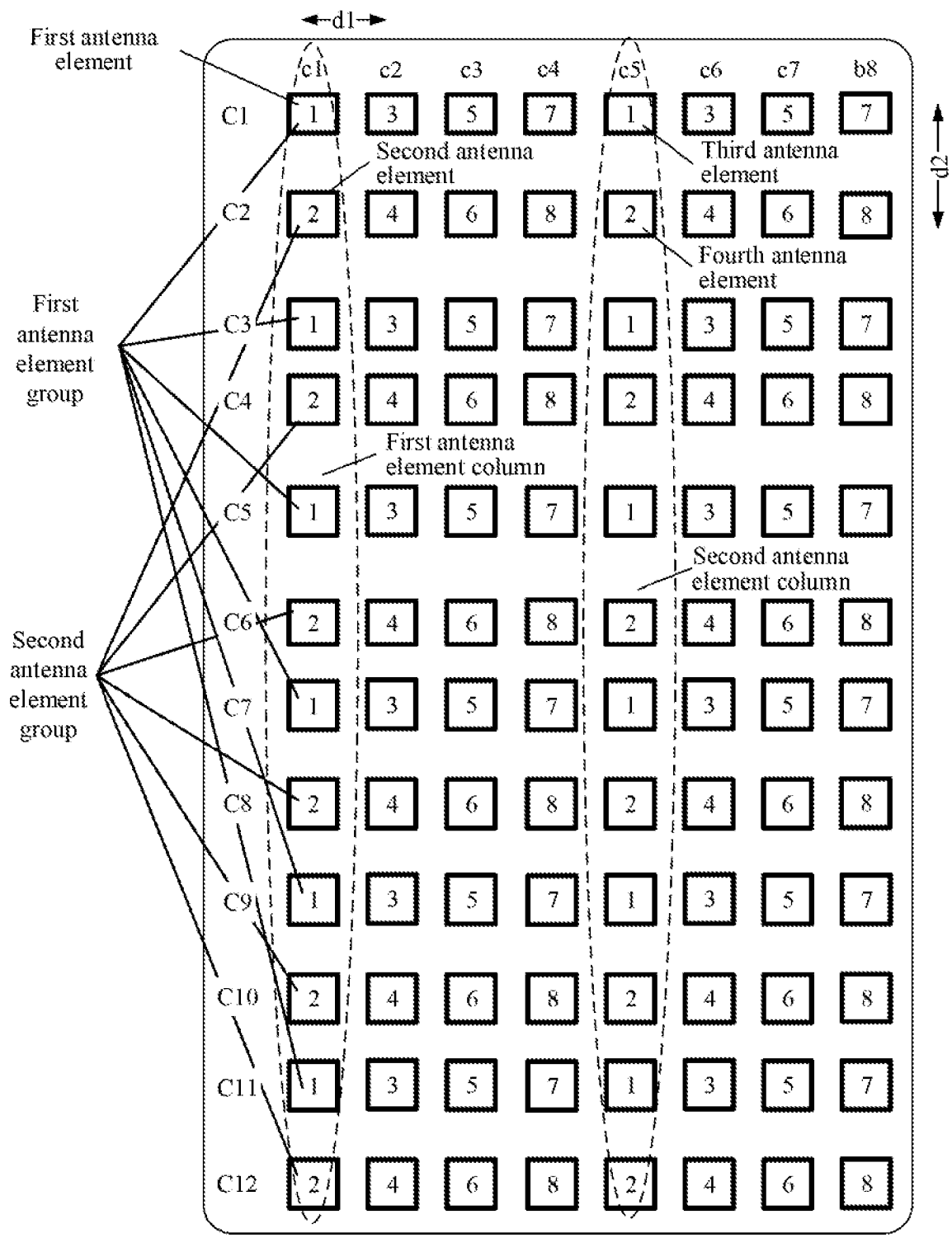
FIG. 23 is a schematic diagram (2) of still another topology structure of an antenna array according to an embodiment of this application.

FIG. 23 is a schematic diagram (2) of still another topology structure of an antenna array according to an embodiment of this application. As shown in the figure, it is assumed that a first column in the antenna array is a first antenna element column. For ease of description, the first antenna element column may be named as c1. Similarly, a second antenna element column may be named as c5. In the first antenna element column (c1), a first antenna element may be named as c11, and a second antenna element may be named as $c_{21}$. In the second antenna element column (c5), a third antenna element may be named as $c_{15}$, and a fourth antenna element may be named as c25.

Figure 24:
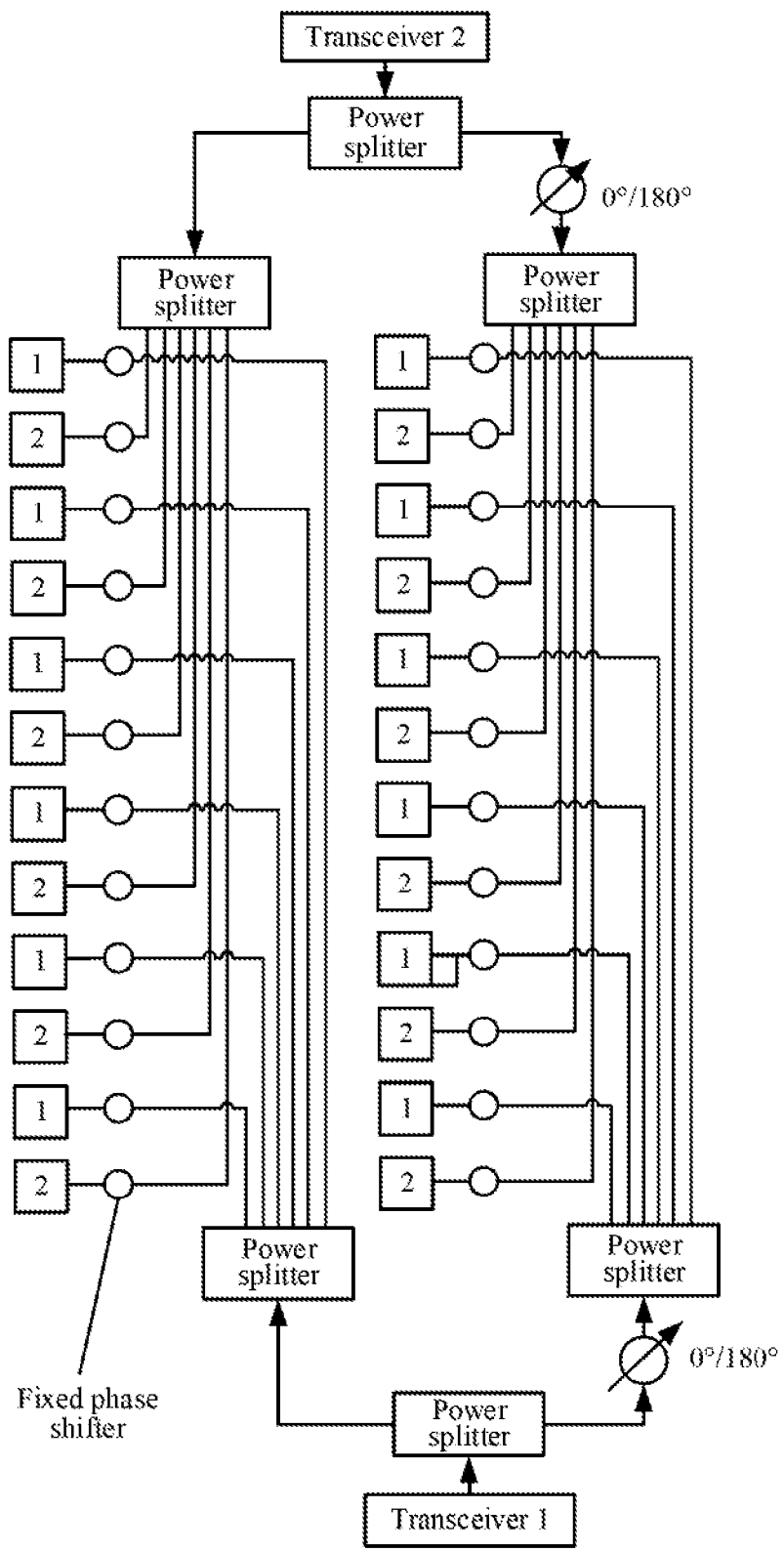
FIG. 24 is a schematic structural diagram of driving a plurality of antenna elements on a same channel according to an embodiment of this application.

FIG. 24 is a schematic structural diagram of driving a plurality of antenna elements on a same channel according to an embodiment of this application. As shown in the figure, a first antenna element ($c_{11}$) in a first antenna element column (c1) and a third antenna element ($c_{15}$) in a second antenna element column (c5) may be connected to a same RF channel, to reduce a quantity of RF channels, and reduce costs of a multi-beam system. Similarly, a second antenna element ($c_{21}$) in the first antenna element column (c1) and a fourth antenna element ($c_{25}$) in the second antenna element column (c5) are connected to a same RF channel. The antenna elements driven on the same RF channel are represented by using a same label. FIG. 24 shows a connection manner in which the plurality of antenna elements are driven on one RF channel. A connection relationship among the plurality of antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter. In addition, there are two RF channels in the vertical direction, and an electrical downtilt of a beam formed on each RF channel may be independently adjusted.

It should be noted that the element arrangement manner and the element numbering manner that are shown in FIG. 22, FIG. 23, and FIG. 24 are merely examples, and should not be construed as a limitation on this application.

It can be learned from the antenna arrays shown in FIG. 22, FIG. 23, and FIG. 24 that there are four antenna elements that space horizontal antenna elements driven on a same RF channel, in other words, M=4 (for example, the antenna elements are $c_{12}$, $c_{13}$, $c_{14}$, and $c_{15}$ during counting). According to the related formula provided in the foregoing second optional embodiment, a calculation result may be obtained by using the beam orientation in Embodiment 1 in the calculation manner of the baseband weight in the horizontal direction. Seven beams are obtained based on the calculation result, and a beam orientation, baseband weights, and a status of a 1-bit adjustable phase shifter that correspond to each beam are shown in Table 3.

TABLE 3

| Beam sequence number | Beam orientation | Baseband weight 1 | Baseband weight 2 | Baseband weight 3 | Baseband weight 4 | Phase of an adjustable phase shifter |
|---|---|---|---|---|---|---|
| 1 | 46.2° | 1 | exp(−j · 135°) | exp(−j · 270°) | exp(−j · 45°) | 180° |
| 3 | 13.9° | 1 | exp(−j · 45°) | exp(−j · 90°) | exp(−j · 135°) | 180° |
| 5 | −13.9° | 1 | exp(j · 45°) | exp(j · 90°) | exp(j · 135°) | 180° |
| 7 | −46.2° | 1 | exp(j · 135°) | exp(j · 270°) | exp(j · 45°) | 180° |
| 2 | 28.7° | 1 | exp(−j · 90°) | exp(−j · 180°) | exp(−j · 270°) | 0° |
| 4 | 0° | 1 | 1 | 1 | 1 | 0° |
| 6 | −28.7° | 1 | exp(j · 90°) | exp(j · 180°) | exp(j · 270°) | 0° |

An adjustable angle of the 1-bit adjustable phase shifter may be 0° or 180°. With reference to the content shown in Table 3, when the beam sequence number is 1, correspondingly, $k_i=3$; when the beam sequence number is 3, correspondingly, $k_i=1$; when the beam sequence number is 5, correspondingly, $k_i=-1$; when the beam sequence number is 7, correspondingly, $k_i=-3$; when the beam sequence number is 2, correspondingly, $k_i=2$; when the beam sequence number is 4, correspondingly, $k_i=0$; and when the beam sequence number is 6, correspondingly, $k_i=-2$.

When the angle of the 1-bit adjustable phase shifter is 180°, the angle of the 1-bit adjustable phase shifter corresponds to four beams, and the four beams may be used as a first beam group. When the angle of the 1-bit adjustable phase shifter is 0°, the angle of the 1-bit adjustable phase shifter corresponds to three beams, and the three beams may be used as a second beam group. Alternatively, when the angle of the 1-bit adjustable phase shifter is 180°, the angle of the 1-bit adjustable phase shifter corresponds to four beams, and the four beams may be used as a second beam group. When the angle of the 1-bit adjustable phase shifter is 0°, the angle of the 1-bit adjustable phase shifter corresponds to three beams, and the three beams may be used as a first beam group.

Figure 25:
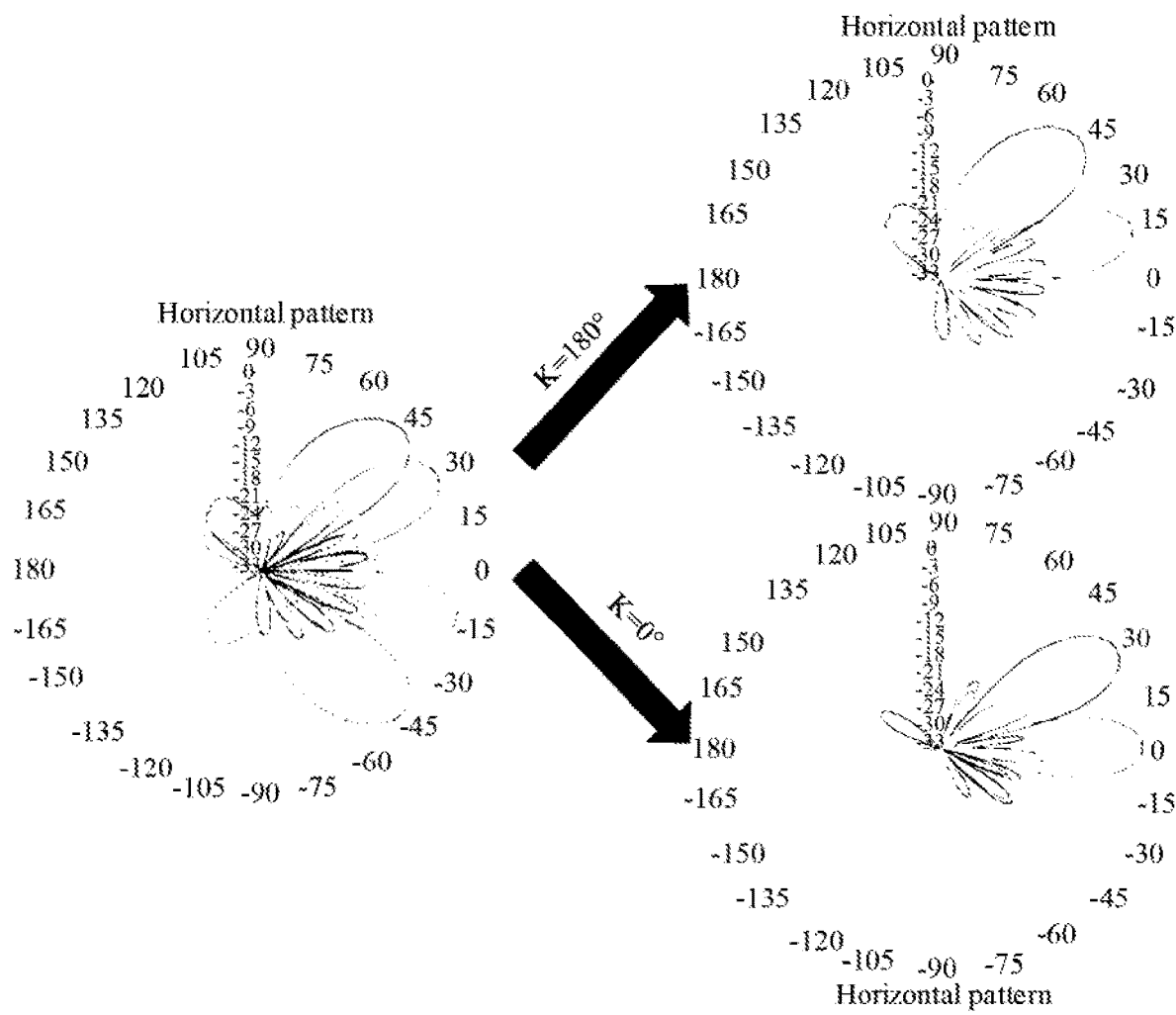
FIG. 25 is another schematic diagram of beams in a first beam group and a second beam group in a horizontal direction according to an embodiment of this application.

FIG. 25 is another schematic diagram of beams in a first beam group and a second beam group in a horizontal direction according to an embodiment of this application. As shown in the figure, seven beams actually alternately correspond to a case in which a 1-bit adjustable phase shifter is 0° and 180°. Therefore, the seven beams do not coexist. When the 1-bit adjustable phase shifter is 180°, the 1-bit adjustable phase shifter corresponds to four beams on the upper right in FIG. 25. When the 1-bit adjustable phase shifter is 0°, the 1-bit adjustable phase shifter corresponds to three beams on the lower right in FIG. 25. The 1-bit adjustable phase shifter completes beam grouping, and interference between beams in the group is relatively small.

It can be learned, from FIG. 25 through analysis, that a plurality of beams can be formed in the horizontal direction, the beam grouping is completed by using the 1-bit adjustable phase shifter, and beams in a same group have high isolation characteristics. The 1-bit adjustable phase shifter switches between the first beam group and the second beam group with reference to a baseband weight.

Figure 26A:
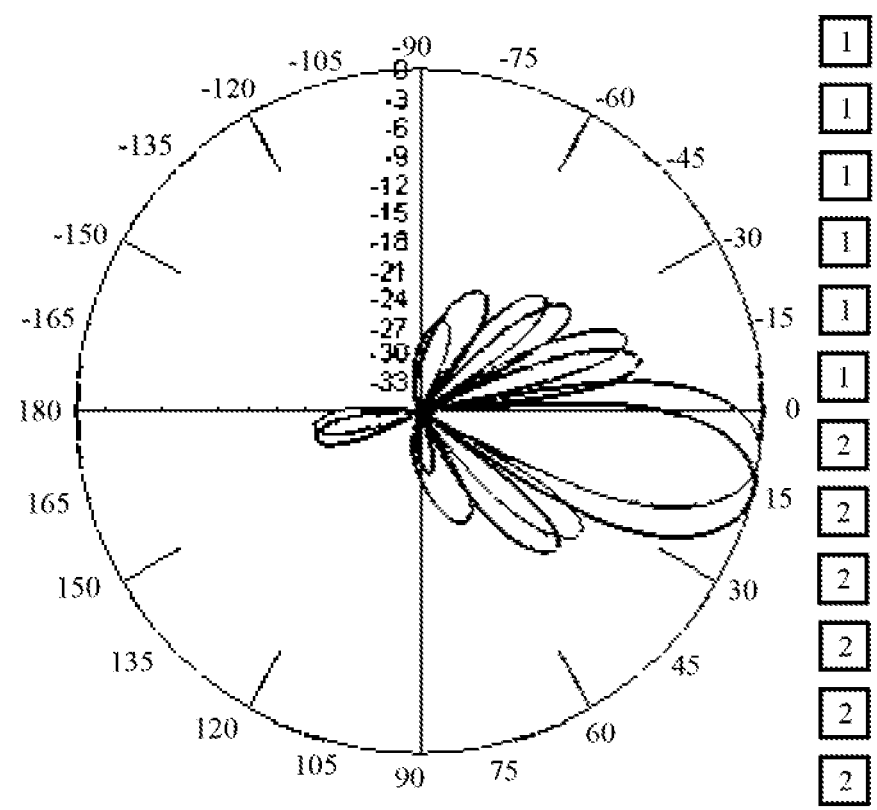
FIG. 26(a) is a vertical beam directivity pattern obtained during conventional antenna element arrangement.
Figure 26B:
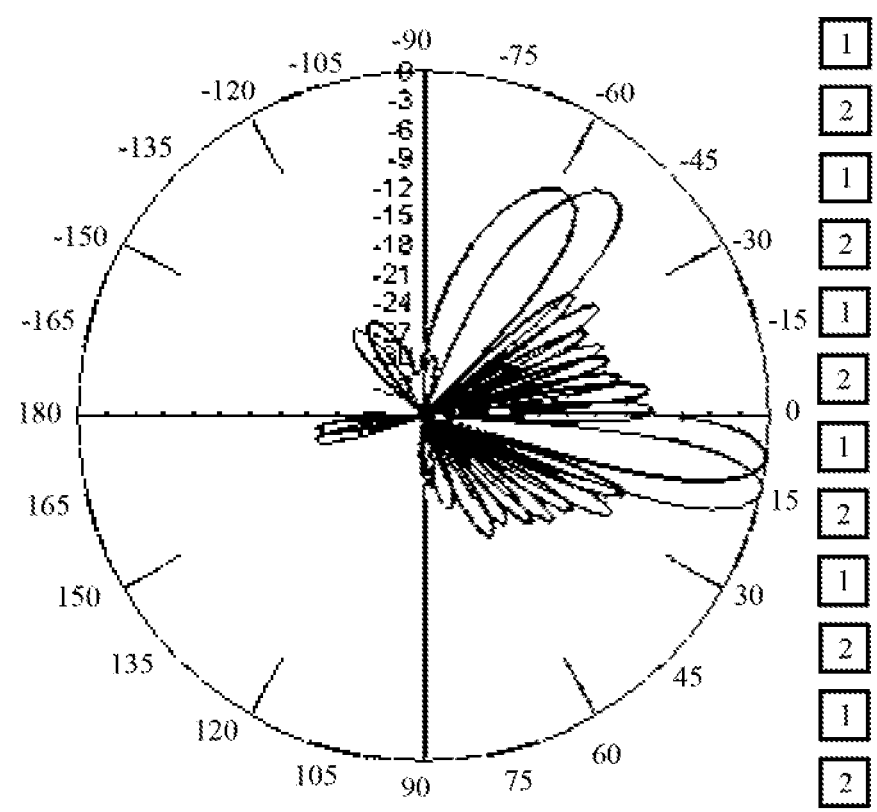
FIG. 26(b) is a vertical beam directivity pattern obtained during antenna element arrangement according to an embodiment of this application.

Based on the antenna arrays shown in FIG. 22 and FIG. 23, because an alternate arrangement manner in which antenna elements are driven on two RF channels is used in a vertical direction, a vertical plane equivalent diameter does not decrease for an antenna subarray connected to each RF channel. Therefore, a beam width is narrower compared with a conventional subarray mode. FIG. 26(a) is a vertical beam directivity pattern obtained during conventional antenna element arrangement. FIG. 26(b) is a vertical beam directivity pattern obtained during antenna element arrangement according to an embodiment of this application. As shown in FIG. 26(a) and FIG. 26(b), a beam is formed on each of two RF channels in a subarray connection manner. Therefore, an electrical downtilt can be adjusted on each of the two channels, to adjust an included angle between beams at both internal and external layers.

A principle of adjusting the electrical downtilt is to change field strength of a composite component by changing a phase of a collinear array antenna element and amplitudes of a vertical component and a horizontal component, so that the vertical directivity pattern of the antenna is downtilted. Field strength in directions of the antenna simultaneously increases and decreases. Therefore, when it is ensured that the antenna directivity pattern slightly changes after a tilt is changed, a coverage distance of a main lobe direction is shortened, and a coverage area of the entire directivity pattern is reduced in a sector of a serving cell and no interference is caused.

Still further, the topology structure of the antenna array is described in detail in this embodiment of this application. In brief, in the antenna array, two antenna elements may be driven on a same RF channel in a horizontal direction, and a plurality of antenna elements may be driven on a same RF channel in a vertical direction. The two antenna elements driven on the same RF channel in the horizontal direction are not adjacent, and antenna elements driven on two RF channels in the vertical direction are alternately arranged. In the foregoing arrangement manner, a plurality of beams can be formed in the horizontal direction, beam grouping is completed by using a 1-bit adjustable phase shifter, and both beams in a first beam group and a second beam group have high isolation. A manner in which the plurality of antenna elements are driven on the same RF channel is used in the vertical direction, thereby greatly reducing a quantity of RF channels, and reducing system costs. In addition, a fixed phase shifter is further used in the vertical direction, and a downtilt of each RF channel can be independently electrically adjusted, thereby improving flexibility of the solution.

It may be understood that Embodiment 3 and Embodiment 1 have a similar characteristic. For details, refer to related descriptions in Embodiment 1. Details are not described herein.

In one embodiment, based on FIG. 4, each column of antenna elements in an antenna array includes a first antenna element group and a second antenna element group, where the first antenna element group is connected to a first RF channel, and the second antenna element group is connected to a second RF channel.

The first antenna element group includes a first antenna element ($d_{11}$), and the second antenna element group includes a second antenna element ($d_{21}$).

In each column of antenna elements, the first antenna element ($d_{11}$) and the second antenna element ($d_{21}$) are adjacent.

Figure 27:
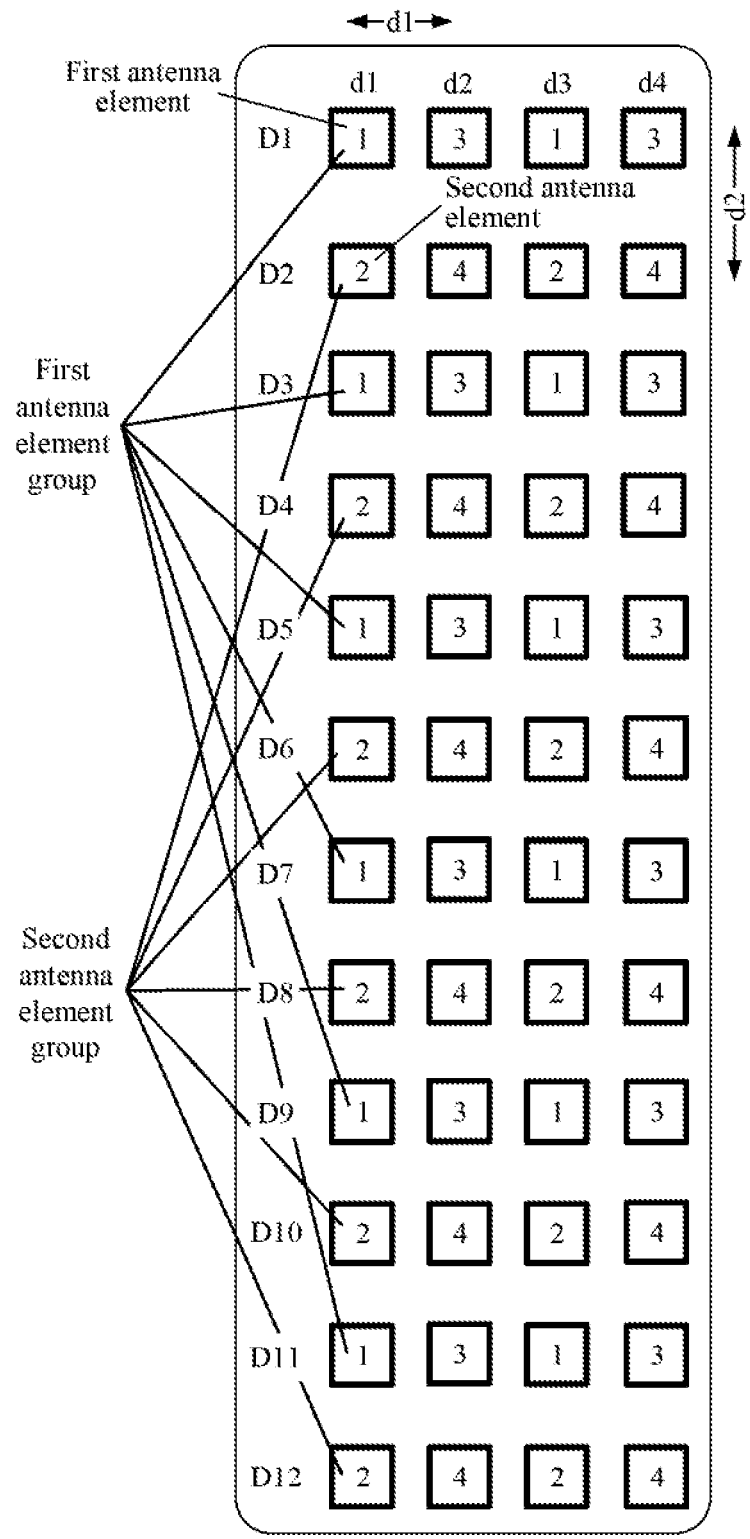
FIG. 27 is a schematic diagram (1) of still another topology structure of an antenna array according to an embodiment of this application.

In this embodiment, the antenna array includes a plurality of columns of antenna elements, and each column of antenna elements includes a plurality of antenna elements. For ease of description, FIG. 27 is a schematic diagram (1) of still another topology structure of an antenna array according to an embodiment of this application. As shown in the figure, d1 to d4 are respectively used to represent column sequence numbers corresponding to columns of antenna elements in the antenna array, and D1 to D12 are respectively used to represent row sequence numbers corresponding to rows of antenna elements in the antenna array. It may be understood that the column sequence number and the row sequence number in FIG. 27 are merely examples. In actual application, there may also be another sequence number writing manner.

Each column of antenna elements in the antenna array includes a first antenna element group and a second antenna element group. As shown in FIG. 27, a first column of antenna elements is used as an example. The first column of antenna elements includes the first antenna element group and the second antenna element group. The first antenna element group includes a plurality of first antenna elements, and the second antenna element group includes a plurality of second antenna elements. The first antenna element may be a $1^{st}$ antenna element corresponding to a first row in the antenna array, and the second antenna element may be a $1^{st}$ antenna element corresponding to a second row in the antenna array. For ease of description, the first antenna element may be named as $d_{11}$, and the second antenna element may be named as $d_{21}$. The first antenna elements in the first antenna element group are all connected to a first RF channel, and the second antenna elements in the second antenna element group are all connected to a second RF channel. The first RF channel may be an RF channel 1, and the second RF channel may be an RF channel 2. It may be understood that antenna elements with a same label in FIG. 29 represent a same RF channel.

In the first column of antenna elements, the first antenna element (d11) and the second antenna element ($d_{21}$) are adjacent. Similarly, in another column of antenna elements, antenna elements that belong to a same RF channel in a vertical direction are also alternately arranged. In other words, the antenna elements driven on the same RF channel are not adjacent in a horizontal direction, and are alternately arranged in the vertical direction. For example, in a second column of antenna elements, antenna elements that belong to an RF channel 3 and antenna elements that belong to an RF channel 4 are alternately arranged. This is not listed herein.

Figure 28:
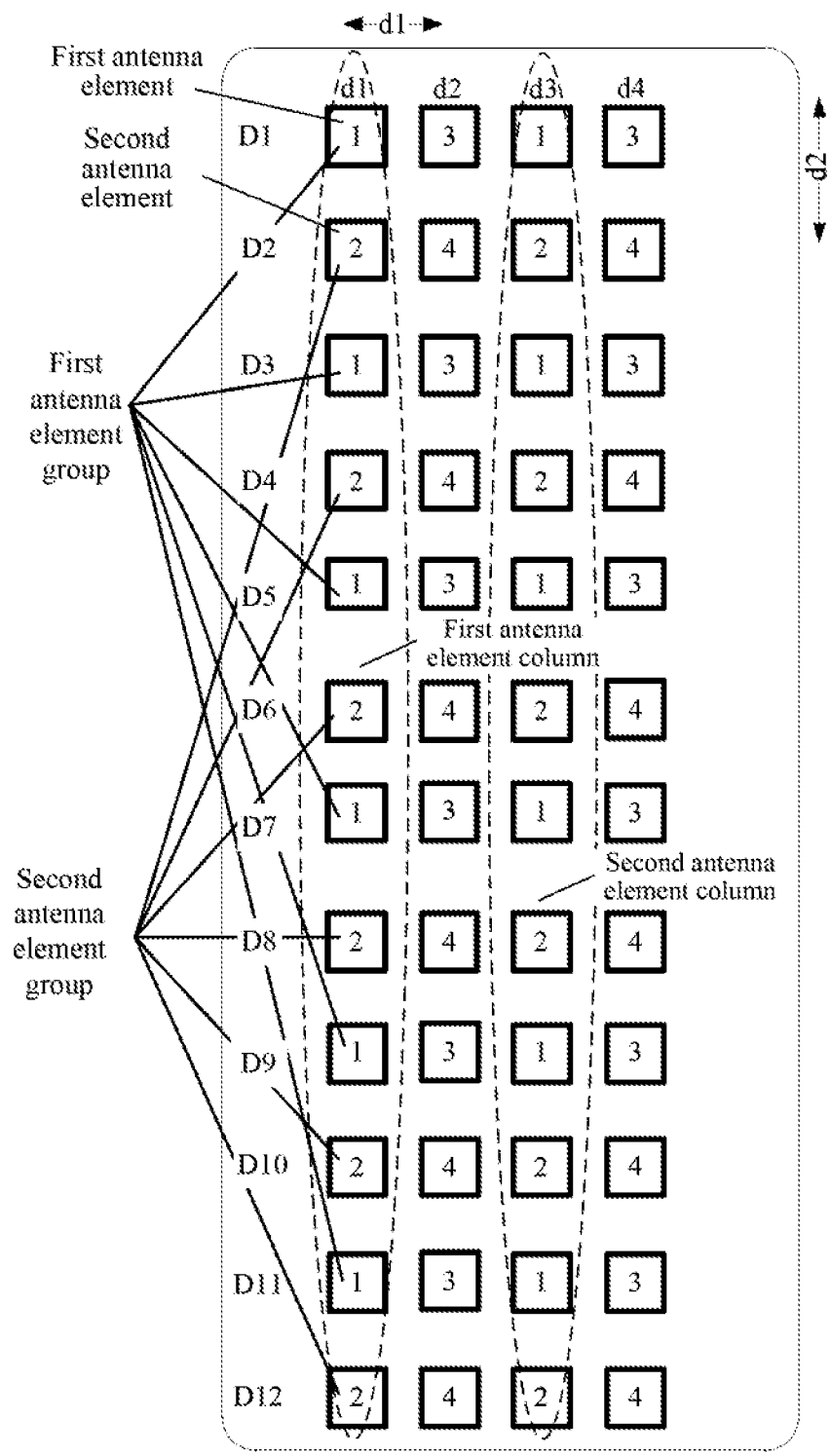
FIG. 28 is a schematic diagram (2) of still another topology structure of an antenna array according to an embodiment of this application.

FIG. 28 is a schematic diagram (2) of still another topology structure of an antenna array according to an embodiment of this application. As shown in the figure, it is assumed that a first column in the antenna array is a first antenna element column. For ease of description, the first antenna element column may be named as d1. Similarly, a second antenna element column may be named as d3. In the first antenna element column (d1), a first antenna element may be named as $d_{11}$, and a second antenna element may be named as $d_{21}$. In the second antenna element column (d3), a third antenna element may be named as $d_{13}$, and a fourth antenna element may be named as $d_{23}$.

Figure 29:
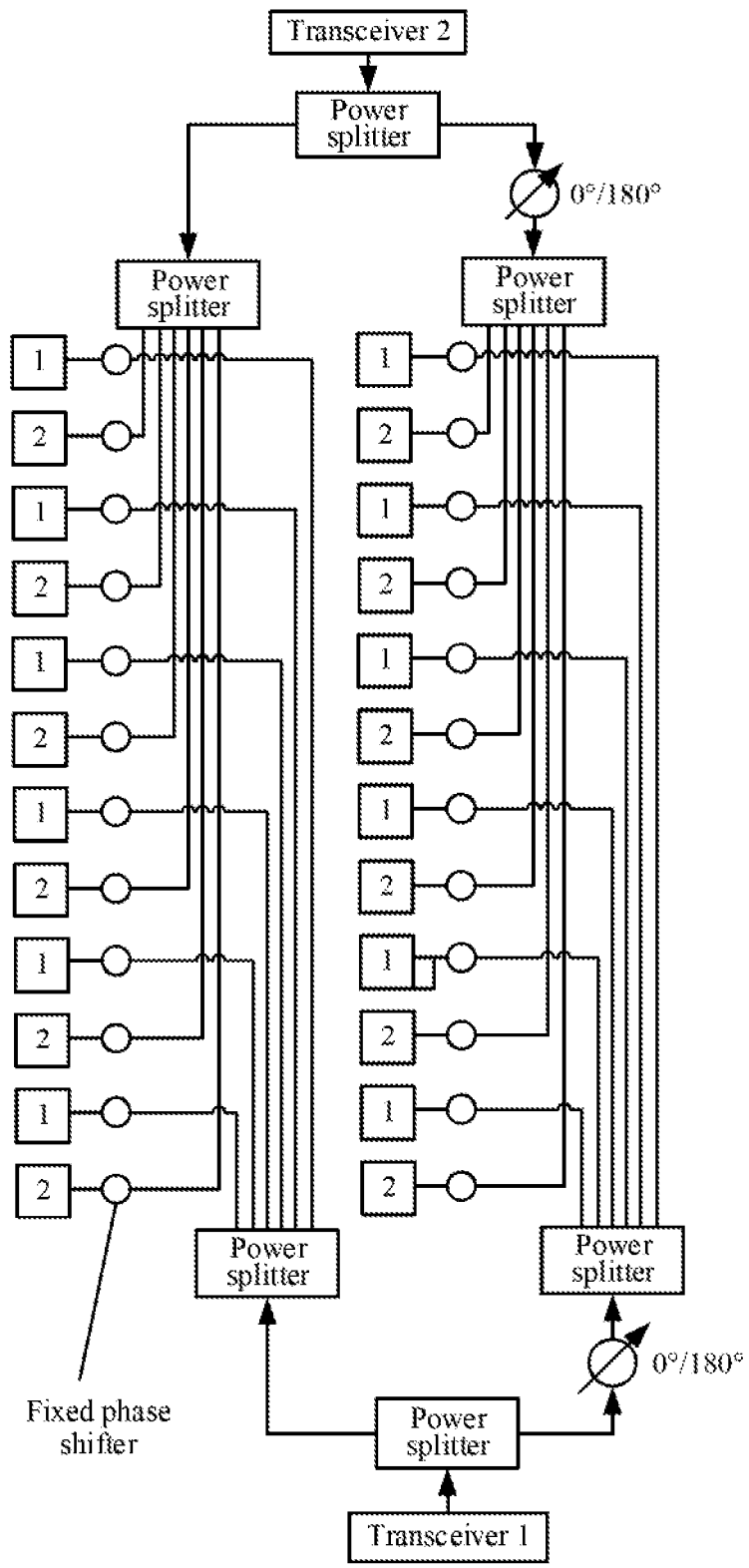
FIG. 29 is a schematic structural diagram of driving a plurality of antenna elements on a same channel according to an embodiment of this application.

FIG. 29 is a schematic structural diagram of driving a plurality of antenna elements on a same channel according to an embodiment of this application. As shown in the figure, a first antenna element ($d_{11}$) in a first antenna element column (d1) and a third antenna element ($d_{13}$) in a second antenna element column (d3) may be connected to a same RF channel, to reduce a quantity of RF channels, and reduce costs of a multi-beam system. Similarly, a second antenna element ($d_{21}$) in the first antenna element column (d1) and a fourth antenna element ($d_{23}$) in the second antenna element column (d3) are connected to a same RF channel. The antenna elements driven on the same RF channel are represented by using a same label. FIG. 29 shows a connection manner in which the plurality of antenna elements are driven on one RF channel. A connection relationship among the plurality of antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter. In addition, there are two RF channels in the vertical direction, and an electrical downtilt of a beam formed on each RF channel may be independently adjusted.

It should be noted that the element arrangement manner and the element numbering manner that are shown in FIG. 27, FIG. 28, and FIG. 29 are merely examples, and should not be construed as a limitation on this application.

It can be learned from the antenna arrays shown in FIG. 27, FIG. 28, and FIG. 29 that there are two antenna elements that space horizontal antenna elements driven on a same RF channel, in other words, M=2 (for example, the antenna elements are $d_{12}$ and $d_{13}$ during counting). According to the related formula provided in the foregoing second optional embodiment, a calculation result may be obtained by using the beam orientation in Embodiment 1 in the calculation manner of the baseband weight in the horizontal direction. Three beams are obtained based on the calculation result, and a beam orientation, baseband weights, and a status of a 1-bit adjustable phase shifter that correspond to each beam are shown in Table 4.

TABLE 4

| Beam sequence number | Beam orientation | Baseband weight 1 | Baseband weight 2 | Adjustable phase shifter |
|---|---|---|---|---|
| 1 | 28.7° | 1 | exp(−j · 90°) | 180° |
| 2 | −28.7° | 1 | exp(j · 90°) | 180° |
| 3 | 0° | 1 | 1 | 0° |

An adjustable angle of the 1-bit adjustable phase shifter may be 0° or 180°. With reference to the content shown in Table 4, when the beam sequence number is 1, correspondingly, $k_i$=1; when the beam sequence number is 2, correspondingly, $k_i$=−1; and when the beam sequence number is 3, correspondingly, $k_i$=0.

When the angle of the 1-bit adjustable phase shifter is 180°, the angle of the 1-bit adjustable phase shifter corresponds to two beams, and the two beams may be used as a first beam group. When the angle of the 1-bit adjustable phase shifter is 0°, the angle of the 1-bit adjustable phase shifter corresponds to one beam, and the beam may be used as a second beam group. Alternatively, when the angle of the 1-bit adjustable phase shifter is 180°, the angle of the 1-bit adjustable phase shifter corresponds to two beams, and the two beams may be used as a second beam group. When the angle of the 1-bit adjustable phase shifter is 0°, the angle of the 1-bit adjustable phase shifter corresponds to one beam, and the beam may be used as a first beam group.

Figure 30:
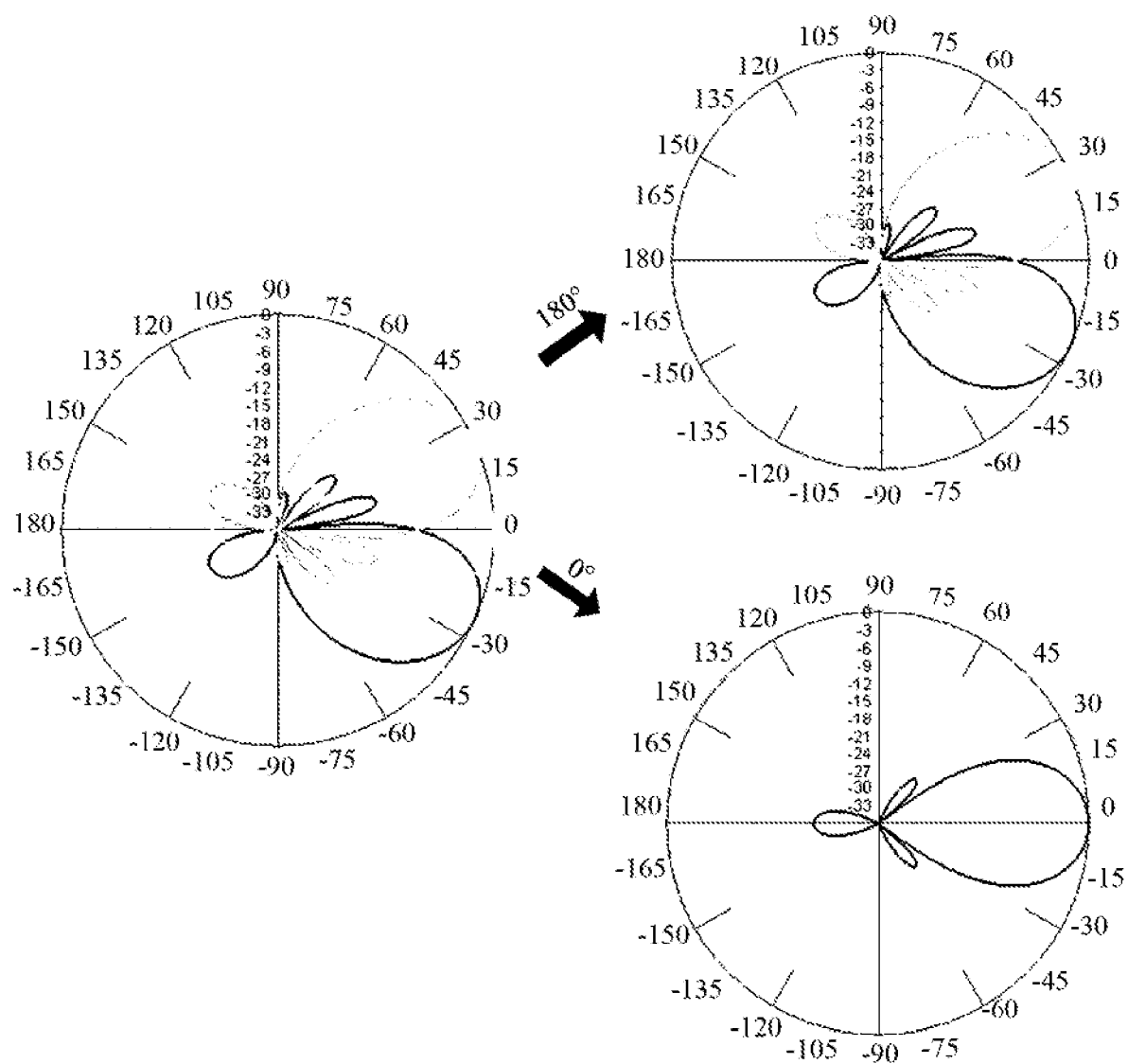
FIG. 30 is another schematic diagram of beams in a first beam group and a second beam group in a horizontal direction according to an embodiment of this application.

FIG. 30 is another schematic diagram of beams in a first beam group and a second beam group in a horizontal direction according to an embodiment of this application. As shown in the figure, three beams actually alternately correspond to a case in which a 1-bit adjustable phase shifter is 0° and 180°. Therefore, the three beams do not coexist. When the 1-bit adjustable phase shifter is 180°, the 1-bit adjustable phase shifter corresponds to two beams on the upper right in FIG. 30. When the 1-bit adjustable phase shifter is 0°, the 1-bit adjustable phase shifter corresponds to one beam on the lower right in FIG. 30. The 1-bit adjustable phase shifter completes beam grouping, and interference between beams in the group is relatively small.

It can be learned, from FIG. 30 through analysis, that a plurality of beams can be formed in the horizontal direction, the beam grouping is completed by using the 1-bit adjustable phase shifter, and beams in a same group have high isolation characteristics. The 1-bit adjustable phase shifter switches between the first beam group and the second beam group with reference to a baseband weight, to implement sending at full power in each state.

It should be noted that in addition to the arrangement manners described in the fifth to the eighth embodiments, in actual application, there may be another arrangement manner of antenna elements in the antenna array of the antenna apparatus. The following uses examples for description. However, these examples are merely for illustration purposes, and not all arrangement manners are listed.

FIG. 31 is a schematic diagram of a topology structure in which an antenna array includes six columns of antenna elements according to an embodiment of this application. As shown in the figure, the antenna array includes the six columns of antenna elements, and each column of antenna elements includes a plurality of antenna elements. For ease of description, e1 to e6 are respectively used to represent column sequence numbers corresponding to columns of antenna elements in the antenna array, and E1 to E12 are respectively used to represent row sequence numbers corresponding to rows of antenna elements in the antenna array. It may be understood that the column sequence number and the row sequence number in FIG. 31 are merely examples. In actual application, there may also be another sequence number writing manner.

Each column of antenna elements in the antenna array includes two antenna element groups. As shown in FIG. 31, a first column of antenna elements is used as an example. For ease of description, an antenna element in a first row and a first column may be named as e11, an antenna element in a second row and the first column may be named as e21, an antenna element in a third row and the first column may be named as e31, an antenna element in a fourth row and the first column may be named as e41, and so on. Details are not described herein. The antenna element $e_{11}$ and the antenna element e21 are adjacently arranged, and the antenna element e31 and the antenna element e41 are adjacently arranged. Similarly, in another column of antenna elements, antenna elements that belong to a same RF channel in a vertical direction are also alternately arranged. In other words, the antenna elements driven on the same RF channel are not adjacent in a horizontal direction, and are alternately arranged in the vertical direction.

A plurality of antenna elements may be driven on one RF channel, to reduce a quantity of RF channels, and reduce costs of a multi-beam system. A connection relationship among the plurality of antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter. In addition, there are two RF channels in the vertical direction, and an electrical downtilt of a beam formed on each RF channel may be independently adjusted.

It should be noted that the element arrangement manner and the element numbering manner that are shown in FIG. 31 are merely examples, and should not be construed as a limitation on this application.

It can be learned from the antenna array shown in FIG. 31 that there are three antenna elements that space horizontal antenna elements driven on a same RF channel, in other words, M=3 (for example, the antenna elements are e12, e13, and e14 during counting). According to the related formula provided in the foregoing second optional embodiment, a calculation result may be obtained by using the beam orientation in Embodiment 1 in the calculation manner of the baseband weight in the horizontal direction. Five beams are obtained based on the calculation result, and a beam orientation, baseband weights, and a status of a 1-bit adjustable phase shifter that correspond to each beam are shown in Table 5.

TABLE 5

| Beam sequence number | Beam orientation | Baseband weight 1 | Baseband weight 2 | Baseband weight 3 | Adjustable phase shifter |
|---|---|---|---|---|---|
| 1 | 39.9° | 1 | exp(−j · 120°) | exp(−j · 240°) | 0° |
| 3 | 0° | 1 | 1 | 1 | 0° |
| 5 | −39.9° | 1 | exp(j · 120°) | exp(j · 240°) | 0° |
| 2 | 18.7° | 1 | exp(−j · 60°) | exp(−j · 120°) | 180° |
| 4 | −18.7° | 1 | exp(j · 60°) | exp(j · 120°) | 180° |

An adjustable angle of the 1-bit adjustable phase shifter may be 0° or 180°. With reference to the content shown in Table 5, when the beam sequence number is 1, correspondingly, $k_i$=2; when the beam sequence number is 3, correspondingly, $k_i$=0; when the beam sequence number is 5, correspondingly, $k_i$=−2; when the beam sequence number is 2, correspondingly, $k_i$=1; and when the beam sequence number is 4, correspondingly, $k_i$=−1.

When the angle of the 1-bit adjustable phase shifter is 180°, the angle of the 1-bit adjustable phase shifter corresponds to two beams, and the two beams may be used as a first beam group. When the angle of the 1-bit adjustable phase shifter is 0°, the angle of the 1-bit adjustable phase shifter corresponds to three beams, and the three beams may be used as a second beam group. Alternatively, when the angle of the 1-bit adjustable phase shifter is 180°, the angle of the 1-bit adjustable phase shifter corresponds to two beams, and the two beams may be used as a second beam group. When the angle of the 1-bit adjustable phase shifter is 0°, the angle of the 3-bit adjustable phase shifter corresponds to three beams, and the three beams may be used as a first beam group.

FIG. 32 is a schematic diagram of another topology structure in which an antenna array includes six columns of antenna elements according to an embodiment of this application. As shown in the figure, the antenna array includes the six columns of antenna elements, and each column of antenna elements includes a plurality of antenna elements. For ease of description, f1 to f6 are respectively used to represent column sequence numbers corresponding to columns of antenna elements in the antenna array, and F1 to F12 are respectively used to represent row sequence numbers corresponding to rows of antenna elements in the antenna array. It may be understood that the column sequence number and the row sequence number in FIG. 32 are merely examples. In actual application, there may also be another sequence number writing manner.

Each column of antenna elements in the antenna array includes two antenna element groups. As shown in FIG. 32, a first column of antenna elements is used as an example. For ease of description, an antenna element in a first row and a first column may be named as $f_{11}$, an antenna element in a second row and the first column may be named as $f_{21}$, an antenna element in a third row and the first column may be named as $f_{31}$, an antenna element in a fourth row and the first column may be named as $f_{41}$, and so on. Details are not described herein. The antenna element $f_{11}$ and the antenna element $f_{21}$ are adjacently arranged, and the antenna element f31 and the antenna element $f_{41}$ are adjacently arranged. Similarly, in another column of antenna elements, antenna elements that belong to a same RF channel in a vertical direction are also alternately arranged. In other words, the antenna elements driven on the same RF channel are not adjacent in a horizontal direction, and are alternately arranged in the vertical direction.

A plurality of antenna elements may be driven on one RF channel, to reduce a quantity of RF channels, and reduce costs of a multi-beam system. A connection relationship among the plurality of antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter. In addition, there are two RF channels in the vertical direction, and an electrical downtilt of a beam formed on each RF channel may be independently adjusted.

It should be noted that the element arrangement manner and the element numbering manner that are shown in FIG. 32 are merely examples, and should not be construed as a limitation on this application.

It can be learned from the antenna array shown in FIG. 32 that there are four antenna elements that space horizontal antenna elements driven on a same RF channel, in other words, M=4 (for example, the antenna elements are $f_{11}$, $f_{13}$, $f_{14}$, and f15 during counting). According to the related formula provided in the foregoing second optional embodiment, a calculation result may be obtained by using the beam orientation in Embodiment 1 in the calculation manner of the baseband weight in the horizontal direction. Seven beams are obtained based on the calculation result, and a beam orientation, baseband weights, and a status of a 1-bit adjustable phase shifter that correspond to each beam are shown in Table 6.

TABLE 6

| Beam sequence number | Beam orientation | Baseband weight 1 | Baseband weight 2 | Baseband weight 3 | Baseband weight 4 | Phase of an adjustable phase shifter |
|---|---|---|---|---|---|---|
| 1 | 46.2° | 1 | exp(−j · 135°) | exp(−j · 270°) | exp(−j · 45°) | 180° |
| 3 | 13.9° | 1 | exp(−j · 45°) | exp(−j · 90°) | exp(−j · 135°) | 180° |
| 5 | −13.9° | 1 | exp(j · 45°) | exp(j · 90°) | exp(j · 135°) | 180° |
| 7 | −46.2° | 1 | exp(j · 135°) | exp(j · 270°) | exp(j · 45°) | 180° |
| 2 | 28.7° | 1 | exp(−j · 90°) | exp(−j · 180°) | exp(−j · 270°) | 0° |
| 4 | 0° | 1 | 1 | 1 | 1 | 0° |
| 6 | −28.7° | 1 | exp(j · 90°) | exp(j · 180°) | exp(j · 270°) | 0° |

An adjustable angle of the 1-bit adjustable phase shifter may be 0° or 180°. With reference to the content shown in Table 6, when the beam sequence number is 1, correspondingly, $k_i=3$; when the beam sequence number is 3, correspondingly, $k_i=1$; when the beam sequence number is 5, correspondingly, $k_i=-1$; when the beam sequence number is 7, correspondingly, $k_i=-3$; when the beam sequence number is 2, correspondingly, $k_i=2$; when the beam sequence number is 4, correspondingly, $k_i=0$; and when the beam sequence number is 6, correspondingly, $k_i=-2$.

When the angle of the 1-bit adjustable phase shifter is 180°, the angle of the 1-bit adjustable phase shifter corresponds to four beams, and the four beams may be used as a first beam group. When the angle of the 1-bit adjustable phase shifter is 0°, the angle of the 1-bit adjustable phase shifter corresponds to three beams, and the three beams may be used as a second beam group. Alternatively, when the angle of the 1-bit adjustable phase shifter is 180°, the angle of the 1-bit adjustable phase shifter corresponds to four beams, and the four beams may be used as a second beam group. When the angle of the 1-bit adjustable phase shifter is 0°, the angle of the 1-bit adjustable phase shifter corresponds to three beams, and the three beams may be used as a first beam group.

FIG. 33 is a schematic diagram of a topology structure in which an antenna array includes seven columns of antenna elements according to an embodiment of this application. As shown in the figure, the antenna array includes the seven columns of antenna elements, and each column of antenna elements includes a plurality of antenna elements. For ease of description, g1 to g7 are respectively used to represent column sequence numbers corresponding to columns of antenna elements in the antenna array, and G1 to G12 are respectively used to represent row sequence numbers corresponding to rows of antenna elements in the antenna array. It may be understood that the column sequence number and the row sequence number in FIG. 33 are merely examples. In actual application, there may also be another sequence number writing manner.

Each column of antenna elements in the antenna array includes two antenna element groups. As shown in FIG. 33, a first column of antenna elements is used as an example. For ease of description, an antenna element in a first row and a first column may be named as $g_{11}$, an antenna element in a second row and the first column may be named as $g_{21}$, an antenna element in a third row and the first column may be named as $g_{31}$, an antenna element in a fourth row and the first column may be named as $g_{41}$, and so on. Details are not described herein. The antenna element $g_{11}$ and the antenna element g21 are adjacently arranged, and the antenna element g31 and the antenna element $g_{41}$ are adjacently arranged. Similarly, in another column of antenna elements, antenna elements that belong to a same RF channel in a vertical direction are also alternately arranged. In other words, the antenna elements driven on the same RF channel are not adjacent in a horizontal direction, and are alternately arranged in the vertical direction.

A plurality of antenna elements may be driven on one RF channel, to reduce a quantity of RF channels, and reduce costs of a multi-beam system. A connection relationship among the plurality of antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter. In addition, there are two RF channels in the vertical direction, and an electrical downtilt of a beam formed on each RF channel may be independently adjusted.

It should be noted that the element arrangement manner and the element numbering manner that are shown in FIG. 33 are merely examples, and should not be construed as a limitation on this application.

It can be learned from the antenna array shown in FIG. 33 that there are four antenna elements that space horizontal antenna elements driven on a same RF channel, in other words, M=4 (for example, the antenna elements are $g_{12}$, $g_{13}$, $g_{14}$, and $g_{15}$ during counting). According to the related formula provided in the foregoing second optional embodiment, a calculation result may be obtained by using the beam orientation in Embodiment 1 in the calculation manner of the baseband weight in the horizontal direction. Seven beams are obtained based on the calculation result, and a beam orientation, baseband weights, and a status of a 1-bit adjustable phase shifter that correspond to each beam are shown in Table 7.

Table 7, when the beam sequence number is 1, correspondingly, $k_i$=3; when the beam sequence number is 3, correspondingly, $k_i$=1; when the beam sequence number is 5, correspondingly $k_i$=−1; when the beam sequence number is 7, correspondingly, $k_i$=−3; when the beam sequence number is 2, correspondingly, $k_i$=2; when the beam sequence number is 4, correspondingly, $k_i$=0; and when the beam sequence number is 6, correspondingly, $k_i$=−2.

When the angle of the 1-bit adjustable phase shifter is 180°, the angle of the 1-bit adjustable phase shifter corresponds to four beams, and the four beams may be used as a first beam group. When the angle of the 1-bit adjustable phase shifter is 0°, the angle of the 1-bit adjustable phase shifter corresponds to three beams, and the three beams may be used as a second beam group. Alternatively, when the angle of the 1-bit adjustable phase shifter is 180°, the angle of the 1-bit adjustable phase shifter corresponds to four beams, and the four beams may be used as a second beam group. When the angle of the 1-bit adjustable phase shifter is 0°, the angle of the 1-bit adjustable phase shifter corresponds to three beams, and the three beams may be used as a first beam group.

FIG. 34 is a schematic diagram of a topology structure in which an antenna array includes nine columns of antenna elements according to an embodiment of this application. As shown in the figure, the antenna array includes the nine columns of antenna elements, and each column of antenna elements includes a plurality of antenna elements. For ease of description, h1 to h9 are respectively used to represent column sequence numbers corresponding to columns of antenna elements in the antenna array, and H1 to H12 are respectively used to represent row sequence numbers corresponding to rows of antenna elements in the antenna array. It may be understood that the column sequence number and the row sequence number in FIG. 34 are merely examples. In actual application, there may also be another sequence number writing manner.

Each column of antenna elements in the antenna array includes two antenna element groups. As shown in FIG. 34, a first column of antenna elements is used as an example. For ease of description, an antenna element in a first row and a first column may be named as $h_{11}$, an antenna element in a second row and the first column may be named as $h_{21}$, an antenna element in a third row and the first column may be named as $h_{31}$, an antenna element in a fourth row and the first column may be named as $h_{41}$, and so on. Details are not described herein. The antenna element $h_{11}$ and the antenna element $h_{21}$ are adjacently arranged, and the antenna element $h_{31}$ and the antenna element $h_{41}$ are adjacently arranged. Similarly, in another column of antenna elements,

TABLE 7

| Beam sequence number | Beam orientation | Baseband weight 1 | Baseband weight 2 | Baseband weight 3 | Baseband weight 4 | Phase of an adjustable phase shifter |
|---|---|---|---|---|---|---|
| 1 | 46.2° | 1 | exp(−j · 135°) | exp(−j · 270°) | exp(−j · 45°) | 180° |
| 3 | 13.9° | 1 | exp(−j · 45°) | exp(−j · 90°) | exp(−j · 135°) | 180° |
| 5 | −13.9° | 1 | exp(j · 45°) | exp(j · 90°) | exp(j · 135°) | 180° |
| 7 | −46.2° | 1 | exp(j · 135°) | exp(j · 270°) | exp(j · 45°) | 180° |
| 2 | 28.7° | 1 | exp(−j · 90°) | exp(−j · 180°) | exp(−j · 270°) | 0° |
| 4 | 0° | 1 | 1 | 1 | 1 | 0° |
| 6 | −28.7° | 1 | exp(j · 90°) | exp(j · 180°) | exp(j · 270°) | 0° |

An adjustable angle of the 1-bit adjustable phase shifter may be 0° or 180°. With reference to the content shown in antenna elements that belong to a same RF channel in a vertical direction are also alternately arranged. In other words, the antenna elements driven on the same RF channel are not adjacent in a horizontal direction, and are alternately arranged in the vertical direction.

A plurality of antenna elements may be driven on one RF channel, to reduce a quantity of RF channels, and reduce costs of a multi-beam system. A connection relationship among the plurality of antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter. In addition, there are two RF channels in the vertical direction, and an electrical downtilt of a beam formed on each RF channel may be independently adjusted.

It should be noted that the element arrangement manner and the element numbering manner that are shown in FIG. 34 are merely examples, and should not be construed as a limitation on this application.

It can be learned from the antenna array shown in FIG. 34 that there are five antenna elements that space horizontal antenna elements driven on a same RF channel, in other words, M=5 (for example, the antenna elements are $h_{12}$, $h_{13}$, $h_{14}$, $h_{15}$, and $h_{16}$ during counting). According to the related formula provided in the foregoing second optional embodiment, a calculation result may be obtained by using the beam orientation in Embodiment 1 in the calculation manner of the baseband weight in the horizontal direction. Nine beams are obtained based on the calculation result, and a beam orientation, baseband weights, and a status of a 1-bit adjustable phase shifter that correspond to each beam are shown in Table 8.

used as a second beam group. Alternatively, when the angle of the 1-bit adjustable phase shifter is 180°, the angle of the 1-bit adjustable phase shifter corresponds to four beams, and the four beams may be used as a second beam group. When the angle of the 1-bit adjustable phase shifter is 0°, the angle of the 1-bit adjustable phase shifter corresponds to five beams, and the five beams may be used as a first beam group.

FIG. 35 is a schematic diagram of a topology structure in which an antenna array includes 10 columns of antenna elements according to an embodiment of this application. As shown in the figure, the antenna array includes the 10 columns of antenna elements, and each column of antenna elements includes a plurality of antenna elements. For ease of description, i1 to i10 are respectively used to represent column sequence numbers corresponding to columns of antenna elements in the antenna array, and I1 to I12 are respectively used to represent row sequence numbers corresponding to rows of antenna elements in the antenna array. It may be understood that the column sequence number and the row sequence number in FIG. 35 are merely examples. In actual application, there may also be another sequence number writing manner.

Each column of antenna elements in the antenna array includes two antenna element groups. As shown in FIG. 35, a first column of antenna elements is used as an example. For ease of description, an antenna element in a first row and a first column may be named as $i_{11}$, an antenna element in a second row and the first column may be named as $i_{21}$, an antenna element in a third row and the first column may be named as $i_{31}$, an antenna element in a fourth row and the first column may be named as $i_{41}$, and so on. Details are not described herein. The antenna element in and the antenna

TABLE 8

| Beam sequence number | Beam orientation | Baseband weight 1 | Baseband weight 2 | Baseband weight 3 | Baseband weight 4 | Baseband weight 5 | Adjustable phase shifter |
|---|---|---|---|---|---|---|---|
| 1 | 50.3° | 1 | exp(−j · 144°) | exp(−j · 288°) | exp(−j · 432°) | exp(−j · 576°) | 0° |
| 3 | 22.6° | 1 | exp(−j · 72°) | exp(−j · 144°) | exp(−j · 216°) | exp(−j · 288°) | 0° |
| 5 | 0° | 1 | 1 | 1 | 1 | 1 | 0° |
| 7 | −22.6° | 1 | exp(j · 72°) | exp(j · 144°) | exp(j · 216°) | exp(j · 288°) | 0° |
| 9 | −50.3° | 1 | exp(j · 144°) | exp(j · 288°) | exp(j · 432°) | exp(j · 576°) | 0° |
| 2 | 35.2° | 1 | exp(−j · 108°) | exp(−j · 216°) | exp(−j · 324°) | exp(−j · 432°) | 180° |
| 4 | 11.1° | 1 | exp(−j · 36°) | exp(−j · 72°) | exp(−j · 108°) | exp(−j · 144°) | 180° |
| 6 | −11.1° | 1 | exp(j · 36°) | exp(j · 72°) | exp(j · 108°) | exp(j · 144°) | 180° |
| 8 | −35.2° | 1 | exp(j · 108°) | exp(j · 216°) | exp(j · 324°) | exp(j · 432°) | 180° |

An adjustable angle of the 1-bit adjustable phase shifter may be 0° or 180°. With reference to the content shown in Table 8, when the beam sequence number is 1, correspondingly, $k_i$=4; when the beam sequence number is 3, correspondingly, $k_i$=2; when the beam sequence number is 5, correspondingly, k $k_i$=0; when the beam sequence number is 7, correspondingly, $k_i$=−2; when the beam sequence number is 9, correspondingly, $k_i$=−4; when the beam sequence number is 2, correspondingly, $k_i$=3; when the beam sequence number is 4, correspondingly, $k_i$=1; when the beam sequence number is 6, correspondingly, $k_i$=−1; and when the beam sequence number is 8, correspondingly, $k_i$=−3.

When the angle of the 1-bit adjustable phase shifter is 180°, the angle of the 1-bit adjustable phase shifter corresponds to four beams, and the four beams may be used as a first beam group. When the angle of the 1-bit adjustable phase shifter is 0°, the angle of the 1-bit adjustable phase shifter corresponds to five beams, and the five beams may be element $i_{21}$ are adjacently arranged, and the antenna element $i_{31}$ and the antenna element $i_{41}$ are adjacently arranged. Similarly, in another column of antenna elements, antenna elements that belong to a same RF channel in a vertical direction are also alternately arranged. In other words, the antenna elements driven on the same RF channel are not adjacent in a horizontal direction, and are alternately arranged in the vertical direction.

A plurality of antenna elements may be driven on one RF channel, to reduce a quantity of RF channels, and reduce costs of a multi-beam system. A connection relationship among the plurality of antenna elements driven on the same RF channel is represented as follows: A phase difference between antenna elements in a horizontal direction may be implemented by using a 1-bit adjustable phase shifter, and a phase difference between antenna elements in a vertical direction may be implemented by using a fixed phase shifter. In addition, there are two RF channels in the vertical direction, and an electrical downtilt of a beam formed on each RF channel may be independently adjusted.

It should be noted that the element arrangement manner and the element numbering manner that are shown in FIG. 35 are merely examples, and should not be construed as a limitation on this application.

It can be learned from the antenna array shown in FIG. 34 that there are five antenna elements that space horizontal antenna elements driven on a same RF channel, in other words, M=5 (for example, the antenna elements are $i_{12}$, $i_{13}$, $i_{14}$, $i_{15}$, and i16 during counting). According to the related formula provided in the foregoing second optional embodiment, a calculation result may be obtained by using the beam orientation in Embodiment 1 in the calculation manner of the baseband weight in the horizontal direction. Nine beams are obtained based on the calculation result, and a beam orientation, baseband weights, and a status of a 1-bit adjustable phase shifter that correspond to each beam are shown in Table 9.

Therefore, the following beam forms and corresponding working modes may be formed.

Figure 36:
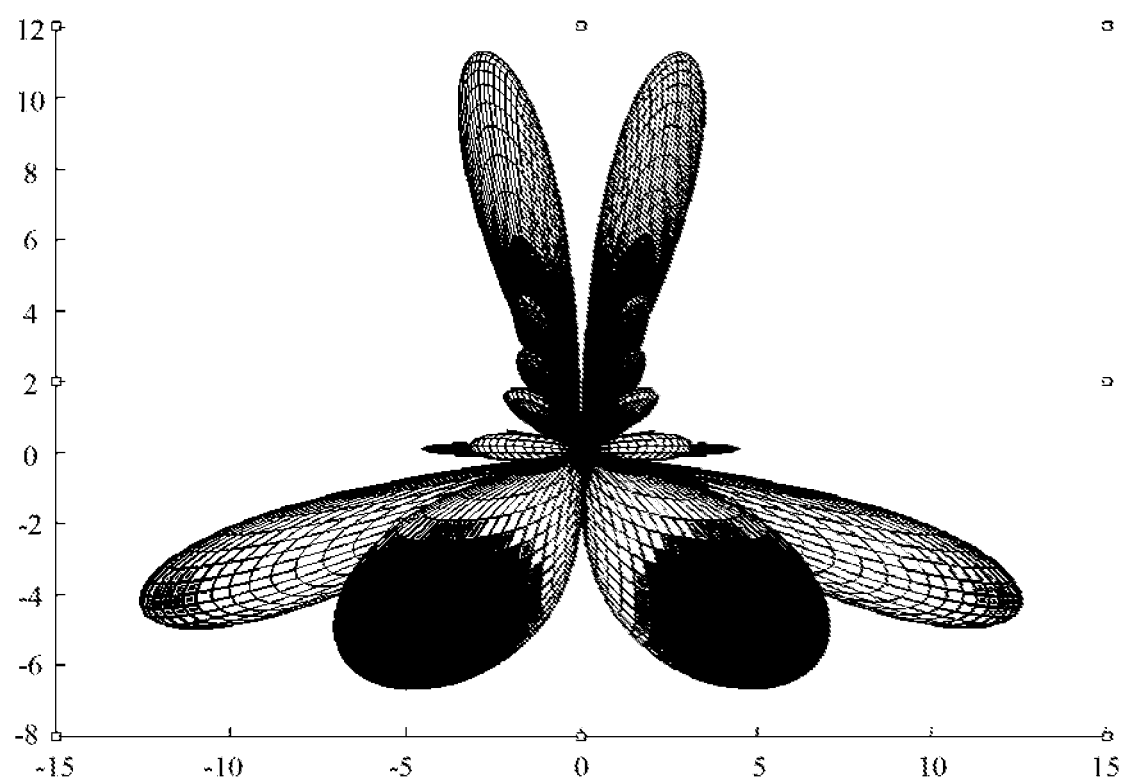
FIG. 36 is a schematic diagram of a beam orientation corresponding to a working mode in an application scenario in this application.

FIG. 36 shows a corresponding beam form when a visual angle exactly faces a base station. Four beams may be obtained when downtilts of beams on two RF channels on a vertical plane are the same, and both phases of corresponding 1-bit adjustable phase shifters are π.

Figure 37:
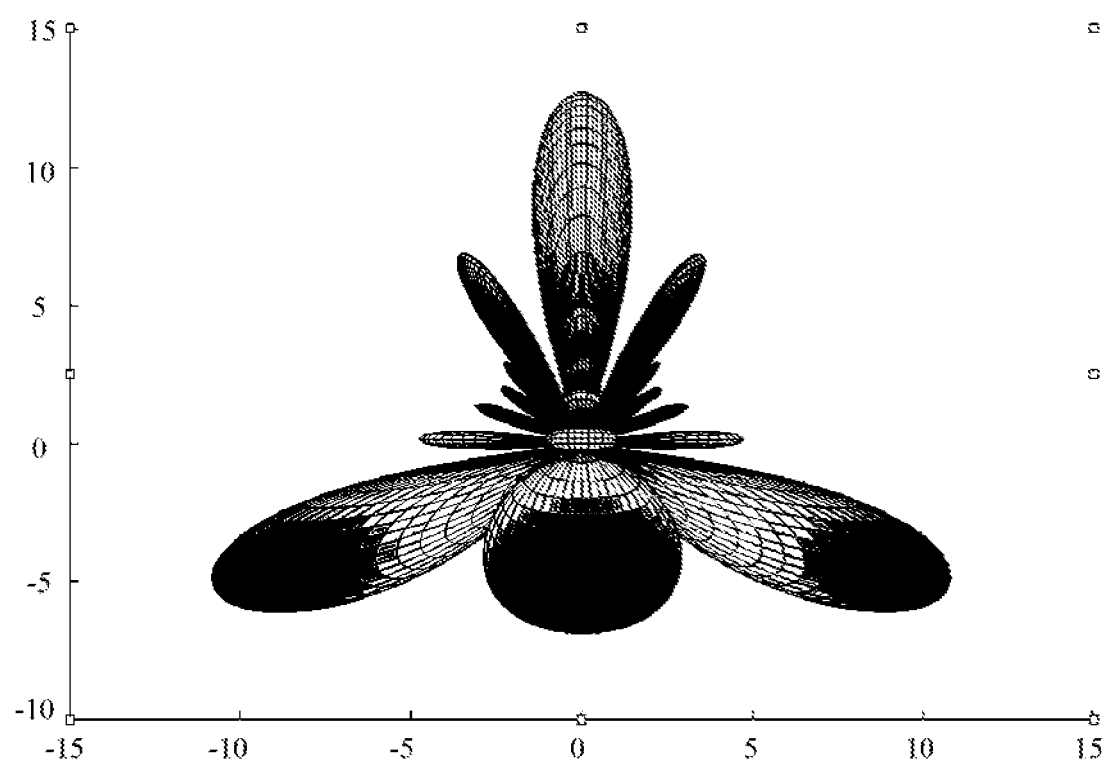
FIG. 37 is a schematic diagram of a beam orientation corresponding to another working mode in an application scenario in this application.

FIG. 37 shows a corresponding beam form when a visual angle exactly faces a base station. Three beams may be obtained when downtilts of beams on two RF channels on a vertical plane are the same, and both phases of corresponding 1-bit adjustable phase shifters are 0.

Figure 38:
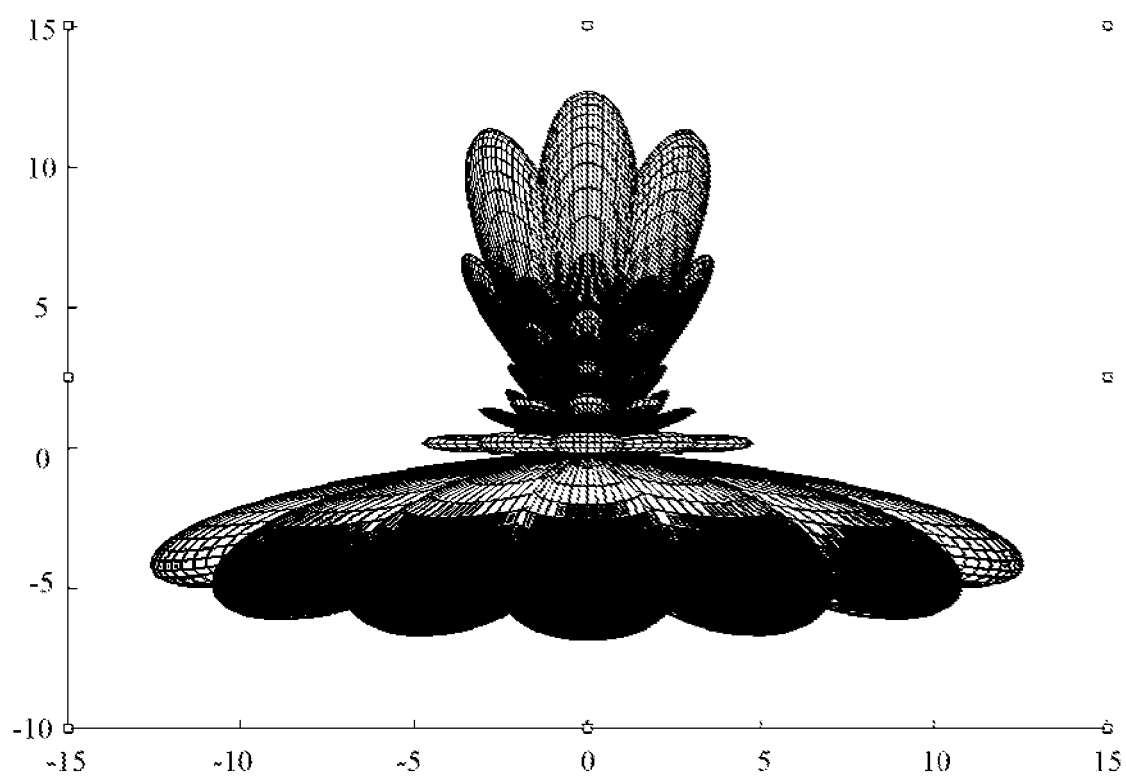
FIG. 38 is a schematic diagram of a beam orientation corresponding to another working mode in an application scenario in this application.

FIG. 38 shows a corresponding beam form when a visual angle exactly faces a base station. Seven beams may be obtained when downtilts of beams on two RF channels on a vertical plane are the same, and phases of corresponding 1-bit adjustable phase shifters are respectively π and 0.

TABLE 9

| Beam sequence number | Beam orientation | Baseband weight 1 | Baseband weight 2 | Baseband weight 3 | Baseband weight 4 | Baseband weight 5 | Adjustable phase shifter |
|---|---|---|---|---|---|---|---|
| 1 | 50.3° | 1 | exp(−j · 144°) | exp(−j · 288°) | exp(−j · 432°) | exp(−j · 576°) | 0° |
| 3 | 22.6° | 1 | exp(−j · 72°) | exp(−j · 144°) | exp(−j · 216°) | exp(−j · 288°) | 0° |
| 5 | 0° | 1 | 1 | 1 | 1 | 1 | 0° |
| 7 | −22.6° | 1 | exp(j · 72°) | exp(j · 144°) | exp(j · 216°) | exp(j · 288°) | 0° |
| 9 | −50.3° | 1 | exp(j · 144°) | exp(j · 288°) | exp(j · 432°) | exp(j · 576°) | 0° |
| 2 | 35.2° | 1 | exp(−j · 108°) | exp(−j · 216°) | exp(−j · 324°) | exp(−j · 432°) | 180° |
| 4 | 11.1° | 1 | exp(−j · 36°) | exp(−j · 72°) | exp(−j · 108°) | exp(−j · 144°) | 180° |
| 6 | −11.1° | 1 | exp(j · 36°) | exp(j · 72°) | exp(j · 108°) | exp(j · 144°) | 180° |
| 8 | −35.2° | 1 | exp(j · 108°) | exp(j · 216°) | exp(j · 324°) | exp(j · 432°) | 180° |

An adjustable angle of the 1-bit adjustable phase shifter may be 0° or 180°. With reference to the content shown in Table 9, when the beam sequence number is 1, correspondingly, $k_i$=4; when the beam sequence number is 3, correspondingly, $k_i$=2; when the beam sequence number is 5, correspondingly, $k_i$=0; when the beam sequence number is 7, correspondingly, $k_i$=−2; when the beam sequence number is 9, correspondingly, $k_i$=−4; when the beam sequence number is 2, correspondingly, $k_i$=3; when the beam sequence number is 4, correspondingly, $k_i$=1; when the beam sequence number is 6, correspondingly, $k_i$=−1; and when the beam sequence number is 8, correspondingly, $k_i$=−3.

When the angle of the 1-bit adjustable phase shifter is 180°, the angle of the 1-bit adjustable phase shifter corresponds to four beams, and the four beams may be used as a first beam group. When the angle of the 1-bit adjustable phase shifter is 0°, the angle of the 1-bit adjustable phase shifter corresponds to five beams, and the five beams may be used as a second beam group. Alternatively, when the angle of the 1-bit adjustable phase shifter is 180°, the angle of the 1-bit adjustable phase shifter corresponds to four beams, and the four beams may be used as a second beam group. When the angle of the 1-bit adjustable phase shifter is 0°, the angle of the 1-bit adjustable phase shifter corresponds to five beams, and the five beams may be used as a first beam group.

For ease of understanding, the following describes, with reference to FIG. 36 to FIG. 42, beam forms corresponding to different working modes in a specific application scenario. Specifically, in the topology structure that is of the antenna array and that corresponds to Embodiment 3, there are two RF channels on a vertical plane. An electrical downtilt of a beam formed on each RF channel may be independently adjusted, and 1-bit adjustable phase shifters corresponding to the two RF channels may be independently adjusted.

Figure 39:
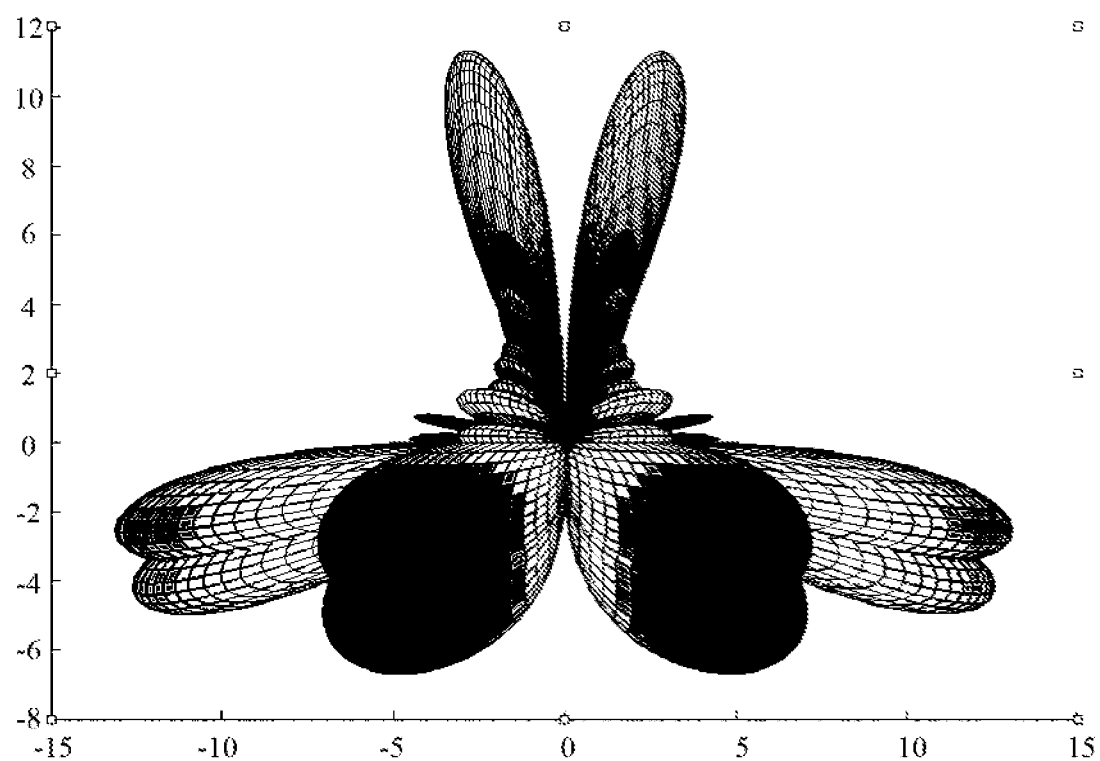
FIG. 39 is a schematic diagram of a beam orientation corresponding to another working mode in an application scenario in this application.

FIG. 39 shows a corresponding beam form when a visual angle exactly faces a base station. Eight beams may be obtained when downtilts of beams on two RF channels on a vertical plane are different, and both phases of 1-bit adjustable phase shifters corresponding to beams in inner and outer circles are π.

Figure 40:
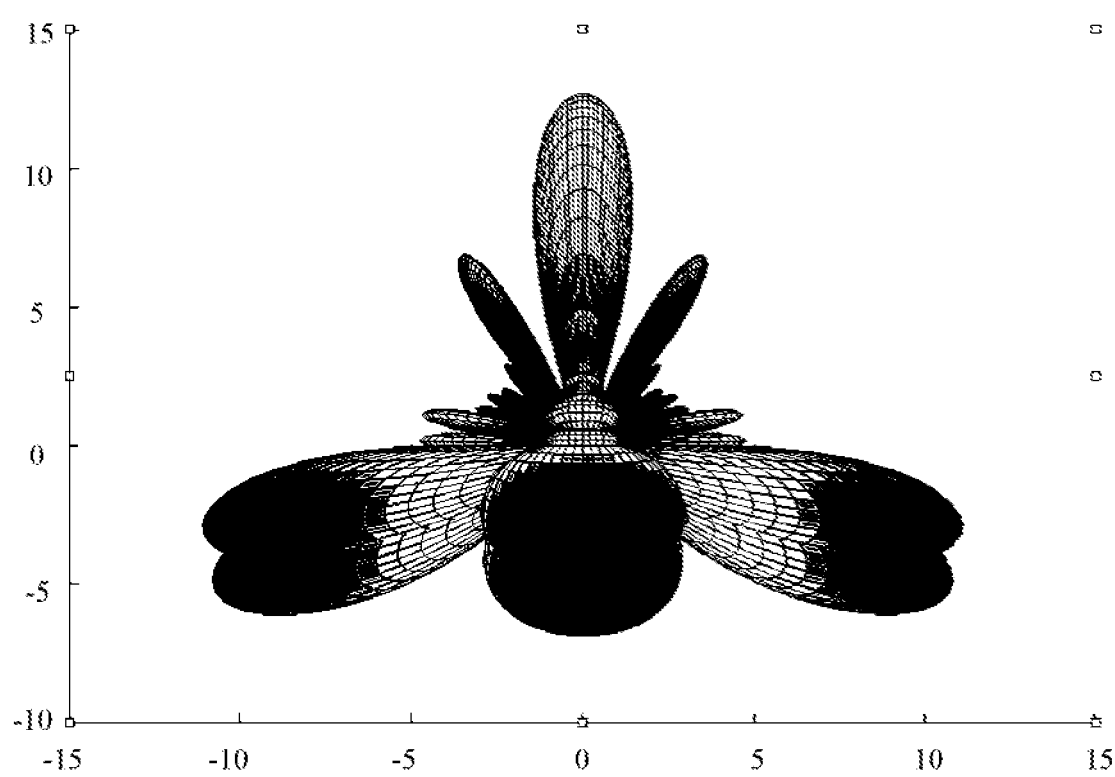
FIG. 40 is a schematic diagram of a beam orientation corresponding to another working mode in an application scenario in this application.

FIG. 40 shows a corresponding beam form when a visual angle exactly faces a base station. Six beams may be obtained when downtilts of beams on two RF channels on a vertical plane are different, and both phases of 1-bit adjustable phase shifters corresponding to beams in inner and outer circles are 0.

Figure 41:
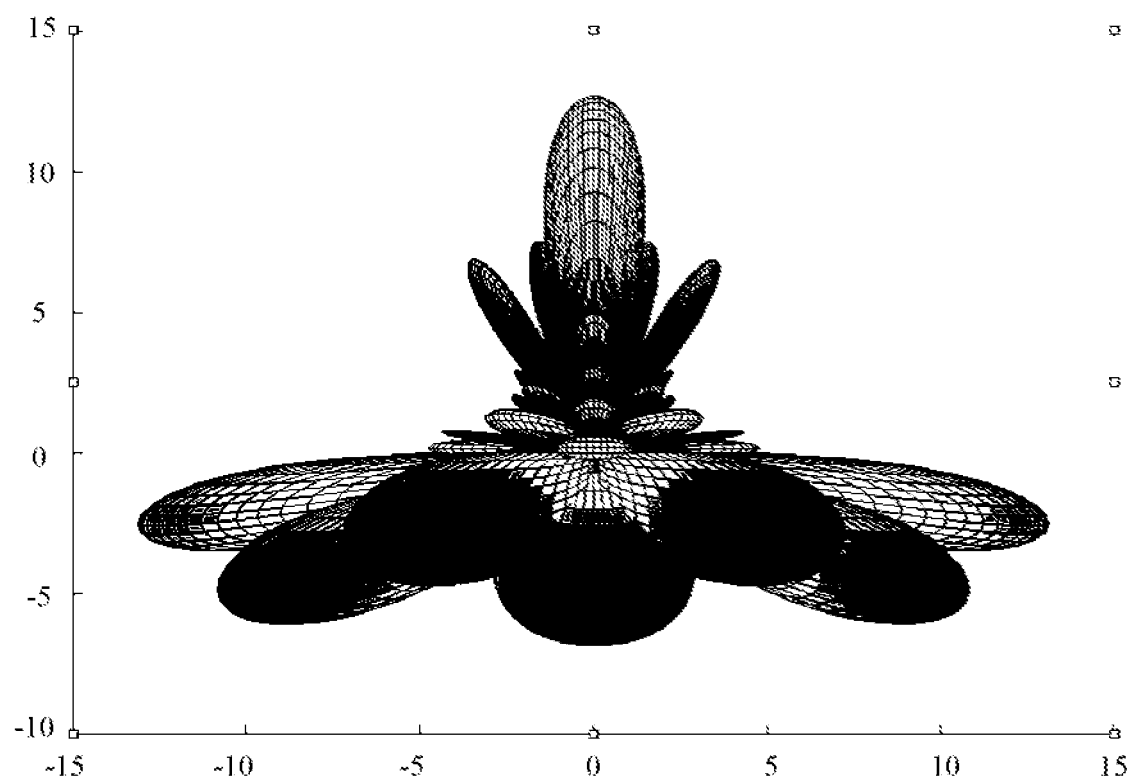
FIG. 41 is a schematic diagram of a beam orientation corresponding to another working mode in an application scenario in this application.

FIG. 41 shows a corresponding beam form when a visual angle exactly faces a base station. Seven beams may be obtained when downtilts of beams on two RF channels on a vertical plane are different, a phase of a 1-bit adjustable phase shifter corresponding to a beam in an inner circle is 0, and a phase of a 1-bit adjustable phase shifter corresponding to a beam in an outer circle is π.

Figure 42:
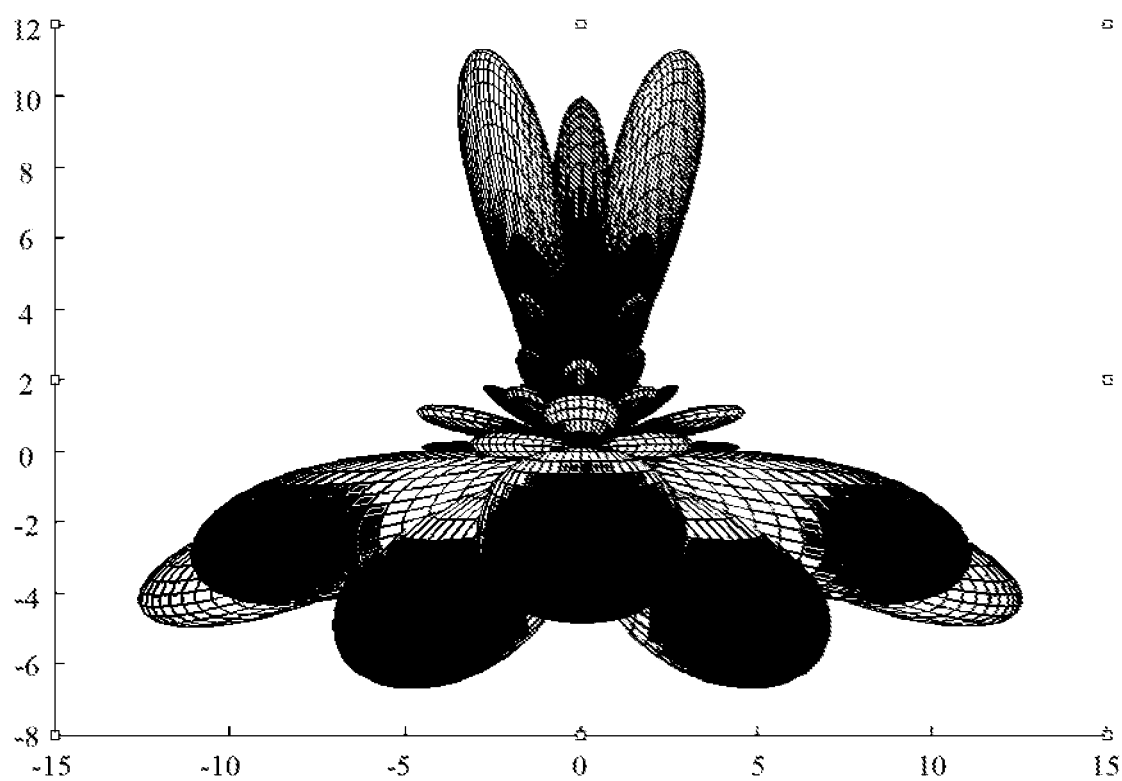
FIG. 42 is a schematic diagram of a beam orientation corresponding to another working mode in an application scenario in this application.

FIG. 42 shows a corresponding beam form when a visual angle exactly faces a base station. Seven beams may be obtained when downtilts of beams on two RF channels on a vertical plane are different, a phase of a 1-bit adjustable phase shifter corresponding to a beam in an inner circle is π, and a phase of a 1-bit adjustable phase shifter corresponding to a beam in an outer circle is 0.

It may be understood that the outer circle and the inner circle are two relative concepts. Because downtilts on the vertical plane are different, beam ranges obtained through projection are also different. A circle formed when the beams are projected to a relatively far location is referred to as the outer circle, and a circle formed when the beams are projected to a relatively close location is referred to as the inner circle. Usually, a smaller downtilt on the vertical plane indicates a larger beam projection range, and a larger downtilt on the vertical plane indicates a smaller beam projection range.

Therefore, the downtilts of the beams in the inner and outer circles and the phases of the 1-bit adjustable phase shifters are adjusted, so that seven configurations can be implemented to match an application scenario, thereby improving solution flexibility.

For ease of understanding, the following describes, with reference to FIG. 43 to FIG. 49, beam forms corresponding to different working modes in a specific application scenario. Specifically, in the topology structure that is of the antenna array and that corresponds to Embodiment 4, there are two RF channels on a vertical plane. An electrical downtilt of a beam formed on each RF channel may be independently adjusted, and 1-bit adjustable phase shifters corresponding to the two RF channels may be independently adjusted. Therefore, the following beam forms and corresponding working modes may be formed.

Figure 43:
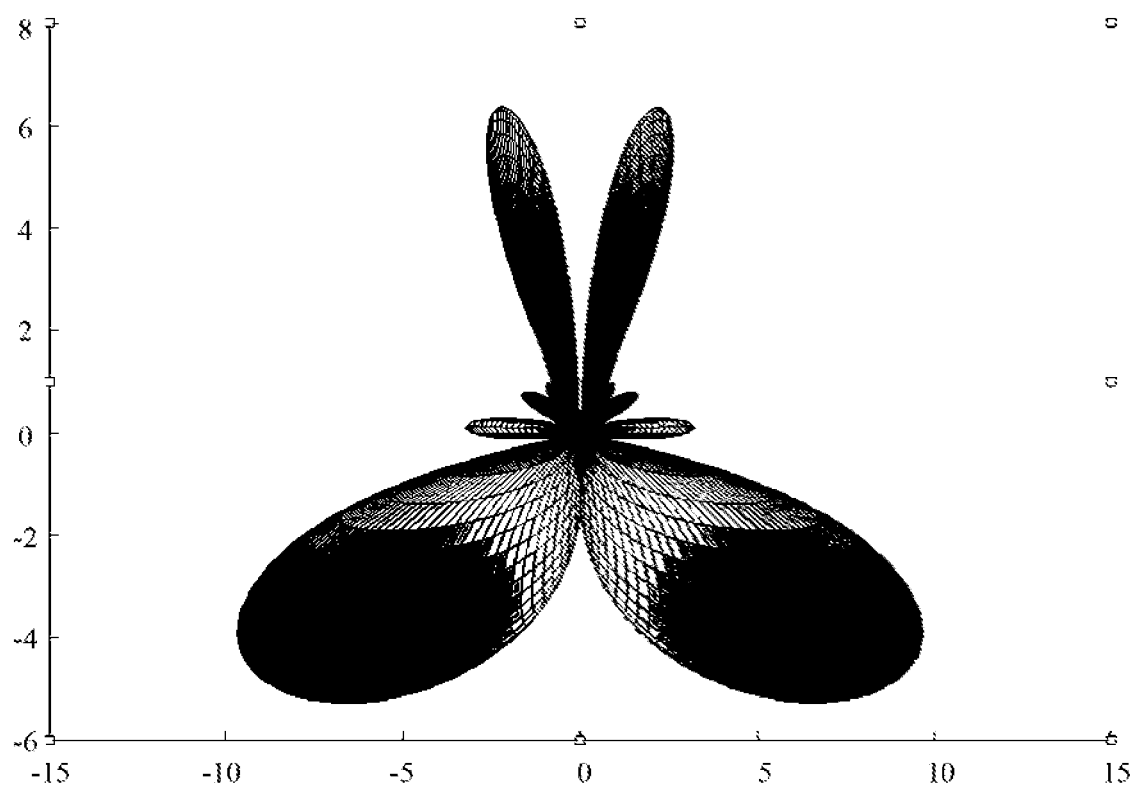
FIG. 43 is a schematic diagram of a beam orientation corresponding to a working mode in an application scenario in this application.

FIG. 43 shows a corresponding beam form when a visual angle exactly faces a base station. Two beams may be obtained when downtilts of beams on two RF channels on a vertical plane are the same, and both phases of corresponding 1-bit adjustable phase shifters are π.

Figure 44:
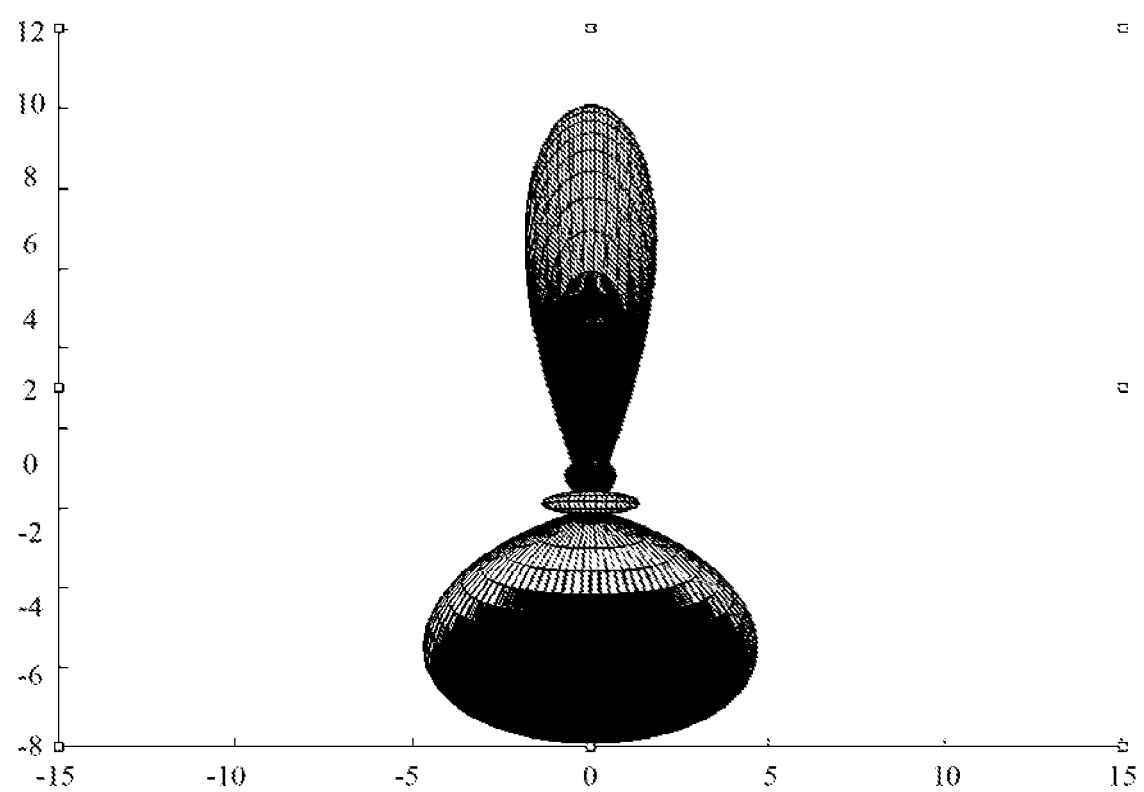
FIG. 44 is a schematic diagram of a beam orientation corresponding to another working mode in an application scenario in this application.

FIG. 44 shows a corresponding beam form when a visual angle exactly faces a base station. One beam may be obtained when downtilts of beams on two RF channels on a vertical plane are the same, and both phases of corresponding 1-bit adjustable phase shifters are 0.

Figure 45:
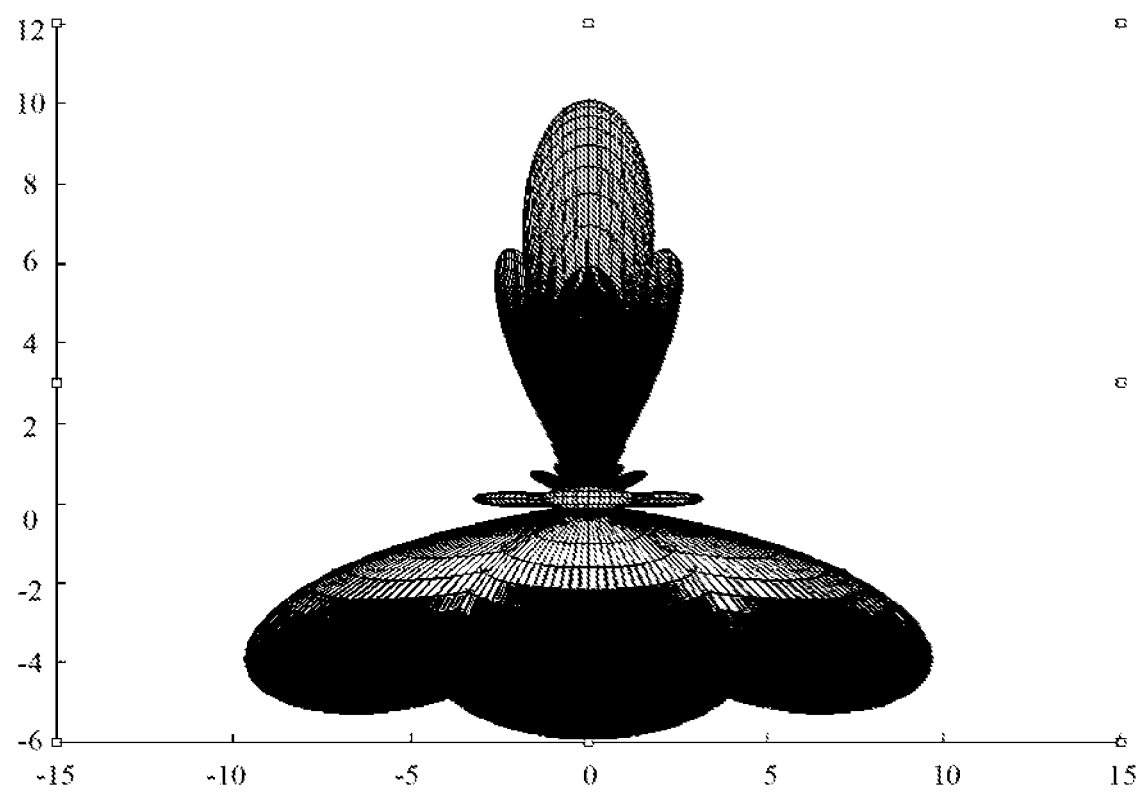
FIG. 45 is a schematic diagram of a beam orientation corresponding to another working mode in an application scenario in this application.

FIG. 45 shows a corresponding beam form when a visual angle exactly faces a base station. Three beams may be obtained when downtilts of beams on two RF channels on a vertical plane are the same, and phases of corresponding 1-bit adjustable phase shifters are respectively π and 0.

Figure 46:
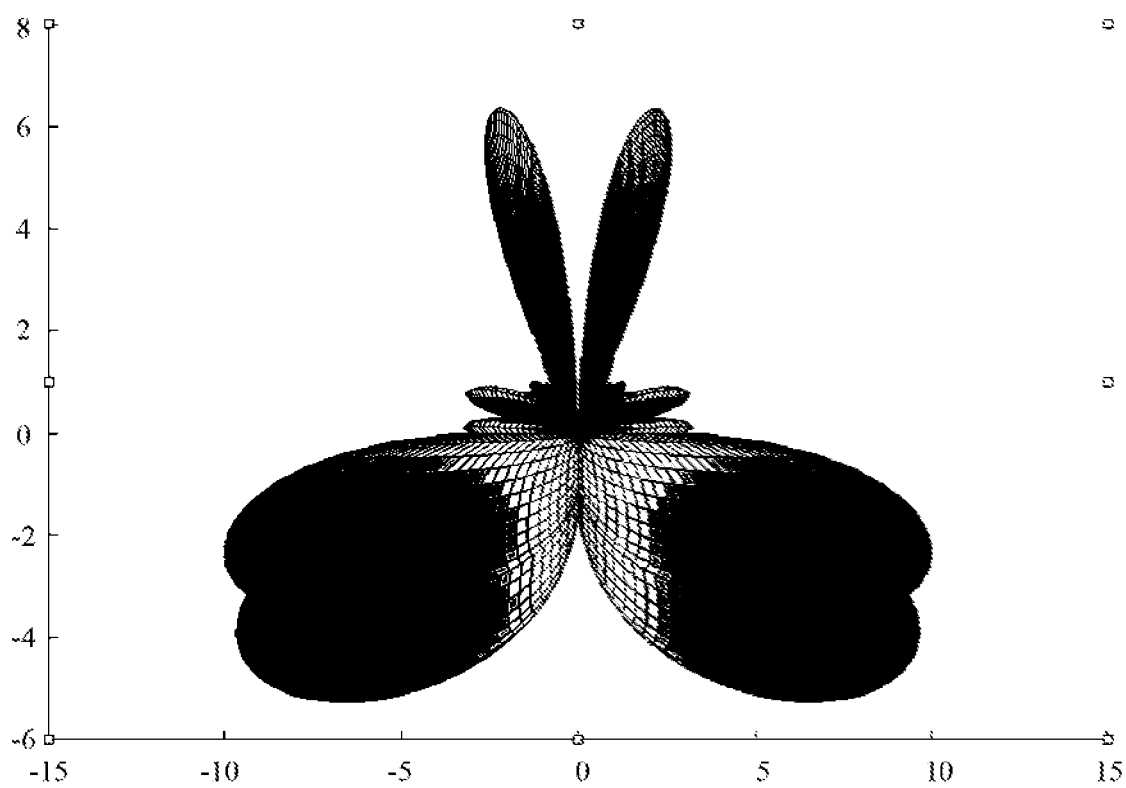
FIG. 46 is a schematic diagram of a beam orientation corresponding to another working mode in an application scenario in this application.

FIG. 46 shows a corresponding beam form when a visual angle exactly faces a base station. Four beams may be obtained when downtilts of beams on two RF channels on a vertical plane are different, and both phases of 1-bit adjustable phase shifters corresponding to beams in inner and outer circles are π.

Figure 47:
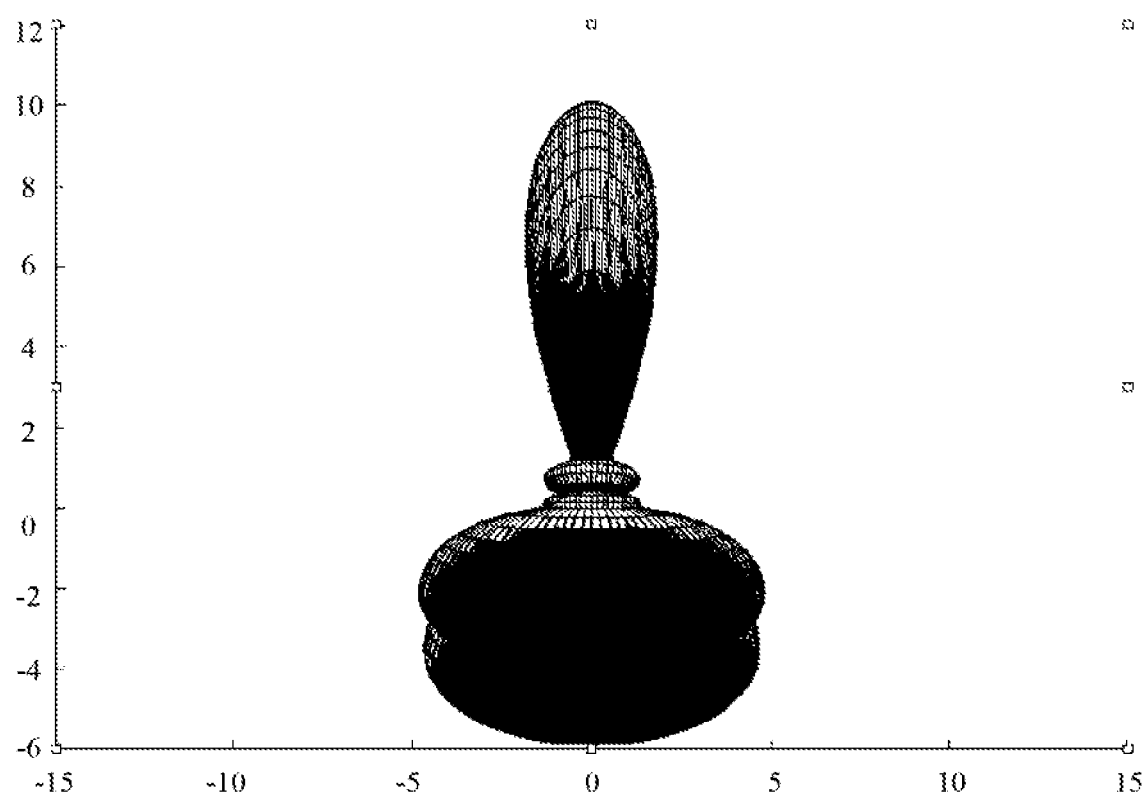
FIG. 47 is a schematic diagram of a beam orientation corresponding to another working mode in an application scenario in this application.

FIG. 47 shows a corresponding beam form when a visual angle exactly faces a base station. Two beams may be obtained when downtilts of beams on two RF channels on a vertical plane are different, and both phases of 1-bit adjustable phase shifters corresponding to beams in inner and outer circles are 0.

Figure 48:
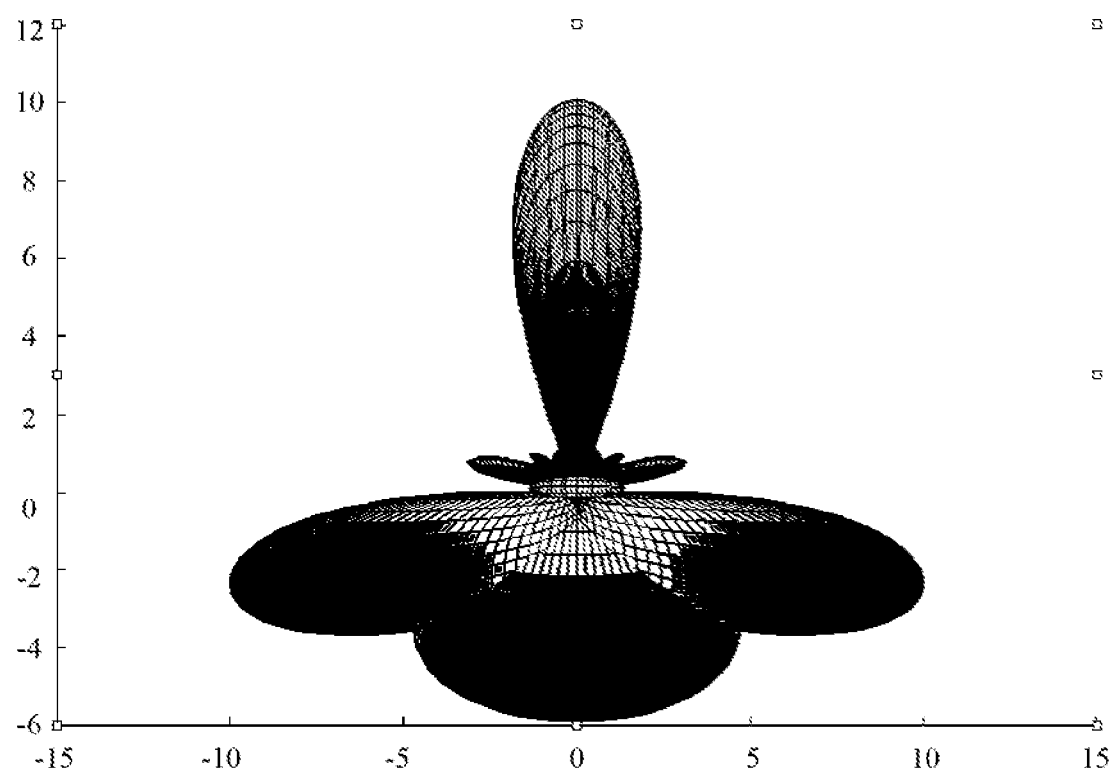
FIG. 48 is a schematic diagram of a beam orientation corresponding to another working mode in an application scenario in this application.

FIG. 48 shows a corresponding beam form when a visual angle exactly faces a base station. Three beams may be obtained when downtilts of beams on two RF channels on a vertical plane are different, a phase of a 1-bit adjustable phase shifter corresponding to a beam in an inner circle is 0, and a phase of a 1-bit adjustable phase shifter corresponding to a beam in an outer circle is π.

Figure 49:
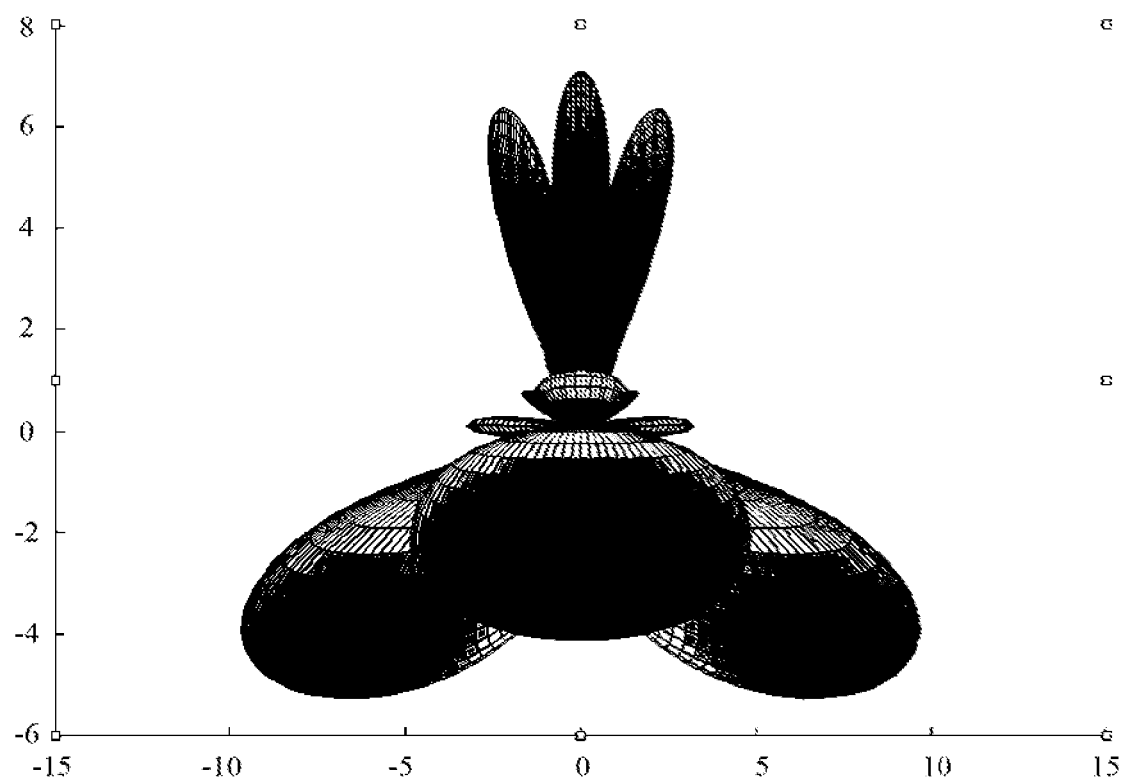
FIG. 49 is a schematic diagram of a beam orientation corresponding to another working mode in an application scenario in this application.

FIG. 49 shows a corresponding beam form when a visual angle exactly faces a base station. Three beams may be obtained when downtilts of beams on two RF channels on a vertical plane are different, a phase of a 1-bit adjustable phase shifter corresponding to a beam in an inner circle is π, and a phase of a 1-bit adjustable phase shifter corresponding to a beam in an outer circle is 0.

Therefore, the downtilts of the beams in the inner and outer circles and the phases of the 1-bit adjustable phase shifters are adjusted, so that seven configurations can be implemented to match an application scenario, thereby improving solution flexibility.

The antenna apparatus provided in this application has been described in the foregoing embodiments and application scenarios. The following describes a specific implementation of adjusting a beam by using the antenna apparatus. Referring to FIG. 50, an embodiment of a beam adjustment method provided in an embodiment of this application includes the following operations.

Operation 301. When an adjustable phase shifter of an antenna apparatus is at a first angle, the antenna apparatus obtains a first beam group, where the antenna apparatus includes an antenna array and the adjustable phase shifter; the antenna array includes a plurality of antenna elements, and in each row of antenna elements in the antenna array, antenna elements that belong to a same RF channel are spaced by M antenna elements; M is used to determine a quantity of beams in the first beam group and a quantity of beams in a second beam group, and M is a positive integer greater than 1; and the adjustable phase shifter is connected to the antenna array.

In this embodiment, the antenna apparatus may include the antenna array and the adjustable phase shifter. The antenna array includes the plurality of antenna elements, and the antenna array is usually a two-dimensional array. However, in actual application, the antenna array may alternatively be a multi-dimensional array, for example, a three-dimensional curved surface array. In each row of antenna elements in the antenna array, the antenna elements that belong to the same RF channel may be spaced by the M antenna elements, where M is mainly used to determine the quantity of beams in the first beam group and the quantity of beams in the second beam group, and M is an integer greater than 1.

The adjustable phase shifter is connected to the antenna array, and when the adjustable phase shifter of the antenna apparatus is at the first angle, the first beam group is obtained.

Operation 302. When the adjustable phase shifter of the antenna apparatus is at a second angle, the antenna apparatus obtains the second beam group.

In this embodiment, the adjustable phase shifter is connected to the antenna array, and when the adjustable phase shifter of the antenna apparatus is at the second angle, the second beam group is obtained.

In this embodiment of this application, the beam adjustment method is provided. The method is applied to the antenna apparatus, and the antenna apparatus includes the antenna array and the adjustable phase shifter. The antenna array includes the plurality of antenna elements, the antenna array is configured to radiate a beam, and in each row of antenna elements in the antenna array, the antenna elements that belong to the same RF channel are spaced by the M antenna elements; M is used to determine the quantity of beams in the first beam group and the quantity of beams in the second beam group, and M is a positive integer or an integer greater than 1; and the adjustable phase shifter is connected to the antenna array. When the adjustable phase shifter is at the first angle, the antenna apparatus obtains the first beam group. When the adjustable phase shifter is at the second angle, the antenna apparatus obtains the second beam group. In the foregoing method, a plurality of beams can be formed, and the beams are grouped by using the adjustable phase shifter, so that corresponding beam groups can be selected based on different communications scenarios, thereby effectively improving beam adjustment flexibility.

Based on the foregoing description of the antenna apparatus and with reference to the descriptions of FIG. 4 and the first to the eighth embodiments corresponding to FIG. 4, the operations performed in the beam adjustment method in this application may be based on the foregoing described antenna apparatus. Therefore, details are not described herein again.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

It may be clearly understood by persons skilled in the art that for the purpose of convenient and brief description, for a detailed working process of the foregoing described system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the operations of the methods in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of the embodiments of this application.

What is claimed is:

1. An antenna apparatus, comprising an antenna array and an adjustable phase shifter, wherein the antenna array comprises a plurality of antenna elements, wherein the antenna array is configured to generate a plurality of beams, wherein the plurality of beams generated by the antenna array include a first beam group or a second beam group, wherein, in each row of the plurality of antenna elements in the antenna array, two antenna elements that belong to a same radio frequency (RF) channel are spaced by M antenna elements, wherein M is used to determine a quantity of beams in the first beam group and a quantity of beams in the second beam group, and wherein M is an integer greater than 1; and
    wherein the adjustable phase shifter is connected to the antenna array, and wherein, when the adjustable phase shifter is at a first angle, the antenna array generates the first beam group; or wherein, when the adjustable phase shifter is at a second angle, the antenna array generates the second beam group.

2. The apparatus according to claim 1, wherein the adjustable phase shifter is a 1-bit adjustable phase shifter.

3. The apparatus according to claim 1, wherein a baseband weight that is in a horizontal direction and configured for the antenna array is used to determine a beam attribute in the horizontal direction and corresponding to a beam in the first beam group, or is used to determine a beam attribute in the horizontal direction and corresponding to to a beam in the second beam group.

4. The apparatus according to claim 3, wherein the baseband weight in the horizontal direction is determined based on a spacing between adjacent antenna elements, M, and a preset beam orientation range, and wherein the spacing between the adjacent antenna elements is a spacing distance between two adjacent antenna elements in the horizontal direction.

5. The apparatus according to claim 1, wherein the apparatus further comprises a fixed phase shifter; and wherein the fixed phase shifter is configured to set a vertical direction angle of the first beam group or the second beam group.

6. The apparatus according to claim 5, wherein a baseband weight in a vertical direction and configured for the antenna array is used to determine a beam attribute in the vertical direction and corresponding to a beam in the first beam group, or is used to determine a beam attribute in the vertical direction and corresponding to a beam in the second beam group.

7. The apparatus according to claim 6, wherein there is an association relationship between a fixed phase angle and a phase corresponding to the baseband weight in the vertical direction, and the fixed phase angle is a phase difference between two adjacent antenna elements on a same RF channel in the vertical direction.

8. The apparatus according to claim 1, wherein each column of the plurality of antenna elements in the antenna array comprises a first antenna element group and a second antenna element group, wherein the first antenna element group is connected to a first RF channel, and wherein the second antenna element group is connected to a second RF channel;
wherein the first antenna element group comprises a first antenna element ($a_{11}$) and a second antenna element ($a_{21}$), and wherein the second antenna element group comprises a third antenna element ($a_{31}$) and a fourth antenna element ($a_{41}$); and
wherein, in each column of antenna elements, the first antenna element ($a_{11}$) and the second antenna element ($a_{21}$) are adjacent, and the third antenna element ($a_{31}$) and the fourth antenna element ($a_{41}$) are adjacent.

9. The apparatus according to claim 8, wherein the antenna array comprises a first antenna element column (a1) and a second antenna element column (a5);
wherein the first antenna element column (a1) comprises the first antenna element ($a_{11}$) and the second antenna element ($a_{21}$), and wherein the second antenna element column ($a_5$) comprises a fifth antenna element ($a_{15}$) and a sixth antenna element ($a_{25}$); and
wherein the first antenna element ($a_{11}$), the second antenna element ($a_{21}$), the fifth antenna element ($a_{15}$), and the sixth antenna element ($a_{25}$) are all connected to a same RF channel.

10. The apparatus according to claim 1, wherein the antenna array comprises a first antenna element column (b1);
wherein the first antenna element column (b1) comprises a first antenna element group and a second antenna element group, wherein the first antenna element group is connected to a first RF channel, wherein the second antenna element group is connected to a second RF channel, wherein the first antenna element group comprises a first antenna element ($b_{11}$) and a second antenna element ($b_{21}$), and wherein the second antenna element group comprises a third antenna element ($b_{31}$) and a fourth antenna element ($b_{41}$); and
wherein in the first antenna element column (b1), the first antenna element ($b_{11}$) and the second antenna element ($b_{21}$) are adjacent, and the third antenna element ($b_{31}$) and the fourth antenna element ($b_{41}$) are adjacent.

11. The apparatus according to claim 10, wherein the antenna array further comprises a second antenna element column ($b_6$);
wherein the second antenna element column ($b_6$) comprises a fifth antenna element ($b_{16}$) and a sixth antenna element ($b_{26}$); and
wherein the first antenna element ($b_{11}$), the second antenna element ($b_{21}$), the fifth antenna element ($b_{16}$), and the sixth antenna element ($b_{26}$) are all connected to a same RF channel.

12. The apparatus according to claim 10, wherein the antenna array further comprises a third antenna element column ($b_4$);
wherein the third antenna element column ($b_4$) comprises a third antenna element group, wherein the third antenna element group is connected to a third RF channel, and wherein the third antenna element group comprises a seventh antenna element ($b_{14}$), an eighth antenna element ($b_{24}$), a ninth antenna element ($b_{34}$), and a tenth antenna element ($b_{44}$); and
wherein in the third antenna element column ($b_4$), the seventh antenna element ($b_{14}$), the eighth antenna element ($b_{24}$), the ninth antenna element ($b_{34}$), and the tenth antenna element ($b_{44}$) are adjacent.

13. The apparatus according to claim 1, wherein each column of the plurality of antenna elements in the antenna array comprises a first antenna element group and a second antenna element group, wherein the first antenna element group is connected to a first RF channel, and wherein the second antenna element group is connected to a second RF channel;
wherein the first antenna element group comprises a first antenna element ($c_{11}$), and wherein the second antenna element group comprises a second antenna element ($c_{21}$); and
wherein, in each column of antenna elements, the first antenna element ($c_{11}$) and the second antenna element ($c_{21}$) are adjacent.

14. The apparatus according to claim 13, wherein the antenna array comprises a first antenna element column (c1) and a second antenna element column (c5);
wherein the first antenna element column (c1) comprises the first antenna element ($c_{11}$) and the second antenna element ($c_{21}$), and wherein the second antenna element column (c5) comprises a third antenna element ($c_{15}$) and a fourth antenna element ($c_{25}$); and
wherein the first antenna element ($c_{11}$) and the third antenna element ($c_{15}$) are connected to the first RF channel, and the second antenna element ($c_{21}$) and the fourth antenna element ($c_{25}$) are connected to the second RF channel.

15. A beam adjustment method, wherein the method is applied to an antenna apparatus wherein the antenna apparatus comprises an antenna array and an adjustable phase shifter; wherein the antenna array comprises a plurality of antenna elements, wherein a plurality of beams generated by the antenna array include a first beam group or a second beam group, wherein, in each row of antenna elements in the antenna array, antenna elements that belong to a same radio frequency (RF) channel are spaced by M antenna elements, wherein M is used to determine a quantity of beams in the first beam group and a quantity of beams in the second beam group, wherein M is an integer greater than 1, and wherein the adjustable phase shifter is connected to antenna array, the method comprising:
when the adjustable phase shifter is at a first angle, generating, by the antenna array, the first beam group; or
when the adjustable phase shifter is at a second angle, generating, by the antenna array, the second beam group.

16. The method according to claim 15, wherein the adjustable phase shifter is a 1-bit adjustable phase shifter.

17. The method according to claim 15, wherein the method further comprises:
configuring a baseband weight in a horizontal direction for the antenna array.

18. The method according to claim 17, wherein the baseband weight in the horizontal direction is determined based on a spacing between adjacent antenna elements, M, and a preset beam orientation range, and wherein the spacing between the adjacent antenna elements is a spacing distance between two adjacent antenna elements in the horizontal direction.

19. The method according to claim 15, wherein the method further comprises:
setting a vertical direction angle of the first beam group or the second beam group.

20. A communications system, comprising:
an antenna apparatus, comprising an antenna array and an adjustable phase shifter, wherein the antenna array comprises a plurality of antenna elements, wherein the antenna array is configured to generate a plurality of beams, wherein the plurality of beams generated by the antenna array include a first beam group or a second beam group, wherein, in each row of the plurality of antenna elements in the antenna array, two antenna elements that belong to a same radio frequency (RF) channel are spaced by M antenna elements, wherein M is used to determine a quantity of beams in the first beam group and a quantity of beams in the second beam group, and wherein M is an integer greater than 1; and
wherein the adjustable phase shifter is connected to the antenna array, and wherein, when the adjustable phase shifter is at a first angle, the antenna array generates the first beam group; or wherein, when the adjustable phase shifter is at a second angle, the antenna array generates the second beam group.

* * * * *